US007299282B2

(12) United States Patent
Sarkissian et al.

(10) Patent No.: US 7,299,282 B2
(45) Date of Patent: Nov. 20, 2007

(54) STATE PROCESSOR FOR PATTERN MATCHING IN A NETWORK MONITOR DEVICE

(75) Inventors: Haig A. Sarkissian, San Antonio, TX (US); Russell S. Dietz, San Jose, CA (US); Andrew A. Koppenhaver, Littleton, CO (US)

(73) Assignee: Hi/fn Inc., Los Gatos, CA (US)

( * ) Notice: Subject to any disclaimer, the term of this patent is extended or adjusted under 35 U.S.C. 154(b) by 746 days.

(21) Appl. No.: 10/828,776

(22) Filed: Apr. 20, 2004

(65) Prior Publication Data
US 2004/0199630 A1 Oct. 7, 2004

Related U.S. Application Data

(62) Division of application No. 09/608,267, filed on Jun. 30, 2000, now Pat. No. 6,789,116.

(60) Provisional application No. 60/141,903, filed on Jun. 30, 1999.

(51) Int. Cl.
*G06F 15/16* (2006.01)
(52) U.S. Cl. .................... 709/224; 712/223; 370/469
(58) Field of Classification Search ........ 709/200–202, 709/213, 220–224, 230, 238, 250; 712/1, 712/208, 223; 370/392, 469
See application file for complete search history.

(56) References Cited

U.S. PATENT DOCUMENTS 3,949,369 A   4/1976  Churchill, Jr. ............... 711/128

| 4,458,310 A | 7/1984 | Chang ........................ 711/119 |
| 4,504,907 A | 3/1985 | Manning et al. ............ 364/200 |
| 4,559,618 A | 12/1985 | Houseman et al. ........... 365/49 |
| 4,736,320 A | 4/1988 | Bristol ....................... 364/300 |
| 4,891,639 A | 1/1990 | Nakamura ............... 340/825.5 |
| 4,910,668 A | 3/1990 | Okamoto et al. ........... 711/207 |
| 4,972,453 A | 11/1990 | Daniel, III et al. .......... 379/10 |
| 5,043,873 A * | 8/1991 | Muramatsu et al. ........ 711/119 |
| 5,060,143 A | 10/1991 | Lee ............................. 364/200 |
| 5,101,402 A | 3/1992 | Chui et al. .................... 370/17 |

(Continued)

FOREIGN PATENT DOCUMENTS

JP    2003-44510 A    2/2003

OTHER PUBLICATIONS

"Technical Note: the Narus System," Downloaded Apr. 29, 1999 from www.narus.com, Narus Corporation, Redwood City California.

(Continued)

*Primary Examiner*—Moustafa Meky
(74) *Attorney, Agent, or Firm*—Dov Rosenfeld; Inventek

(57) ABSTRACT

A processor for processing contents of packets passing through a connection point on a computer network. The processor includes a searching apparatus having one or more comparators for searching for a reference string in the contents of a packet, and processes contents of all packets passing through the connection point in real time. In one implementation, the processor is programmable and has an instruction set that includes an instruction for invoking the searching apparatus to search for a specified reference string in the packet starting at an unknown location within a range of the packet.

4 Claims, 23 Drawing Sheets

U.S. PATENT DOCUMENTS

| | | |
|---|---|---|
| 5,247,517 A | 9/1993 | Ross et al. ................. 370/85.5 |
| 5,247,693 A | 9/1993 | Bristol ....................... 395/800 |
| 5,249,282 A | 9/1993 | Segers ........................ 395/425 |
| 5,315,580 A | 5/1994 | Phaal ........................... 370/13 |
| 5,339,268 A | 8/1994 | Machida ...................... 365/49 |
| 5,351,243 A | 9/1994 | Kalkunte et al. ............ 370/92 |
| 5,365,514 A | 11/1994 | Hershey et al. .............. 370/17 |
| 5,369,605 A | 11/1994 | Parks .................... 364/715.09 |
| 5,375,070 A | 12/1994 | Hershey et al. ............ 364/550 |
| 5,394,394 A | 2/1995 | Crowther et al. ............ 370/60 |
| 5,414,650 A | 5/1995 | Hekhuis ................ 364/715.02 |
| 5,414,704 A | 5/1995 | Spinney ....................... 370/60 |
| 5,422,626 A | 6/1995 | Fish ....................... 340/539.17 |
| 5,430,709 A | 7/1995 | Galloway ..................... 370/13 |
| 5,432,776 A | 7/1995 | Harper ......................... 370/17 |
| 5,493,689 A | 2/1996 | Waclawsky et al. ........ 395/821 |
| 5,500,855 A | 3/1996 | Hershey et al. .............. 370/17 |
| 5,511,215 A | 4/1996 | Terasaka et al. ............ 395/800 |
| 5,530,834 A | 6/1996 | Colloff et al. .............. 711/136 |
| 5,530,958 A | 6/1996 | Agarwal et al. ............... 711/3 |
| 5,535,338 A | 7/1996 | Krause et al. ........... 395/200.2 |
| 5,568,471 A | 10/1996 | Hershey et al. .............. 370/17 |
| 5,574,875 A | 11/1996 | Stansfield et al. .......... 395/403 |
| 5,586,266 A | 12/1996 | Hershey et al. ........ 395/200.11 |
| 5,586,288 A | 12/1996 | Dahlberg .................... 395/435 |
| 5,598,410 A | 1/1997 | Stone .......................... 370/469 |
| 5,606,668 A | 2/1997 | Shwed .................... 395/200.11 |
| 5,608,662 A | 3/1997 | Large et al. ........... 364/724.01 |
| 5,634,009 A | 5/1997 | Iddon et al. ........... 395/200.11 |
| 5,651,002 A | 7/1997 | Van Seters et al. ......... 370/392 |
| 5,680,585 A | 10/1997 | Bruell .......................... 703/26 |
| 5,684,954 A | 11/1997 | Kaiserswerth et al. ... 395/200.2 |
| 5,703,877 A | 12/1997 | Nuber et al. ................ 370/395 |
| 5,717,916 A | 2/1998 | Verma ........................ 395/607 |
| 5,720,032 A | 2/1998 | Picazo, Jr. et al. ....... 395/200.2 |
| 5,721,827 A | 2/1998 | Logan et al. ............... 709/217 |
| 5,732,213 A | 3/1998 | Gessel et al. .......... 395/200.11 |
| 5,740,355 A | 4/1998 | Watanabe et al. ...... 395/183.21 |
| 5,749,087 A | 5/1998 | Hoover et al. .............. 711/108 |
| 5,761,424 A | 6/1998 | Adams et al. ......... 395/200.47 |
| 5,761,429 A | 6/1998 | Thompson .................. 709/224 |
| 5,764,638 A | 6/1998 | Ketchum .................... 370/401 |
| 5,781,735 A | 7/1998 | Southard .............. 395/200.54 |
| 5,784,298 A | 7/1998 | Hershey et al. ............. 364/557 |
| 5,787,253 A | 7/1998 | McCreery et al. ..... 395/200.61 |
| 5,793,954 A | 8/1998 | Baker et al. ............. 395/200.8 |
| 5,799,154 A | 8/1998 | Kuriyan ...................... 709/223 |
| 5,802,054 A | 9/1998 | Bellenger ................... 370/401 |
| 5,805,808 A | 9/1998 | Hasani et al. ............ 395/200.2 |
| 5,812,529 A | 9/1998 | Czarnik et al. ............. 370/245 |
| 5,819,028 A | 10/1998 | Manghirmalani et al. ........................ 395/185.1 |
| 5,825,774 A | 10/1998 | Ready et al. ............... 370/401 |
| 5,826,096 A | 10/1998 | Baxter .................... 395/800.24 |
| 5,835,726 A | 11/1998 | Shwed et al. ........... 395/200.59 |
| 5,838,919 A | 11/1998 | Schwaller et al. ..... 395/200.54 |
| 5,841,895 A | 11/1998 | Huffman ..................... 382/155 |
| 5,850,386 A | 12/1998 | Anderson et al. ........... 370/241 |
| 5,850,388 A | 12/1998 | Anderson et al. ............. 37/252 |
| 5,862,335 A | 1/1999 | Welch, Jr. et al. ...... 395/200.54 |
| 5,878,420 A | 3/1999 | de la Salle .................. 707/10 |
| 5,893,155 A | 4/1999 | Cheriton .................... 711/144 |
| 5,903,754 A | 5/1999 | Pearson ...................... 395/680 |
| 5,917,821 A | 6/1999 | Gobuyan et al. ........... 370/392 |
| 6,003,123 A | 12/1999 | Carter et al. ................ 711/207 |
| 6,014,380 A | 1/2000 | Hendel et al. .............. 370/392 |
| 6,047,304 A * | 4/2000 | Ladwig et al. ............. 708/530 |
| 6,097,699 A | 8/2000 | Chen et al. ................. 370/231 |
| 6,101,554 A | 8/2000 | Creedon et al. ............ 709/253 |
| 6,115,393 A | 9/2000 | Engel et al. ................ 370/469 |
| 6,172,990 B1 * | 1/2001 | Deb et al. ................... 370/474 |
| 6,226,265 B1 | 5/2001 | Nakamichi et al. ......... 370/235 |
| 6,226,267 B1 | 5/2001 | Spinney et al. ............. 370/235 |
| 6,269,330 B1 | 7/2001 | Cidon et al. .................. 704/43 |
| 6,272,151 B1 | 8/2001 | Gupta et al. ................ 370/489 |
| 6,279,113 B1 | 8/2001 | Vaidya ........................ 713/201 |
| 6,282,570 B1 | 8/2001 | Leung et al. ............... 709/224 |
| 6,330,226 B1 | 12/2001 | Chapman et al. ........... 370/232 |
| 6,363,056 B1 | 3/2002 | Beigi et al. ................. 370/252 |
| 6,381,306 B1 | 4/2002 | Lawson et al. ............... 379/32 |
| 6,424,624 B1 | 7/2002 | Galand et al. .............. 370/231 |
| 6,430,184 B1 | 8/2002 | Robins et al. .............. 370/392 |
| 6,430,409 B1 | 8/2002 | Rossmann ............... 455/422.1 |
| 6,453,345 B2 | 9/2002 | Trcka et al. ................ 709/224 |
| 6,516,337 B1 | 2/2003 | Tripp et al. ................. 709/202 |
| 6,519,568 B1 | 2/2003 | Harvey et al. ................. 705/1 |
| 6,625,657 B1 | 9/2003 | Bullard ....................... 709/237 |
| 6,651,099 B1 | 11/2003 | Dietz et al. ................. 709/224 |
| 6,690,668 B1 | 2/2004 | Szczepanek et al. ........ 370/392 |

OTHER PUBLICATIONS

R. Periakaruppam and E. Nemeth. "GTrace-A Graphical Traceroute Tool." 1999 Usenix LISA. Available on www.caida.org, URL: http://www.caida.org/outreach/papers/1999/GTrace/GTrace.pdf.

W. Stallings, "Packet Filtering in the SNMP Remote Monitor." Nov. 1994. Available on www.ddj.com, URL: http://www.ddj.com/documents/s=1013/ddj9411h/9411h.htm.

Advanced Methods for Storage and Retrieval in Image; http://www.cs.tulane.edu/ww/Prototype/proposal.html; 1998.

Measurement and Analysis of the Digital DECT Propagation Channel; IEEE; 1998.

"NetFlow Services and Applications," Cisco White Paper, Mar. 1999, pp. 1-27, Cisco Systems, Inc. San Jose, CA.

N. Brownlee, C. Mills and G. Ruth "Traffic Flow Measurement: Architecture," IETF Standard-Working-Draft, Internet Engineering Task Force, IETF, CH, vol. RTFM, No. 7, Jun. 1999.

Rona J. Prufer, "Network Advisor Protocol Analysis: Decodes," Hewlett-Packard Journal, Hewlett-Packard Co. Palo Alto, CA, vol. 43, No. 5, Oct. 1, 1992, pp. 34-40.

Walter Gora, "Universal Network Monitoring based on FAN.1," Raviv J. International Council For Computer Communication, Computer Communication Technologies For The 90's, Tel Aviv, Oct. 30-Nov. 3, 1988, Proc. Of The International Conference On Computer Communication, Amsterdam, Elsevier, NL, conf. 9, Oct. 30, 1988, pp. 104-114.

G. Giacolone, R. Busch, F. Creed, A. Davidovich, S. Divakaruni, C. Drake, C. Ematrudo, J. Fifield, M. Hodges, W. Howell, P. Jenkins, M. Kozyrczak, C. Miller, T. Obremski, C. Reed, G. Rohrbaugh, M. Vincent, T. von Reyn and J. Zimmermann, "A 1MB, 100MHz Integrated L2 Cache Memory with 128b Interface and ECC Protection," Solid-State Circuits Conference, 1996. Digest of Technical Papers, 42$^{nd}$ ISSCC., 1996 IEEE International, San Francisco, CA, Feb. 8-10, 1996, New York, NY, IEEE, US, Feb. 8, 1996, pp. 370-371, 475.

David C. Feldmeier, "Improving Gateway Performance With A Routing-Table Cache," Networks: Evolution Or Revolution? New Orleans, Mar. 27-31, 1988, Proceedings of the Annual Joint Conference of the Computer and Communications Societies. (Infocom), New York, IEEE, US, conf. 7, Mar. 27, 1988, pp. 306-307.

J.K. Peir, W.W. Hsu, H. Young and S. Ong, "Fast Cache Access with Full-Map Block Directory," Proceedings of the 1997 IEEE International Conference on Computer Design: VLSI In Computers and Processors, 1997, ICCD '97, Austin, TX, Oct. 12-15, 1997, Los Alamitos, CA, IEEE Computer Society, Oct. 12, 1997, pp. 578-579.

J.H. Park and K.M. George. "Efficient Parallel Hardware Algorithms For String Matching," Microprocessors and Microsystems, IPC Business Press Ltd., London, GB, vol. 23, No. 3, Oct. 1, 1999, pp. 155-168.

Andrew S. Tanenbaum, "Computer Networks" Third Edition, Prentice-Hall, Inc. 1996, section 1.4, pp. 28-44.

* cited by examiner

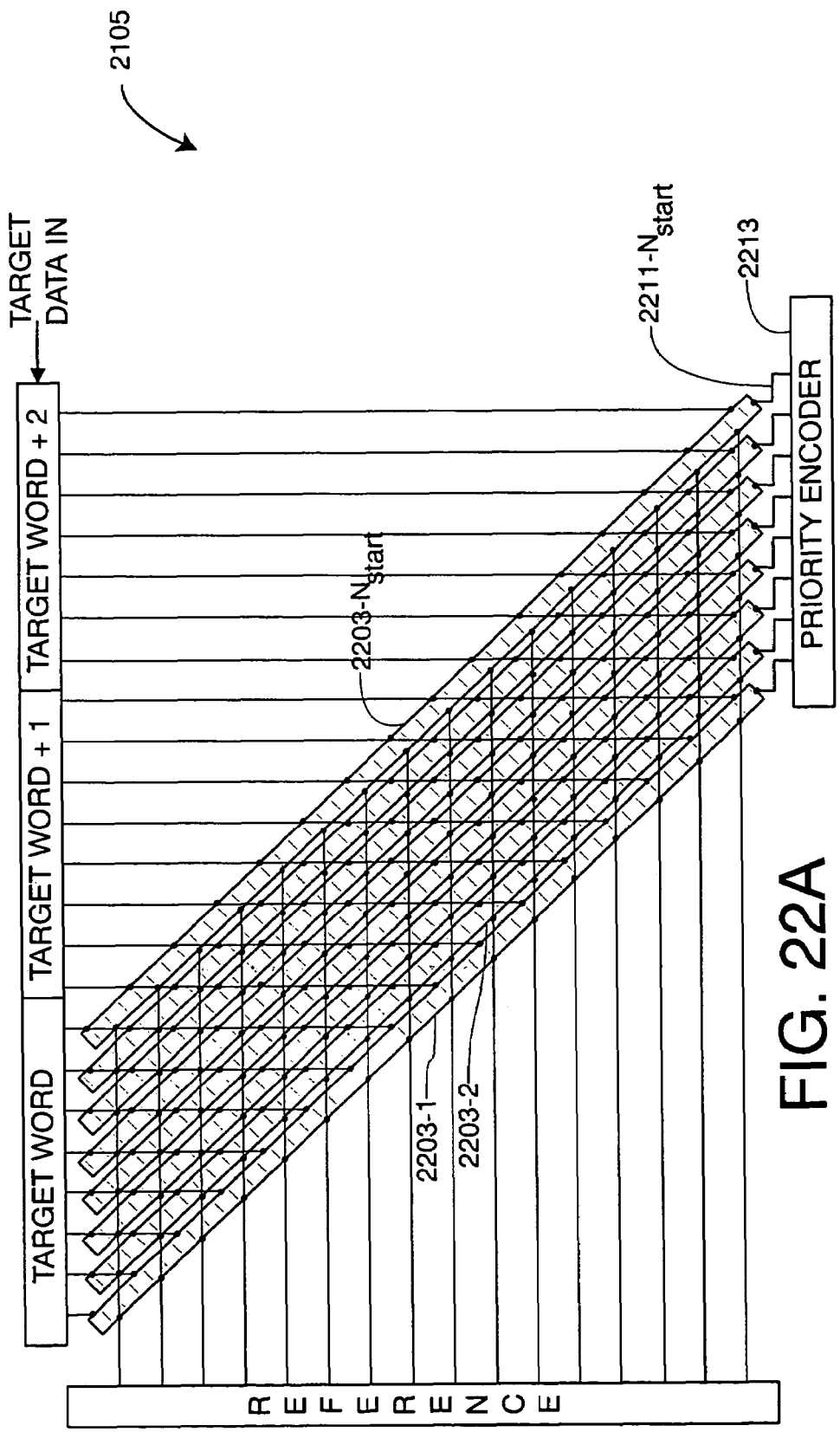
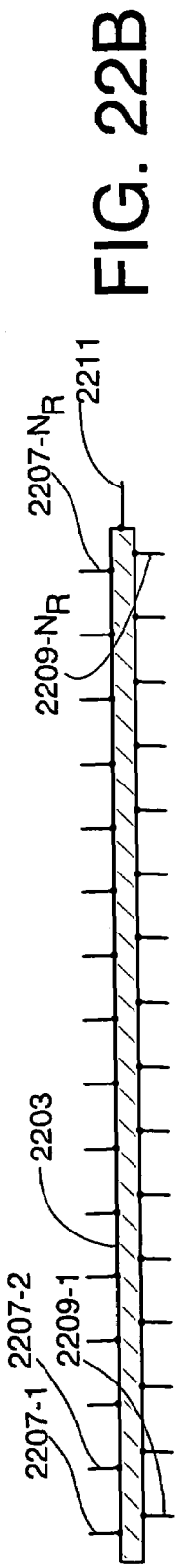
FIG. 22A
FIG. 22B

STATE PROCESSOR FOR PATTERN MATCHING IN A NETWORK MONITOR DEVICE

CROSS-REFERENCE TO RELATED APPLICATION

This application is a division of U.S. application Ser. No. 09/608,267 for STATE PROCESSOR FOR PATTERN MATCHING IN A NETWORK MONITOR DEVICE to inventors Sarkissian, et al., filed Jun. 30, 2000 now U.S. Pat. No. 6,789,116.

U.S. application Ser. No. 09/608,267 claims the benefit of U.S. Provisional Patent Application Ser. No.: 60/141,903 for METHOD AND APPARATUS FOR MONITORING TRAFFIC IN A NETWORK to inventors Dietz, et al., filed Jun. 30, 1999, the contents of which are incorporated herein by reference.

U.S. application Ser. No. 09/608,267 is related to the following U.S. patent applications, each filed concurrently with that application and each assigned to Apptitude, Inc., the assignee of the present invention:

U.S. patent application Ser. No. 09/608,237 for METHOD AND APPARATUS FOR MONITORING TRAFFIC IN A NETWORK, to inventors Dietz, et al., filed Jun. 30, 2000, and incorporated herein by reference.

U.S. patent application Ser. No. 09/609,179 for PROCESSING PROTOCOL SPECIFIC INFORMATION IN PACKETS SPECIFIED BY A PROTOCOL DESCRIPTION LANGUAGE, to inventors Koppenhaver, et al., filed Jun. 30, 2000, and incorporated herein by reference.

U.S. patent application Ser. No. 09/608,126 for RE-USING INFORMATION FROM DATA TRANSACTIONS FOR MAINTAINING STATISTICS IN NETWORK MONITORING, to inventors Dietz, et al., filed Jun. 30, 2000, and incorporated herein by reference.

U.S. patent application Ser. No. 09/608,266 for ASSOCIATIVE CACHE STRUCTURE FOR LOOKUPS AND UPDATES OF FLOW RECORDS IN A NETWORK MONITOR, to inventors Sarkissian, et al., filed Jun. 30, 2000, and incorporated herein by reference.

FIELD OF INVENTION

The present invention relates to computer networks, specifically to the real-time elucidation of packets communicated within a data network, including classification according to protocol and application program.

BACKGROUND

There has long been a need for network activity monitors. This need has become especially acute, however, given the recent popularity of the Internet and other interconnected networks. In particular, there is a need for a real-time network monitor that can provide details as to the application programs being used. Such a monitor should enable non-intrusive, remote detection, characterization, analysis, and capture of all information passing through any point on the network (i.e., of all packets and packet streams passing through any location in the network). Not only should all the packets be detected and analyzed, but for each of these packets the network monitor should determine the protocol (e.g., http, ftp, H.323, VPN, etc.), the application/use within the protocol (e.g., voice, video, data, real-time data, etc.), and an end user's pattern of use within each application or the application context (e.g., options selected, service delivered, duration, time of day, data requested, etc.). Also, the network monitor should not be reliant upon server resident information such as log files. Rather, it should allow a user such as a network administrator or an Internet service provider (ISP) the means to measure and analyze network activity objectively; to customize the type of data that is collected and analyzed; to undertake real time analysis; and to receive timely notification of network problems.

Related and incorporated by reference U.S. patent application Ser. No. 09/608,237 for METHOD AND APPARATUS FOR MONITORING TRAFFIC IN A NETWORK, to inventors Dietz, et al, describes a network monitor that includes carrying out protocol specific operations on individual packets including extracting information from header fields in the packet to use for building a signature for identifying the conversational flow of the packet and for recognizing future packets as belonging to a previously encountered flow. A parser subsystem includes a parser for recognizing different patterns in the packet that identify the protocols used. For each protocol recognized, a slicer extracts important packet elements from the packet. These form a signature (i.e., key) for the packet. The slicer also preferably generates a hash for rapidly identifying a flow that may have this signature from a database of known flows.

The flow signature of the packet, the hash and at least some of the payload are passed to an analyzer subsystem. In a hardware embodiment, the analyzer subsystem includes a unified flow key buffer (UFKB) for receiving parts of packets from the parser subsystem and for storing signatures in process, a lookup/update engine (LUE) to lookup a database of flow records for previously encountered conversational flows to determine whether a signature is from an existing flow, a state processor (SP) for performing state processing, a flow insertion and deletion engine (FIDE) for inserting new flows into the database of flows, a memory for storing the database of flows, and a cache for speeding up access to the memory containing the flow database. The LUE, SP, and FIDE are all coupled to the UFKB, and to the cache.

Each flow-entry includes one or more statistical measures, e.g., the packet count related to the flow, the time of arrival of a packet, the time differential.

In the preferred hardware embodiment, each of the LUE, state processor, and FIDE operate independently from the other two engines. The state processor performs one or more operations specific to the state of the flow.

The state processor analyzes both new and existing flows in order to classify them by application. It does this by proceeding from state to state based on rules defined by the engineer. A rule is a test followed by the next state to proceed to if the test is true. The state processor goes through each rule until the test is true or there are no more tests to perform. The state processor starts the process by using the last protocol recognized by parser subsystem as an offset into a jump table (the jump vector). The jump table takes us to the instructions to use for that protocol. Most instructions test something in the unified flow key buffer or the flow-entry if it exists. The state processor may have to test bits, do comparisons, add or subtract to perform the test.

One of the common operations that may be require of a state processor is to search the contents of a packet for the existence of one of a set of known strings. Such identification may be useful for furthering the process of identifying the application content of a conversational flow. For example, it may be desired to search for the uniform resource locator (URL) of packets related to the http protocol, or there may be a need to search for particular strings that identify protocols or aspects of protocols, for example, the strings "port", "get", "post," and so forth. Any of these strings may be in a packet, and which string and wherein the packet the string resides is often unknown.

In most common processing systems, the set of instructions implemented are general purpose in nature. All processing systems have a typical set of instructions related to the analysis and manipulation of the Instruction and program counters. These instructions include Jump, Call and Return. In addition, these same processing systems contain the appropriate instructions to analyze and manipulate registers and memory locations. These instructions include Increment, Decrement and Move, Compare and Logical manipulation.

While a state processor can includes such a basic set of standard instructions, implementing searches for known for one or more known strings in a target data stream may take too long using such a set of standard instructions in order to accommodate the high speed of packet arrival. It is therefore desirable to have a processor that can perform some specific search functions that are required to evaluate the content of and data within packets on networks extremely rapidly.

Specifically, there is a need for a searching apparatus that may be part of the state processor and that can rapidly search a target data stream for a specified reference string. Furthermore, there is a need for a programmable processor that includes instructions that invoke the searching apparatus to perform such a search.

Using such a processor in a network monitor enables the monitor to scale and meet any network speed requirements.

SUMMARY

Disclosed herein is a processor for processing contents of packets passing through a connection point on a computer network. The processor includes a searching apparatus having one or more comparators for searching for a reference string in the contents of a packet, and processes contents of all packets passing through the connection point in real time. In one implementation, the processor is programmable and has an instruction set that includes an instruction for invoking the searching apparatus to search for a specified reference string in the packet starting at an unknown location within a range of the packet.

Embodiments of searching apparatus that can be used in the processor also are disclosed. The searching apparatus is configured to search for a reference string of $N_R$ units in target data starting from any of a set of starting positions within the target data. The searching apparatus includes a reference register configured to receive the $N_R$ units of a reference string, one or more target data registers coupled in series to receive the target data; and, a plurality of comparator sets, one comparator set corresponding to each of the starting positions. The comparator set of a particular starting position is coupled to each unit of the reference register and to $N_R$ units of the target data registers starting from the particular starting position and comparing the reference register contents to corresponding contents of $N_R$ contiguous units of the target data registers starting from the particular starting position. Each comparator set indicates if there is a match of the first reference string in the target data starting from its corresponding different starting position. The first plurality of comparator sets indicates in parallel if the first reference string is contained in the target data registers starting at any of the starting positions.

BRIEF DESCRIPTION OF THE DRAWINGS

Although the present invention is better understood by referring to the detailed preferred embodiments, these should not be taken to limit the present invention to any specific embodiment because such embodiments are provided only for the purposes of explanation. The embodiments, in turn, are explained with the aid of the following figures.

FIG. 22A is a block diagram of the search engine core; FIG. 22B shows a comparator component of the core that compares a plurality of inputs to another plurality of inputs.

DETAILED DESCRIPTION OF THE PREFERRED EMBODIMENTS

Note that this document includes hardware diagrams and descriptions that may include signal names. In most cases, the names are sufficiently descriptive, in other cases however the signal names are not needed to understand the operation and practice of the invention.

Operation in a Network

Figure 1:
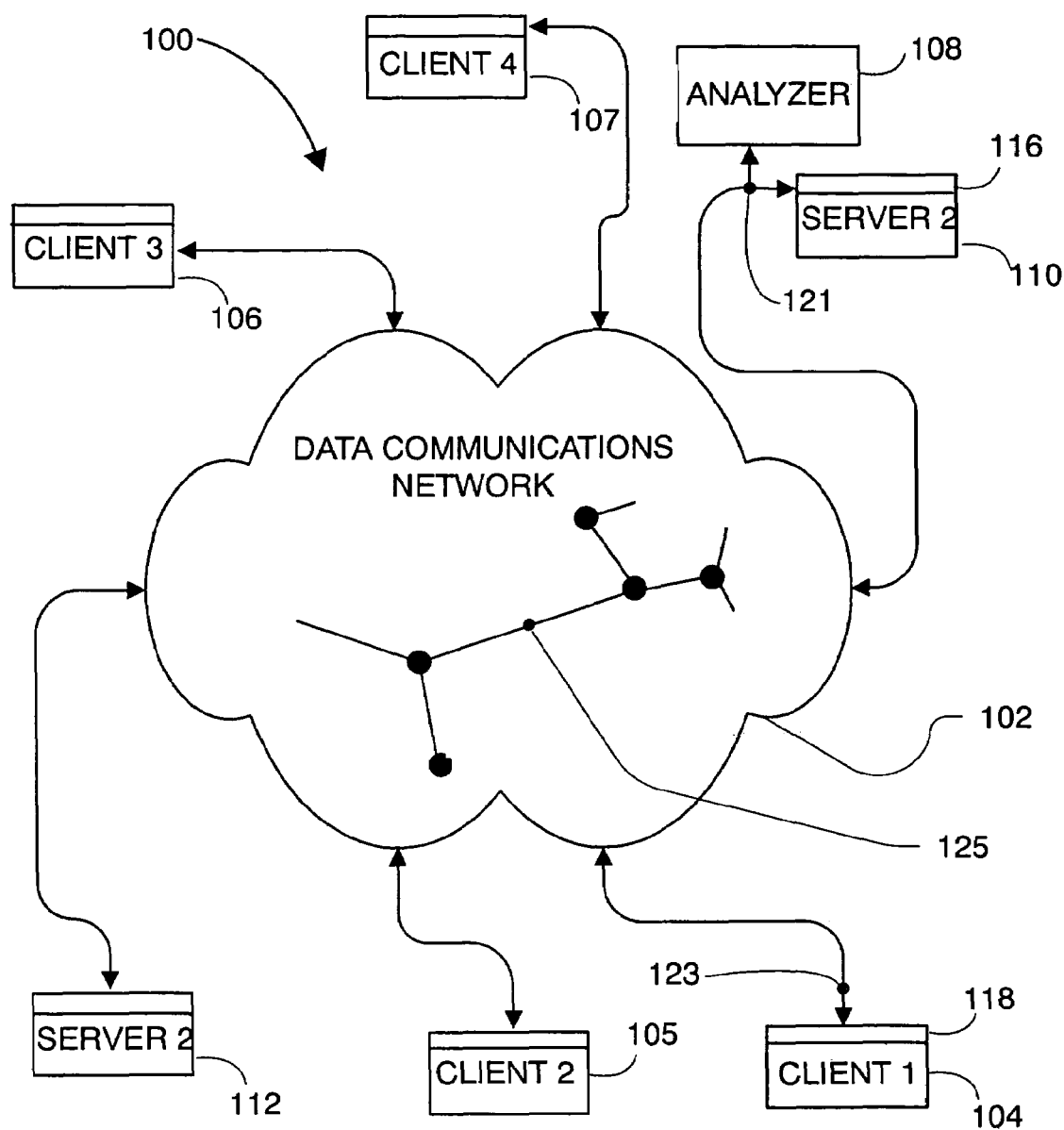
FIG. 1 is a functional block diagram of a network embodiment of the present invention in which a monitor is connected to analyze packets passing at a connection point.

FIG. 1 represents a system embodiment of the present invention that is referred to herein by the general reference numeral 100. The system 100 has a computer network 102 that communicates packets (e.g., IP datagrams) between various computers, for example between the clients 104-107 and servers 110 and 112. The network is shown schematically as a cloud with several network nodes and links shown in the interior of the cloud. A monitor 108 examines the packets passing in either direction past its connection point 121 and, according to one aspect of the invention, can elucidate what application programs are associated with each packet. The monitor 108 is shown examining packets (i.e., datagrams) between the network interface 116 of the server 110 and the network. The monitor can also be placed at other points in the network, such as connection point 123 between the network 102 and the interface 118 of the client 104, or some other location, as indicated schematically by connection point 125 somewhere in network 102. Not shown is a network packet acquisition device at the location 123 on the network for converting the physical information on the network into packets for input into monitor 108. Such packet acquisition devices are common.

Various protocols may be employed by the network to establish and maintain the required communication, e.g., TCP/IP, etc. Any network activity—for example an application program run by the client 104 (CLIENT 1) communicating with another running on the server 110 (SERVER 2)—will produce an exchange of a sequence of packets over network 102 that is characteristic of the respective programs and of the network protocols. Such characteristics may not be completely revealing at the individual packet level. It may require the analyzing of many packets by the monitor 108 to have enough information needed to recognize particular application programs. The packets may need to be parsed then analyzed in the context of various protocols, for example, the transport through the application session layer protocols for packets of a type conforming to the ISO layered network model.

Communication protocols are layered, which is also referred to as a protocol stack. The ISO (International Standardization Organization) has defined a general model that provides a framework for design of communication protocol layers. This model, shown in table from below, serves as a basic reference for understanding the functionality of existing communication protcols.

| Layer | Functionality | Example |
|---|---|---|
| 7 | Application | Telnet, NFS, Novell NCP, HTTP, H.323 |
| 6 | Presentation | XDR |
| 5 | Session | RPC, NETBIOS, SNMP, etc. |
| 4 | Transport | TCP, Novel SPX, UDP, etc. |
| 3 | Network | IP, Novell IPX, VIP, AppleTalk, etc. |
| 2 | Data Link | Network Interface Card (Hardware Interface). MAC layer |
| 1 | Physical | Ethernet, Token Ring, Frame Relay, ATM, T1 (Hardware Connection) |

Different communication protocols employ different levels of the ISO model or may use a layered model that is similar to but which does not exactly conform to the ISO model. A protocol in a certain layer may not be visible to protocols employed at other layers. For example, an application (Level 7) may not be able to identify the source computer for a communication attempt (Levels 2-3).

In some communication arts, the term "frame" generally refers to encapsulated data at OSI layer 2, including a destination address, control bits for flow control, the data or payload, and CRC (cyclic redundancy check) data for error checking. The term "packet" generally refers to encapsulated data at OSI layer 3. In the TCP/IP world, the term "datagram" is also used. In this specification, the term "packet" is intended to encompass packets, datagrams, frames, and cells. In general, a packet format or frame format refers to how data is encapsulated with various fields and headers for transmission across a network. For example, a data packet typically includes an address destination field, a length field, an error correcting code (ECC) field, or cyclic redundancy check (CRC) field, as well as headers and footers to identify the beginning and end of the packet. The terms "packet format" and "frame format," also referred to as "cell format," are generally synonymous.

Monitor 108 looks at every packet passing the connection point 121 for analysis. However, not every packet carries the same information useful for recognizing all levels of the protocol. For example, in a conversational flow associated with a particular application, the application will cause the server to send a type-A packet, but so will another. If, though, the particular application program always follows a type-A packet with the sending of a type-B packet, and the other application program does not, then in order to recognize packets of that application's conversational flow, the monitor can be available to recognize packets that match the type-B packet to associate with the type-A packet. If such is recognized after a type-A packet, then the particular application program's conversational flow has started to reveal itself to the monitor 108.

Further packets may need to be examined before the conversational flow can be identified as being associated with the application program. Typically, monitor 108 is simultaneously also in partial completion of identifying other packet exchanges that are parts of conversational flows associated with other applications. One aspect of monitor 108 is its ability to maintain the state of a flow. The state of a flow is an indication of all previous events in the flow that lead to recognition of the content of all the protocol levels, e.g., the ISO model protocol levels. Another aspect of the invention is forming a signature of extracted characteristic portions of the packet that can be used to rapidly identify packets belonging to the same flow.

In real-world uses of the monitor 108, the number of packets on the network 102 passing by the monitor 108's connection point can exceed a million per second. Consequently, the monitor has very little time available to analyze and type each packet and identify and maintain the state of the flows passing through the connection point. The monitor 108 therefore masks out all the unimportant parts of each packet that will not contribute to its classification. However, the parts to mask-out will change with each packet depending on which flow it belongs to and depending on the state of the flow.

The recognition of the packet type, and ultimately of the associated application programs according to the packets that their executions produce, is a multi-step process within the monitor 108. At a first level, for example, several application programs will all produce a first kind of packet. A first "signature" is produced from selected parts of a packet that will allow monitor 108 to identify efficiently any packets that belong to the same flow. In some cases, that packet type may be sufficiently unique to enable the monitor to identify the application that generated such a packet in the conversational flow. The signature can then be used to efficiently identify all future packets generated in traffic related to that application.

In other cases, that first packet only starts the process of analyzing the conversational flow, and more packets are necessary to identify the associated application program. In such a case, a subsequent packet of a second type—but that potentially belongs to the same conversational flow—is recognized by using the signature. At such a second level, then, only a few of those application programs will have conversational flows that can produce such a second packet type. At this level in the process of classification, all application programs that are not in the set of those that lead to such a sequence of packet types may be excluded in the process of classifying the conversational flow that includes these two packets. Based on the known patterns for the protocol and for the possible applications, a signature is produced that allows recognition of any future packets that may follow in the conversational flow.

It may be that the application is now recognized, or recognition may need to proceed to a third level of analysis using the second level signature. For each packet, therefore, the monitor parses the packet and generates a signature to determine if this signature identified a previously encountered flow, or shall be used to recognize future packets belonging to the same conversational flow. In real time, the packet is further analyzed in the context of the sequence of previously encountered packets (the state), and of the possible future sequences such a past sequence may generate in conversational flows associated with different applications. A new signature for recognizing future packets may also be generated. This process of analysis continues until the applications are identified. The last generated signature may then be used to efficiently recognize future packets associated with the same conversational flow. Such an arrangement makes it possible for the monitor 108 to cope with millions of packets per second that must be inspected.

Another aspect of the invention is adding Eavesdropping. In alternative embodiments of the present invention capable of eavesdropping, once the monitor 108 has recognized the executing application programs passing through some point in the network 102 (for example, because of execution of the applications by the client 105 or server 110), the monitor sends a message to some general purpose processor on the network that can input the same packets from the same location on the network, and the processor then loads its own executable copy of the application program and uses it to read the content being exchanged over the network. In other words, once the monitor 108 has accomplished recognition of the application program, eavesdropping can commence.

The Network Monitor

Figure 3:
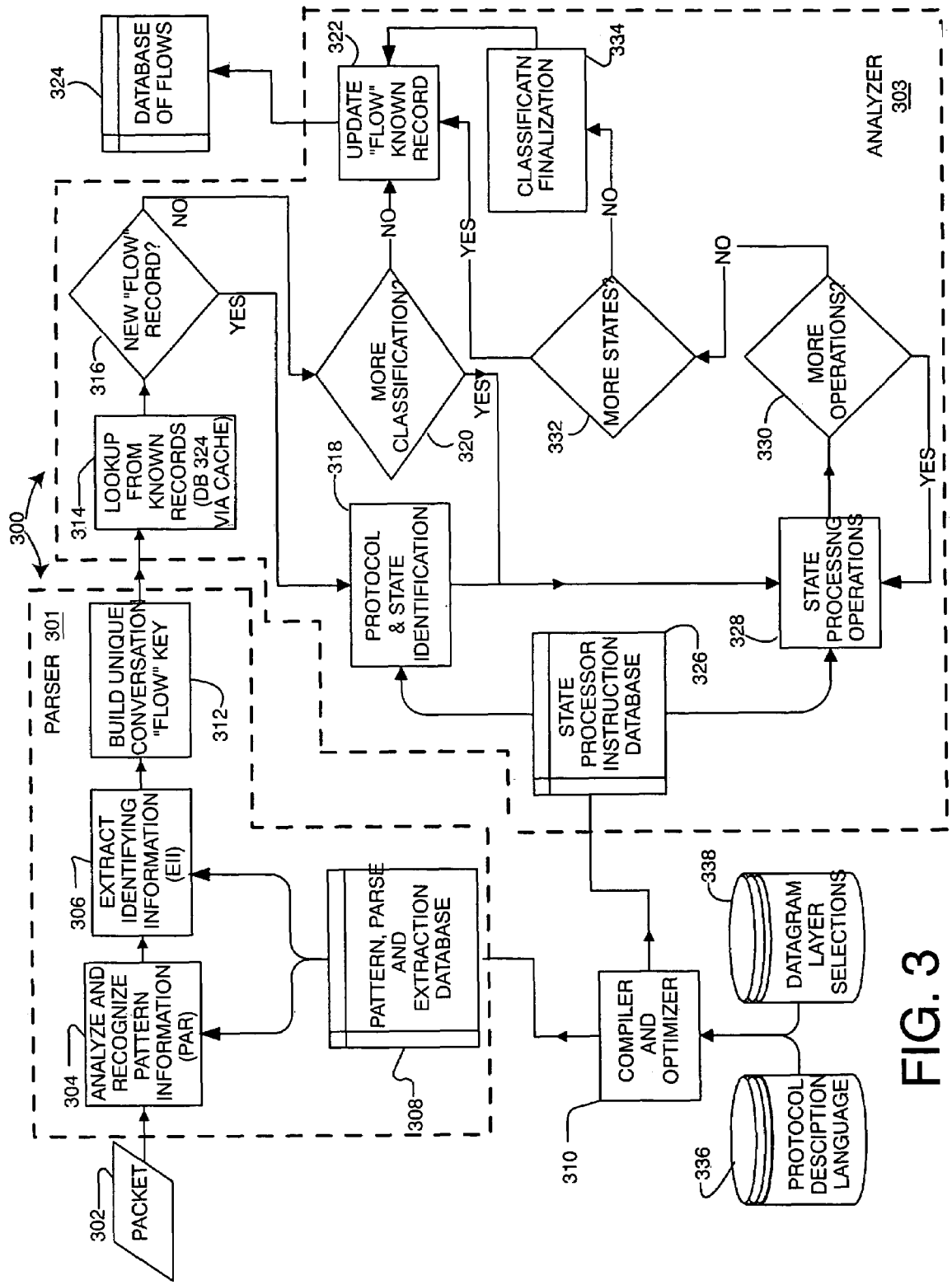
FIG. 3 is a functional block diagram of a process embodiment of the present invention that can operate as the packet monitor shown in FIG. 1. This process may be implemented in software or hardware.

FIG. 3 shows a network packet monitor 300, in an embodiment of the present invention that can be implemented with computer hardware and/or software. The system 300 is similar to monitor 108 in FIG. 1. A packet 302 is examined, e.g., from a packet acquisition device at the location 121 in network 102 (FIG. 1), and the packet evaluated, for example in an attempt to determine its characteristics, e.g., all the protocol information in a multilevel model, including what server application produced the packet.

The packet acquisition device is a common interface that converts the physical signals and then decodes them into bits, and into packets, in accordance with the particular network (Ethernet, frame relay, ATM, etc.). The acquisition device indicates to the monitor 108 the type of network of the acquired packet or packets.

Aspects shown here include: (1) the initialization of the monitor to generate what operations need to occur on packets of different types—accomplished by compiler and optimizer 310, (2) the processing—parsing and extraction of selected portions—of packets to generate an identifying signature—accomplished by parser subsystem 301, and (3) the analysis of the packets—accomplished by analyzer 303.

The purpose of compiler and optimizer 310 is to provide protocol specific information to parser subsystem 301 and to analyzer subsystem 303. The initialization occurs prior to operation of the monitor, and only needs to re-occur when new protocols are to be added.

A flow is a stream of packets being exchanged between any two addresses in the network. For each protocol there are known to be several fields, such as the destination (recipient), the source (the sender), and so forth, and these and other fields are used in monitor 300 to identify the flow. There are other fields not important for identifying the flow, such as checksums, and those parts are not used for identification.

Parser subsystem 301 examines the packets using pattern recognition process 304 that parses the packet and determines the protocol types and associated headers for each protocol layer that exists in the packet 302. An extraction process 306 in parser subsystem 301 extracts characteristic portions (signature information) from the packet 302. Both the pattern information for parsing and the related extraction operations, e.g., extraction masks, are supplied from a parsing-pattern-structures and extraction-operations database (parsing/extractions database) 308 filled by the compiler and optimizer 310.

The protocol description language (PDL) files 336 describes both patterns and states of all protocols that an occur at any layer, including how to interpret header information, how to determine from the packet header information the protocols at the next layer, and what information to extract for the purpose of identifying a flow, and ultimately, applications and services. The layer selections database 338 describes the particular layering handled by the monitor. That is, what protocols run on top of what protocols at any layer level. Thus 336 and 338 combined describe how one would decode, analyze, and understand the information in packets, and, furthermore, how the information is layered. This information is input into compiler and optimizer 310.

When compiler and optimizer 310 executes, it generates two sets of internal data structures. The first is the set of parsing/extraction operations 308. The pattern structures include parsing information and describe what will be recognized in the headers of packets; the extraction operations are what elements of a packet are to be extracted from the packets based on the patterns that get matched. Thus, database 308 of parsing/extraction operations includes information describing how to determine a set of one or more protocol dependent extraction operations from data in the packet that indicate a protocol used in the packet.

The other internal data structure that is built by compiler 310 is the set of state patterns and processes 326. These are the different states and state transitions that occur in different conversational flows, and the state operations that need to be performed (e.g., patterns that need to be examined and new signatures that need to be built) during any state of a conversational flow to further the task of analyzing the conversational flow.

Thus, compiling the PDL files and layer selections provides monitor 300 with the information it needs to begin processing packets. In an alternate embodiment, the contents of one or more of databases 308 and 326 may be manually or otherwise generated. Note that in some embodiments the layering selections information is inherent rather than explicitly described. For example, since a PDL file for a protocol includes the child protocols, the parent protocols also may be determined.

In the preferred embodiment, the packet 302 from the acquisition device is input into a packet buffer. The pattern recognition process 304 is carried out by a pattern analysis and recognition (PAR) engine that analyzes and recognizes patterns in the packets. In particular, the PAR locates the next protocol field in the header and determines the length of the header, and may perform certain other tasks for certain types of protocol headers. An example of this is type and length comparison to distinguish an IEEE 802.3 (Ethernet) packet from the older type 2 (or Version 2) Ethernet packet, also called a DIGITAL-Intel-Xerox (DIX) packet. The PAR also uses the pattern structures and extraction operations database 308 to identify the next protocol and parameters associated with that protocol that enables analysis of the next protocol layer. Once a pattern or a set of patterns has been identified, it/they will be associated with a set of none or more extraction operations. These extraction operations (in the form of commands and associated parameters) are passed to the extraction process 306 implemented by an extracting and information identifying (EII) engine that extracts selected parts of the packet, including identifying information from the packet as required for recognizing this packet as part of a flow. The extracted information is put in sequence and then processed in block 312 to build a unique flow signature (also called a "key") for this flow. A flow signature depends on the protocols used in the packet. For some protocols, the extracted components may include source and destination addresses. For example, Ethernet frames have end-point addresses that are useful in building a better flow signature. Thus, the signature typically includes the client and server address pairs. The signature is used to recognize further packets that are or may be part of this flow.

In the preferred embodiment, the building of the flow key includes generating a hash of the signature using a hash function. The purpose if using such a hash is conventional—to spread flow-entries identified by the signature across a database for efficient searching. The hash generated is preferably based on a hashing algorithm and such hash generation is known to those in the art.

In one embodiment, the parser passes data from the packet—a parser record—that includes the signature (i.e., selected portions of the packet), the hash, and the packet itself to allow for any state processing that requires further data from the packet. An improved embodiment of the parser subsystem might generate a parser record that has some predefined structure and that includes the signature, the hash, some flags related to some of the fields in the parser record, and parts of the packet's payload that the parser subsystem has determined might be required for further processing, e.g., for state processing.

Note that alternate embodiments may use some function other than concatenation of the selected portions of the packet to make the identifying signature. For example, some "digest function" of the concatenated selected portions may be used.

The parser record is passed onto lookup process 314 which looks in an internal data store of records of known flows that the system has already encountered, and decides (in 316) whether or not this particular packet belongs to a known flow as indicated by the presence of a flow-entry matching this flow in a database of known flows 324. A record in database 324 is associated with each encountered flow.

The parser record enters a buffer called the unified flow key buffer (UFKB). The UFKB stores the data on flows in a data structure that is similar to the parser record, but that includes a field that can be modified. In particular, one or the UFKB record fields stores the packet sequence number, and another is filled with state information in the form of a program counter for a state processor that implements state processing 328.

The determination (316) of whether a record with the same signature already exists is carried out by a lookup engine (LUE) that obtains new UFKB records and uses the hash in the UFKB record to lookup if there is a matching known flow. In the particular embodiment, the database of known flows 324 is in an external memory. A cache is associated with the database 324. A lookup by the LUE for a known record is carried out by accessing the cache using the hash, and if the entry is not already present in the cache, the entry is looked up (again using the hash) in the external memory.

The flow-entry database 324 stores flow-entries that include the unique flow-signature, state information, and extracted information from the packet for updating flows, and one or more statistical about the flow. Each entry completely describes a flow. Database 324 is organized into bins that contain a number, denoted N, of flow-entries (also called flow-entries, each a bucket), with N being 4 in the preferred embodiment. Buckets (i.e., flow-entries) are accessed via the hash of the packet from the parser sub-system 301 (i.e., the hash in the UFKB record). The hash spreads the flows across the database to allow for fast lookups of entries, allowing shallower buckets. The designer selects the bucket depth N based on the amount of memory attached to the monitor, and the number of bits of the hash data value used. For example, in one embodiment, each flow-entry is 128 bytes long, so for 128K flow-entries, 16 Mbytes are required. Using a 16-bit hash gives two flow-entries per bucket. Empirically, this has been shown to be more than adequate for the vast majority of cases. Note that another embodiment uses flow-entries that are 256 bytes long.

Herein, whenever an access to database 324 is described, it is to be understood that the access is via the cache, unless otherwise stated or clear from the context.

If there is no flow-entry found matching the signature, i.e., the signature is for a new flow, then a protocol and state identification process 318 further determines the state and protocol. That is, process 318 determines the protocols and where in the state sequence for a flow for this protocol's this packet belongs. Identification process 318 uses the extracted information and makes reference to the database 326 of state patterns and processes. Process 318 is then followed by any state operations that need to be executed on this packet by a state processor 328.

If the packet is found to have a matching flow-entry in the database 324 (e.g., in the cache), then a process 320 determines, from the looked-up flow-entry, if more classification by state processing of the flow signature is necessary. If not, a process 322 updates the flow-entry in the flow-entry database 324 (e.g., via the cache). Updating includes updating one or more statistical measures stored in the flow-entry. In our embodiment, the statistical measures are stored in counters in the flow-entry.

If state processing is required, state process 328 is commenced. State processor 328 carries out any state operations specified for the state of the flow and updates the state to the next state according to a set of state instructions obtained form the state pattern and processes database 326.

The state processor 328 analyzes both new and existing flows in order to analyze all levels of the protocol stack, ultimately classifying the flows by application (level 7 in the ISO model). It does this by proceeding from state-to-state based on predefined state transition rules and state operations as specified in state processor instruction database 326. A state transition rule is a rule typically containing a test followed by the next-state to proceed to if the test result is true. An operation is an operation to be performed while the state processor is in a particular state—for example, in order to evaluate a quantity needed to apply the state transition rule. The state processor goes through each rule and each state process until the test is true, or there are no more tests to perform.

In general, the set of state operations may be none or more operations on a packet, and carrying out the operation or operations may leave one in a state that causes exiting the system prior to completing the identification, but possibly knowing more about what state and state processes are needed to execute next, i.e., when a next packet of this flow is encountered. As an example, a state process (set of state operations) at a particular state may build a new signature for future recognition packets of the next state.

By maintaining the state of the flows and knowing that new flows may be set up using the information from previously encountered flows, the network traffic monitor 300 provides for (a) single-packet protocol recognition of flows, and (b) multiple-packet protocol recognition of flows. Monitor 300 can even recognize the application program from one or more disjointed sub-flows that occur in server announcement type flows. What may seem to prior art monitors to be some unassociated flow, may be recognized by the inventive monitor using the flow signature to be a sub-flow associated with a previously encountered sub-flow.

Thus, state processor 328 applies the first state operation to the packet for this particular flow-entry. A process 330 decides if more operations need to be performed for this state. If so, the analyzer continues looping between block 330 and 328 applying additional state operations to this particular packet until all those operations are completed—that is, there are no more operations for this packet in this state. A process 332 decides if there are further states to be analyzed for this type of flow according to the state of the flow and the protocol, in order to fully characterize the flow. If not, the conversational flow has now been fully characterized and a process 334 finalizes the classification of the conversational flow for the flow.

In the particular embodiment, the state processor 328 starts the state processing by using the last protocol recognized by the parser as an offset into a jump table (jump vector). The jump table finds the state processor instructions to use for that protocol in the state patterns and processes database 326. Most instructions test something in the unified flow key buffer, or the flow-entry in the database of known flows 324, if the entry exists. The state processor may have to test bits, do comparisons, add, or subtract to perform the test. For example, a common operation carried out by the state processor is searching for one or more patterns in the payload part of the UFKB.

Thus, in 332 in the classification, the analyzer decides whether the flow is at an end state. If not at an end state, the flow-entry is updated (or created if a new flow) for this flow-entry in process 322.

Furthermore, if the flow is known and if in 332 it is determined that there are further states to be processed using later packets, the flow-entry is updated in process 322.

The flow-entry also is updated after classification finalization so that any further packets belonging to this flow will be readily identified from their signature as belonging to this fully analyzed conversational flow.

After updating, database 324 therefore includes the set of all the conversational flows that have occurred.

Thus, the embodiment of present invention shown in FIG. 3 automatically maintains flow-entries, which in one aspect includes storing states. The monitor of FIG. 3 also generates characteristic parts of packets—the signatures—that can be used to recognize flows. The flow-entries may be identified and accessed by their signatures. Once a packet is identified to be from a known flow, the state of the flow is known and this knowledge enables state transition analysis to be performed in real time for each different protocol and application. In a complex analysis, state transitions are traversed as more and more packets are examined. Future packets that are part of the same conversational flow have their state analysis continued from a previously achieved state. When enough packets related to an application of interest have been processed, a final recognition state is ultimately reached, i.e., a set of states has been traversed by state analysis to completely characterize the conversational flow.

The signature for that final state enables each new incoming packet of the same conversational flow to be individually recognized in real time.

In this manner, one of the great advantages of the present invention is realized. Once a particular set of state transitions has been traversed for the first time and ends in a final state, a short-cut recognition pattern—a signature—an be generated that will key on every new incoming packet that relates to the conversational flow. Checking a signature involves a simple operation, allowing high packet rates to be successfully monitored on the network.

In improved embodiments, several state analyzers are run in parallel so that a large number of protocols and applications may be checked for. Every known protocol and application will have at least one unique set of state transitions, and can therefore be uniquely identified by watching such transitions.

When each new conversational flow starts, signatures that recognize the flow are automatically generated on-the-fly, and as further packets in the conversational flow are encountered, signatures are updated and the states of the set of state transitions for any potential application are further traversed according to the state transition rules for the flow. The new states for the flow—those associated with a set of state transitions for one or more potential applications—are added to the records of previously encountered states for easy recognition and retrieval when a new packet in the flow is encountered.

Detailed Operation

Figure 4:
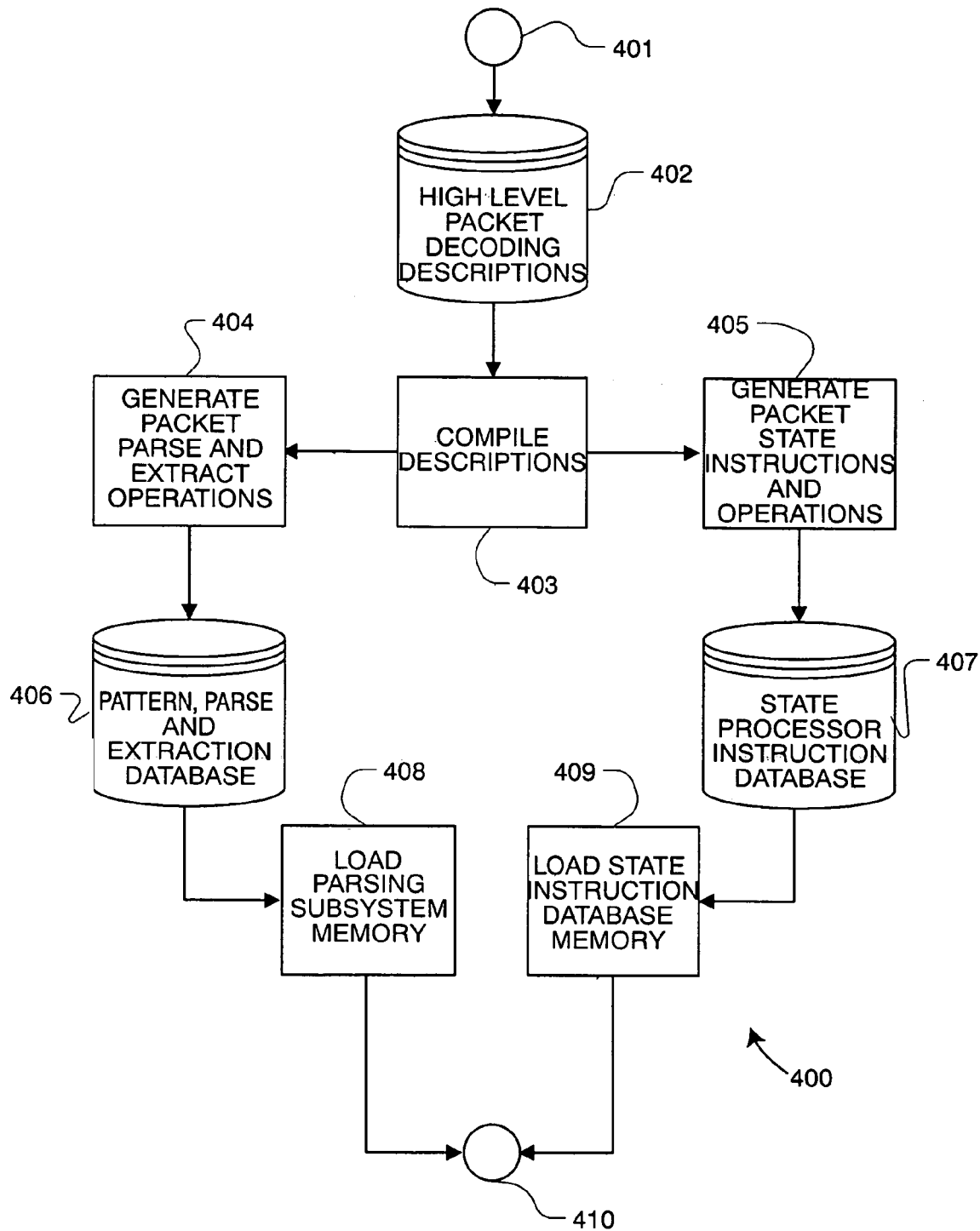
FIG. 4 is a flowchart of a high-level protocol language compiling and optimization process, which in one embodiment may be used to generate data for monitoring packets according to versions of the present invention.

FIG. 4 diagrams an initialization system 400 that includes the compilation process. That is, part of the initialization generates the pattern structures and extraction operations database 308 and the state instruction database 328. Such initialization can occur off-line or from a central location.

The different protocols that can exist in different layers may be thought of as nodes of one or more trees of linked nodes. The packet type is the root of a tree (called level 0). Each protocol is either a parent node or a terminal node. A parent node links a protocol to other protocols (child protocols) that can be at higher layer levels. Thus a protocol may have zero or more children. Ethernet packets, for example, have several variants, each having a basic format that remains substantially the same. An Ethernet packet (the root or level 0 node) may be an Ethertype packet—also called an Ethernet Type/Version 2 and a DIX (DIGITAL-Intel-Xerox packet)—or an IEEE 803.2 packet. Continuing with the IEEE 802.3 packet, one of the children nodes may be the IP protocol, and one of the children of the IP protocol may be the TCP protocol.

Figure 16:
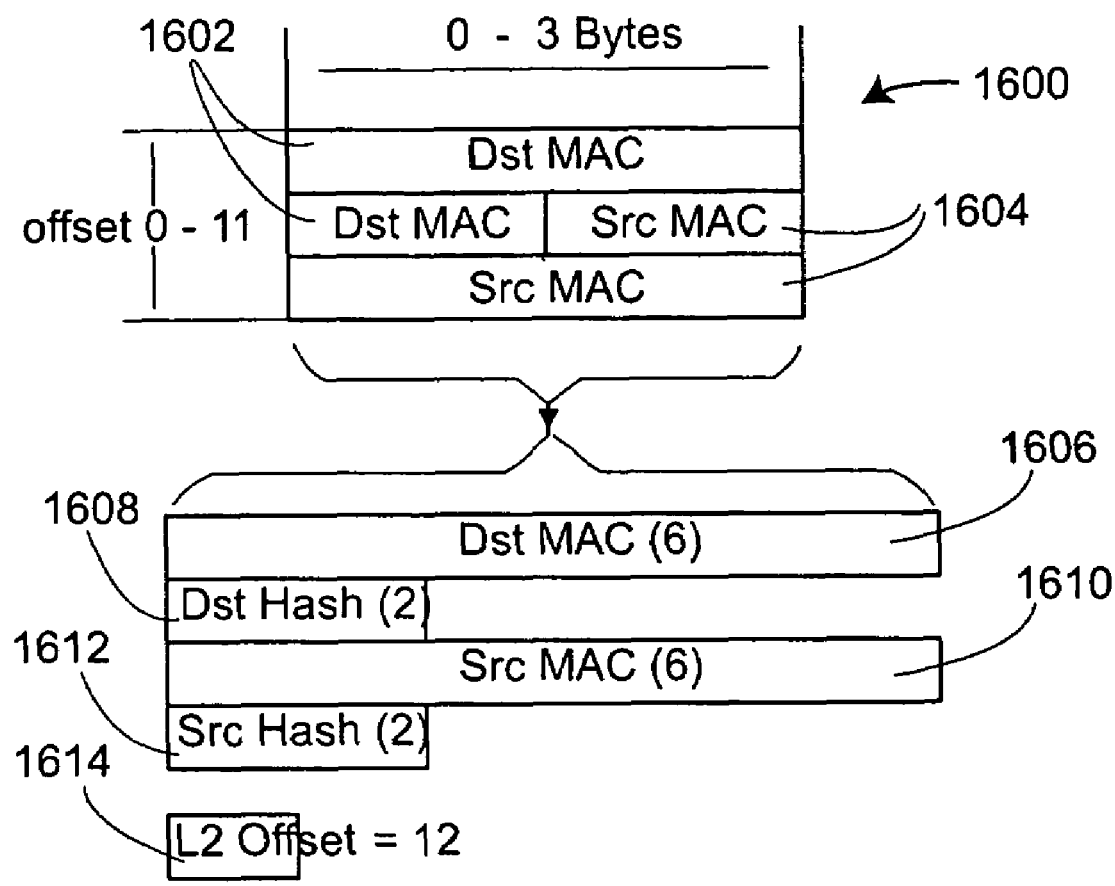
FIG. 16 is an example of the top (MAC) layer of an Ethernet packet and some of the elements that may be extracted to form a signature according to one aspect of the invention.

FIG. 16 shows the header 1600 (base level 1) of a complete Ethernet frame (i.e., packet) of information and includes information on the destination media access control address (Dst MAC 1602) and the source media access control address (Src MAC 1604). Also shown in FIG. 16 is some (but not all) of the information specified in the PDL files for extraction the signature.

Figure 17A:
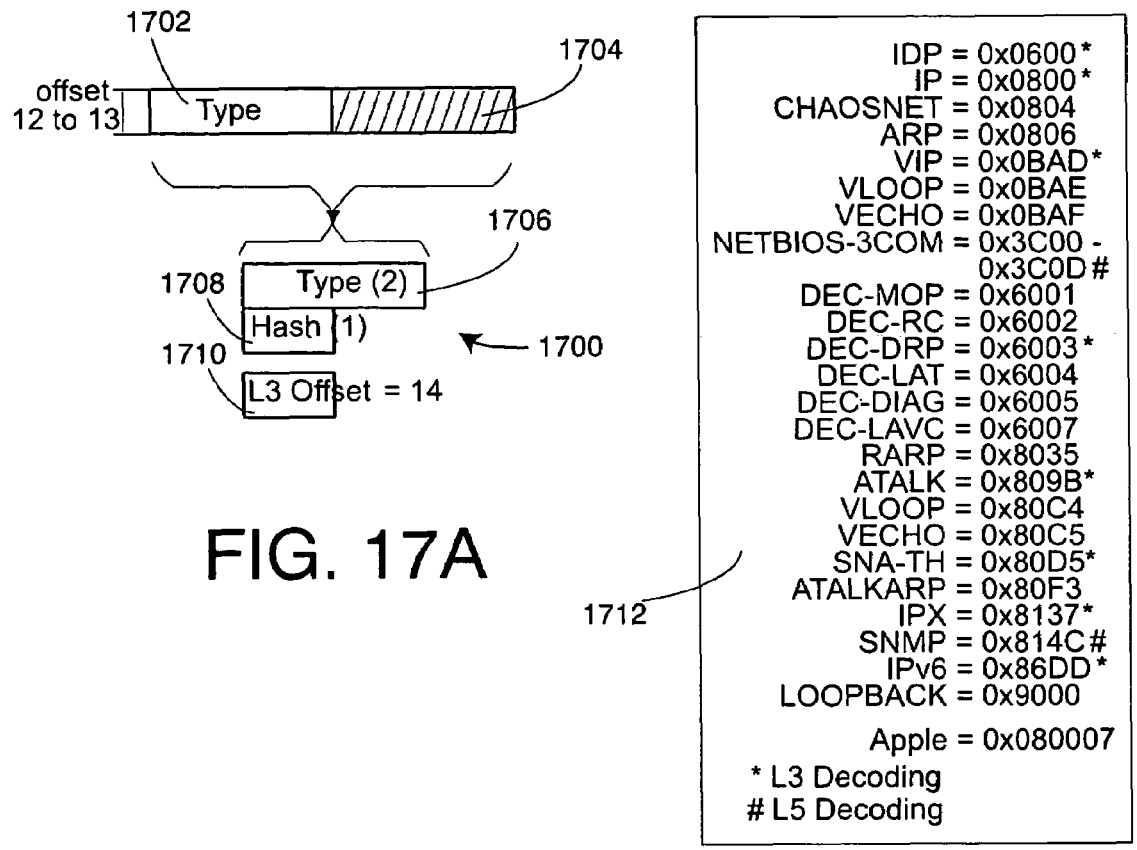
FIG. 17A is an example of the header of an Ethertype type of Ethernet packet of FIG. 16 and some of the elements that may be extracted to form a signature according to one aspect of the invention.
Figure 17B:
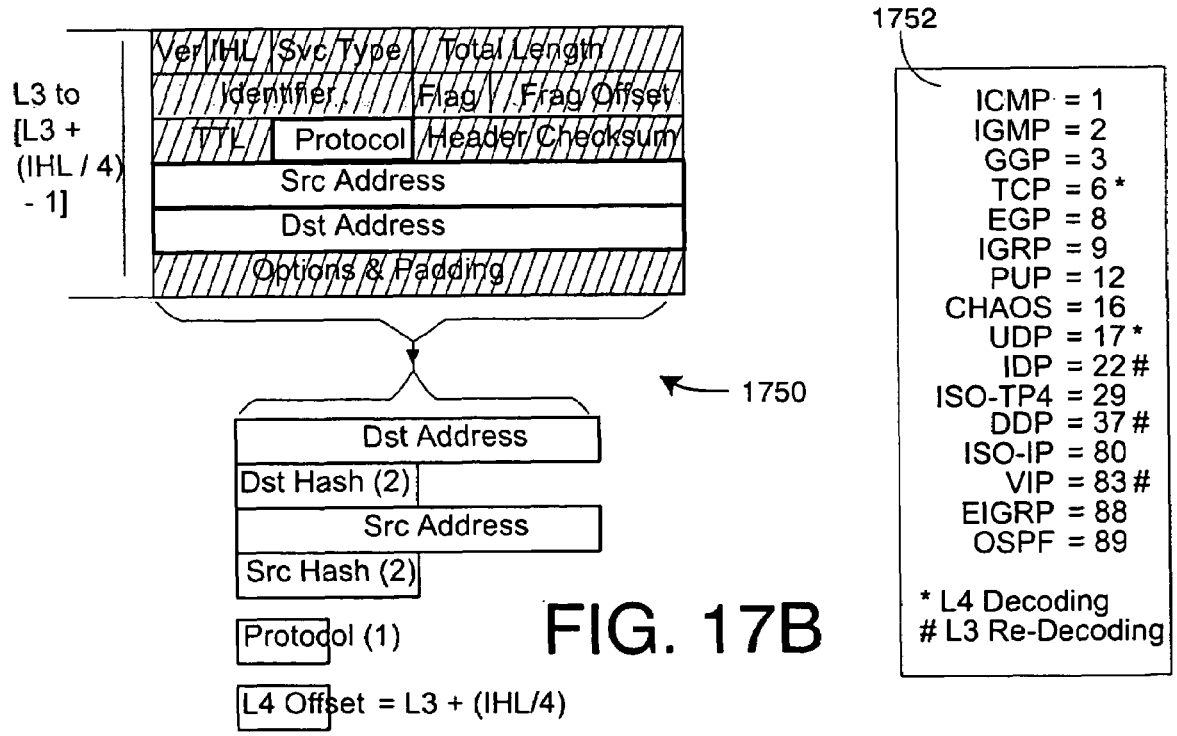
FIG. 17B is an example of an IP packet, for example, of the Ethertype packet shown in FIGS. 16 and 17A, and some of the elements that may be extracted to form a signature according to one aspect of the invention.

FIG. 17A now shows the header information for the next level (level-2) for an Ethertype packet 1700. For an Ethertype packet 1700, the relevant information from the packet that indicates the next layer level is a two-byte type field 1702 containing the child recognition pattern for the next level. The remaining information 1704 is shown hatched because it not relevant for this level. The list 1712 shows the possible children for an Ethertype packet as indicated by what child recognition pattern is found offset 12. FIG. 17B shows the structure of the header of one of the possible next levels, that of the IP protocol. The possible children of the IP protocol are shown in table 1752.

Figure 18A:
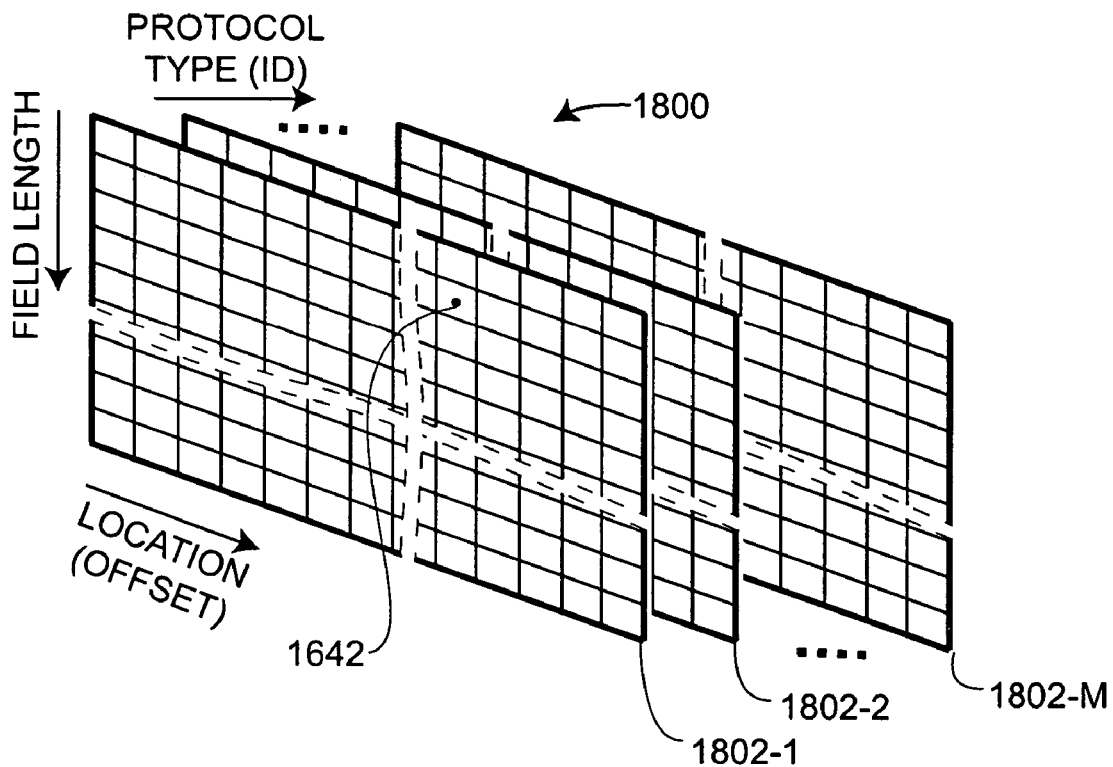
FIG. 18A is a three dimensional structure that can be used to store elements of the pattern, parse and extraction database used by the parser subsystem in accordance to one embodiment of the invention.

The pattern, parse, and extraction database (pattern recognition database, or PRD) 308 generated by compilation process 310, in one embodiment, is in the form of a three dimensional structure that provides for rapidly searching packet headers for the next protocol. FIG. 18A shows such a 3-D representation 1800 (which may be considered as an indexed set of 2-D representations). A compressed form of the 3-D structure is preferred.

Figure 18B:
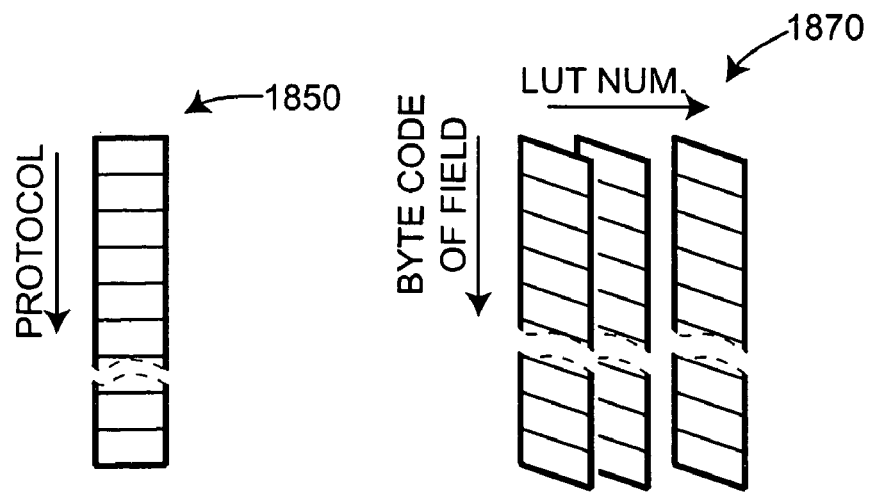
FIG. 18B is an alternate form of storing elements of the pattern, parse and extraction database used by the parser subsystem in accordance to another embodiment of the invention.

An alternate embodiment of the data structure used in database 308 is illustrated in FIG. 18B. Thus, like the 3-D structure of FIG. 18A, the data structure permits rapid searches to be performed by the pattern recognition process 304 by indexing locations in a memory rather than performing address link computations. In this alternate embodiment, the PRD 308 includes two parts, a single protocol table 1850 (PT) which has an entry for each protocol known for the monitor, and a series of Look Up Tables 1870 (LUT's) that are used to identify known protocols and their children. The protocol table includes the parameters needed by the pattern analysis and recognition process 304 (implemented by PRE 1006) to evaluate the header information in the packet that is associated with that protocol, and parameters needed by extraction process 306 (implemented by slicer 1007) to process the packet header. When there are children, the PT describes which bytes in the header to evaluate to determine the child protocol. In particular, each PT entry contains the header length, an offset to the child, a slicer command, and some flags.

The pattern matching is carried out by finding particular "child recognition codes" in the header fields, and using these codes to index one or more of the LUT's. Each LUT entry has a node code that can have one of four values, indicating the protocol that has been recognized, a code to indicate that the protocol has been partially recognized (more LUT lookups are needed), a code to indicate that this is a terminal node, and a null node to indicate a null entry. The next LUT to lookup is also returned from a LUT lookup.

Compilation process is described in FIG. 4. The source-code information in the form of protocol description files is shown as 402. In the particular embodiment, the high level decoding descriptions includes a set of protocol description files 336, one for each protocol, and a set of packet layer selections 338, which describes the particular layering (sets of trees of protocols) that the monitor is to be able to handle.

A compiler 403 compiles the descriptions. The set of packet parse-and-extract operations 406 is generated (404), and a set of packet state instructions and operations 407 is generated (405) in the form of instructions for the state processor that implements state processing process 328. Data files for each type of application and protocol to be recognized by the analyzer are downloaded from the pattern, parse, and extraction database 406 into the memory systems of the parser and extraction engines. (See the parsing process 500 description and FIG. 5; the extraction process 600 description and FIG. 6; and the parsing subsystem hardware description and FIG. 10). Data files for each type of application and protocol to be recognized by the analyzer are also downloaded from the state-processor instruction database 407 into the state processor. (see the state processor 1108 description and FIG. 11.).

Note that generating the packet parse and extraction operations builds and links the three dimensional structure (one embodiment) or the or all the lookup tables for the PRD.

Because of the large number of possible protocol trees and subtrees, the compiler process 400 includes optimization that compares the trees and subtrees to see which children share common parents. When implemented in the form of the LUT's, this process can generate a single LUT from a plurality of LUT's. The optimization process further includes a compaction process that reduces the space needed to store the data of the PRD.

As an example of compaction, consider the 3-D structure of FIG. 18A that can be thought of as a set of 2-D structures each representing a protocol. To enable saving space by using only one array per protocol which may have several parents, in one embodiment, the pattern analysis subprocess keeps a "current header" pointer. Each location (offset) index for each protocol 2-D array in the 3-D structure is a relative location starting with the start of header for the particular protocol. Furthermore, each of the two-dimensional arrays is sparse. The next step of the optimization, is checking all the 2-D arrays against all the other 2-D arrays to find out which ones can share memory. Many of these 2-D arrays are often sparsely populated in that they each have only a small number of valid entries. So, a process of "folding" is next used to combine two or more 2-D arrays together into one physical 2-D array without losing the identity of any of the original 2-D arrays (i.e., all the 2-D arrays continue to exist logically). Folding can occur between any 2-D arrays irrespective of their location in the tree as long as certain conditions are met. Multiple arrays may be combined into a single array as long as the individual entries do not conflict with each other. A fold number is then used to associate each element with its original array. A similar folding process is used for the set of LUTs 1850 in the alternate embodiment of FIG. 18B.

In 410, the analyzer has been initialized and is ready to perform recognition.

Figure 5:
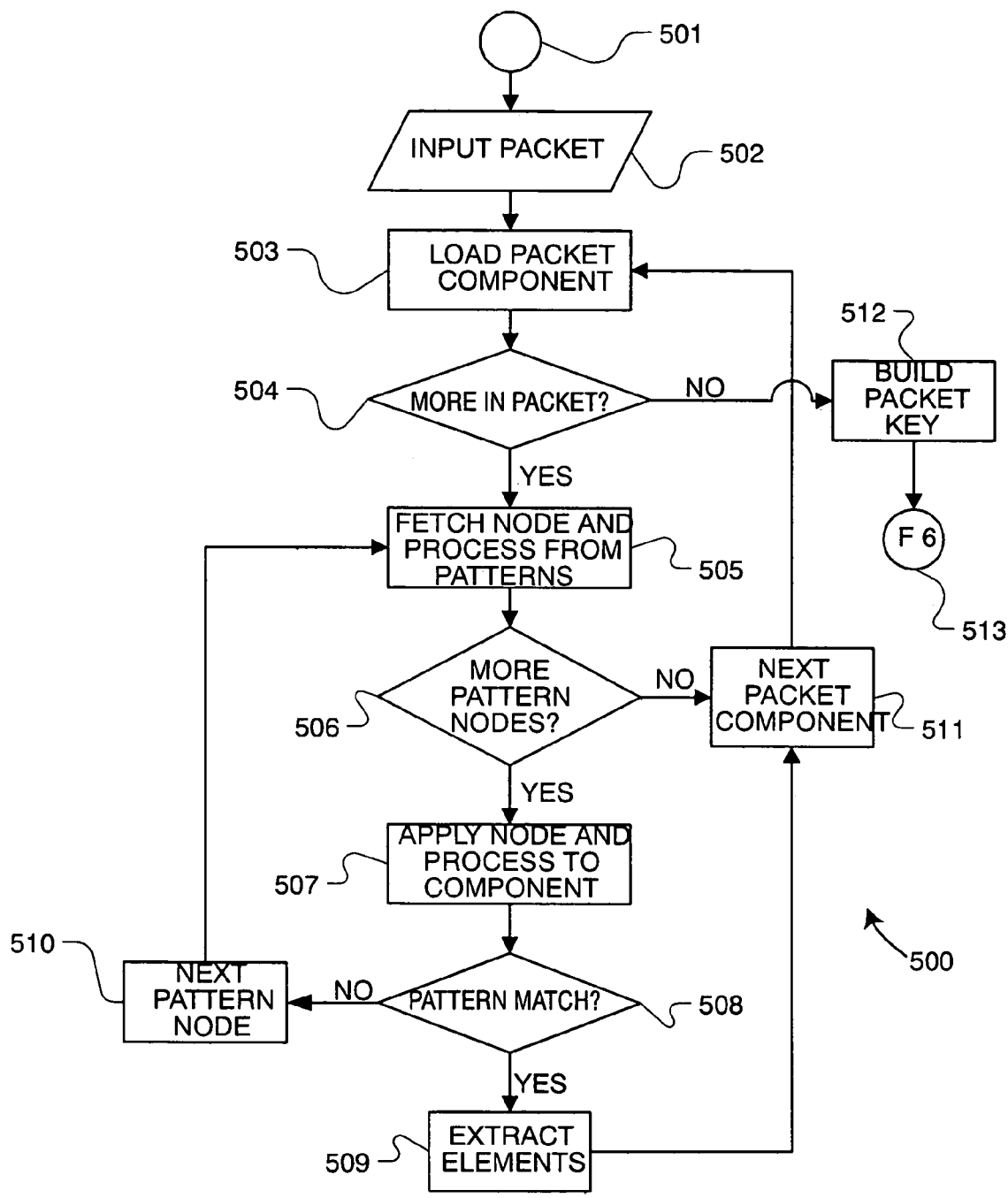
FIG. 5 is a flowchart of a packet parsing process used as part of the parser in an embodiment of the inventive packet monitor.

FIG. 5 shows a flowchart of how actual parser subsystem 301 functions. Starting at 501, the packet 302 is input to the packet buffer in step 502. Step 503 loads the next (initially the first) packet component from the packet 302. The packet components are extracted from each packet 302 one element at a time. A check is made (504) to determine if the load-packet-component operation 503 succeeded, indicating that there was more in the packet to process. If not, indicating all components have been loaded, the parser subsystem 301 builds the packet signature (512)—the next stage (FIG. 6).

If a component is successfully loaded in 503, the node and processes are fetched (505) from the pattern, parse and extraction database 308 to provide a set of patterns and processes for that node to apply to the loaded packet component. The parser subsystem 301 checks (506) to determine if the fetch pattern node operation 505 completed successfully, indicating there was a pattern node that loaded in 505. If not, step 511 moves to the next packet component. If yes, then the node and pattern matching process are applied in 507 to the component extracted in 503. A pattern match obtained in 507 (as indicated by test 508) means the parser subsystem 301 has found a node in the parsing elements; the parser subsystem 301 proceeds to step 509 to extract the elements.

If applying the node process to the component does not produce a match (test 508), the parser subsystem 301 moves (510) to the next pattern node from the pattern database 308 and to step 505 to fetch the next node and process. Thus, there is an "applying patterns" loop between 508 and 505. Once the parser subsystem 301 completes all the patterns and has either matched or not, the parser subsystem 301 moves to the next packet component (511).

Figure 6:
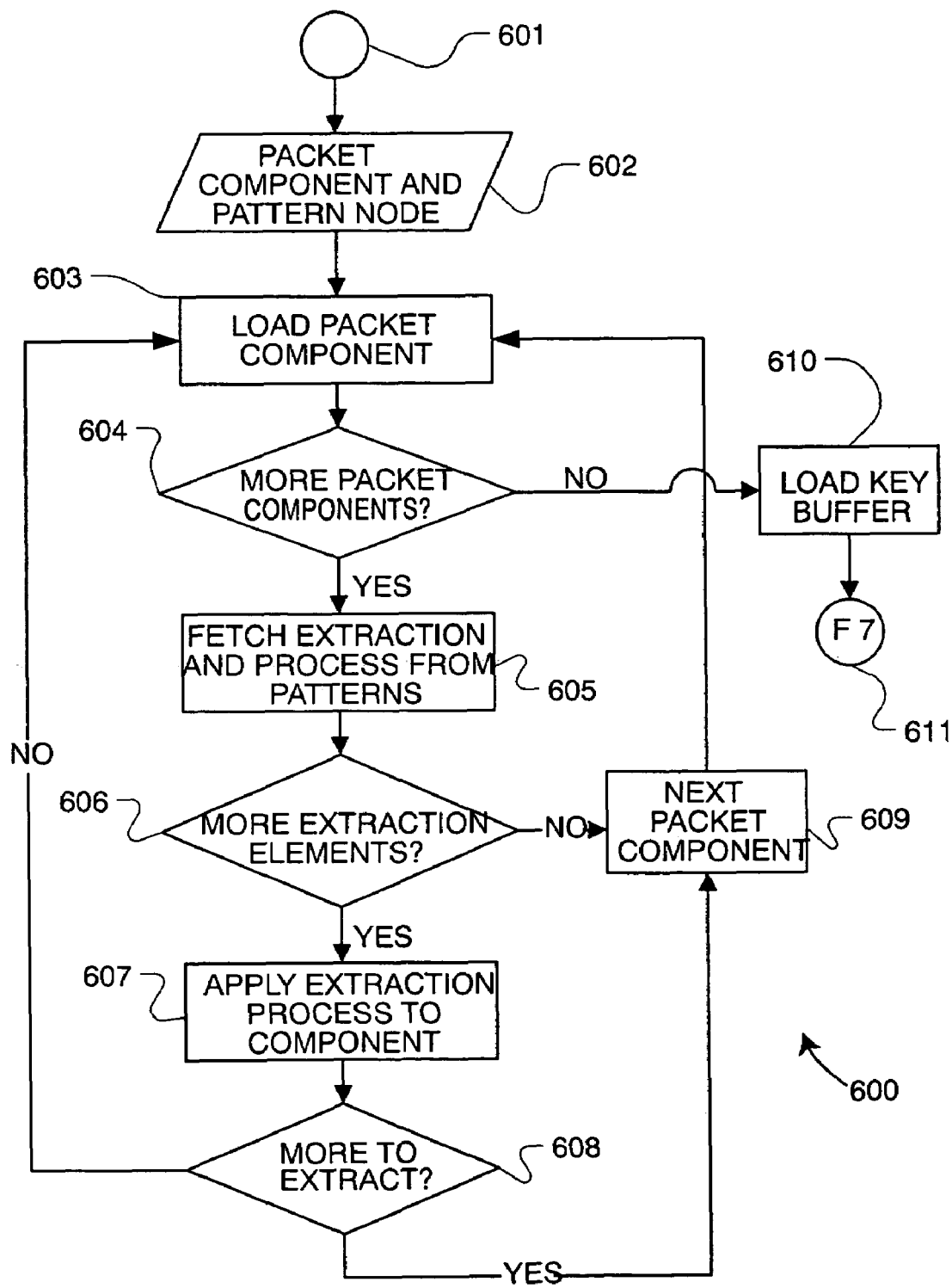
FIG. 6 is a flowchart of a packet element extraction process that is used as part of the parser in an embodiment of the inventive packet monitor.

Once all the packet components have been loaded and processed from the input packet 302, then the load packet will fail (indicated by test 504), and the parser subsystem 301 moves to build a packet signature which is described in FIG. 6

FIG. 6 is a flow chart for extracting the information from which to build the packet signature. The flow starts at 601, which is the exit point 513 of FIG. 5. At this point parser subsystem 301 has a completed packet component and a pattern node available in a buffer (602). Step 603 loads the packet component available from the pattern analysis process of FIG. 5. If the load completed (test 604), indicating that there was indeed another packet component, the parser subsystem 301 fetches in 605 the extraction and process elements received from the pattern node component in 602. If the fetch was successful (test 606), indicating that there are extraction elements to apply, the parser subsystem 301 in step 607 applies that extraction process to the packet component based on an extraction instruction received from that pattern node. This removes and saves an element from the packet component.

In step 608, the parser subsystem 301 checks if there is more to extract from this component, and if not, the parser subsystem 301 moves back to 603 to load the next packet component at hand and repeats the process. If the answer is yes, then the parser subsystem 301 moves to the next packet component ratchet. That new packet component is then loaded in step 603. As the parser subsystem 301 moved through the loop between 608 and 603, extra extraction processes are applied either to the same packet component if there is more to extract, or to a different packet component if there is no more to extract.

The extraction process thus builds the signature, extracting more and more components according to the information in the patterns and extraction database 308 for the particular packet. Once loading the next packet component operation 603 fails (test 604), all the components have been extracted. The built signature is loaded into the signature buffer (610) and the parser subsystem 301 proceeds to FIG. 7 to complete the signature generation process.

Figure 7:
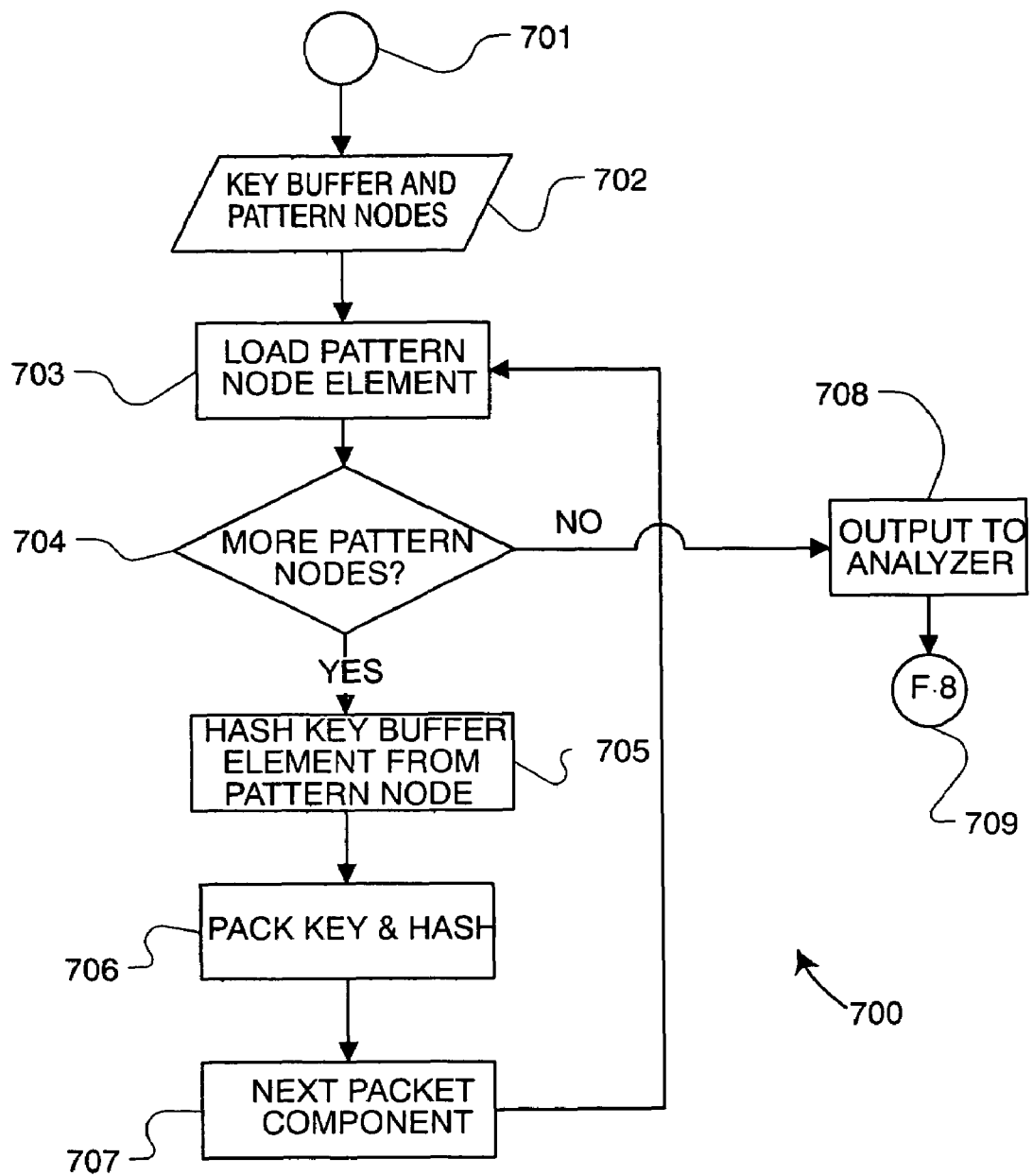
FIG. 7 is a flowchart of a flow-signature building process that is used as part of the parser in the inventive packet monitor.

Referring now to FIG. 7, the process continues at 701. The signature buffer and the pattern node elements are available (702). The parser subsystem 301 loads the next pattern node element. If the load was successful (test 704) indicating there are more nodes, the parser subsystem 301 in 705 hashes the signature buffer element based on the hash elements that are found in the pattern node that is in the element database. In 706 the resulting signature and the hash are packed. In 707 the parser subsystem 301 moves on to the next packet component which is loaded in 703.

The 703 to 707 loop continues until there are no more patterns of elements left (test 704). Once all the patterns of elements have been hashed, processes 304, 306 and 312 of parser subsystem 301 are complete. Parser subsystem 301 has generated the signature used by the analyzer subsystem 303.

A parser record is loaded into the analyzer, in particular, into the UFKB in the form of a UFKB record which is similar to a parser record, but with one or more different fields.

Figure 8:
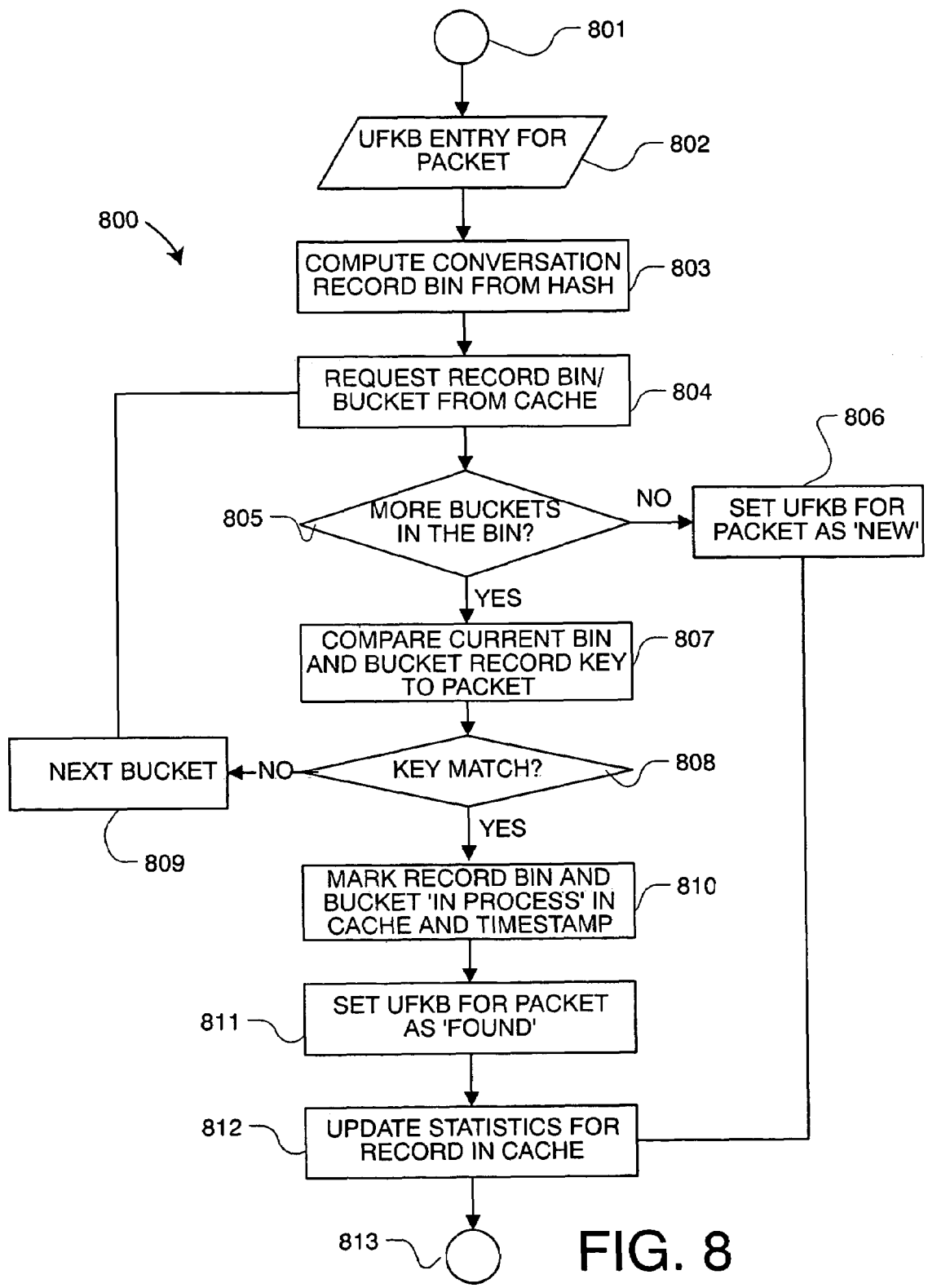
FIG. 8 is a flowchart of a monitor lookup and update process that is used as part of the analyzer in an embodiment, of the inventive packet monitor.

FIG. 8 is a flow diagram describing the operation of the lookup/update engine (LUE) that implements lookup operation 314. The process starts at 801 from FIG. 7 with the parser record that includes a signature, the hash and at least parts of the payload. In 802 those elements are shown in the form of a UFKB-entry in the buffer. The LUE, the lookup engine 314 computes a "record bin number" from the hash for a flow-entry. A bin herein may have one or more "buckets" each containing a flow-entry. The preferred embodiment has four buckets per bin.

Since preferred hardware embodiment includes the cache, all data accesses to records in the flowchart of FIG. 8 are stated as being to or from the cache.

Thus, in 804, the system looks up the cache for a bucket from that bin using the hash. If the cache successfully returns with a bucket from the bin number, indicating there are more buckets in the bin, the lookup/update engine compares (807) the current signature (the UFKB-entry's signature) from that in the bucket (i.e., the flow-entry signature). If the signatures match (test 808), that record (in the cache) is marked in step 810 as "in process" and a timestamp added. Step 811 indicates to the UFKB that the UFKB-entry in 802 has a status of "found." The "found" indication allows the state processing 328 to begin processing this UFKB element. The preferred hardware embodiment includes one or more state processors, and these can operate in parallel with the lookup/update engine.

In the preferred embodiment, a set of statistical operations is performed by a calculator for every packet analyzed. The statistical operations may include one or more of counting the packets associated with the flow; determining statistics related to the size of packets of the flow; compiling statistics on differences between packets in each direction, for example using timestamps; and determining statistical relationships of timestamps of packets in the same direction. The statistical measures are kept in the flow-entries. Other statistical measures also may be compiled. These statistics may be used singly or in combination by a statistical processor component to analyze many different aspects of the flow. This may include determining network usage metrics from the statistical measures, for example to ascertain the network's ability to transfer information for this application. Such analysis provides for measuring the quality of service of a conversation, measuring how well an application is performing in the network, measuring network resources consumed by an application, and so forth.

To provide for such analyses, the lookup/update engine updates one or more counters that are part of the flow-entry (in the cache) in step 812. The process exits at 813. In our embodiment, the counters include the total packets of the flow, the time, and a differential time from the last timestamp to the present timestamp.

It may be that the bucket of the bin did not lead to a signature match (test 808). In such a case, the analyzer in 809 moves to the next bucket for this bin. Step 804 again looks up the cache for another bucket from that bin. The lookup/update engine thus continues lookup up buckets of the bin until there is either a match in 808 or operation 804 is not successful (test 805), indicating that there are no more buckets in the bin and no match was found.

If no match was found, the packet belongs to a new (not previously encountered) flow. In 806 the system indicates that the record in the unified flow key buffer for this packet is new, and in 812, any statistical updating operations are performed for this packet by updating the flow-entry in the cache. The update operation exits at 813. A flow insertion/deletion engine (FIDE) creates a new record for this flow (again via the cache).

Thus, the update/lookup engine ends with a UFKB-entry for the packet with a "new" status or a "found" status.

Note that the above system uses a hash to which more than one flow-entry can match. A longer hash may be used that corresponds to a single flow-entry. In such an embodiment, the flow chart of FIG. 8 is simplified as would be clear to those in the art.

The Hardware System

Figure 14:
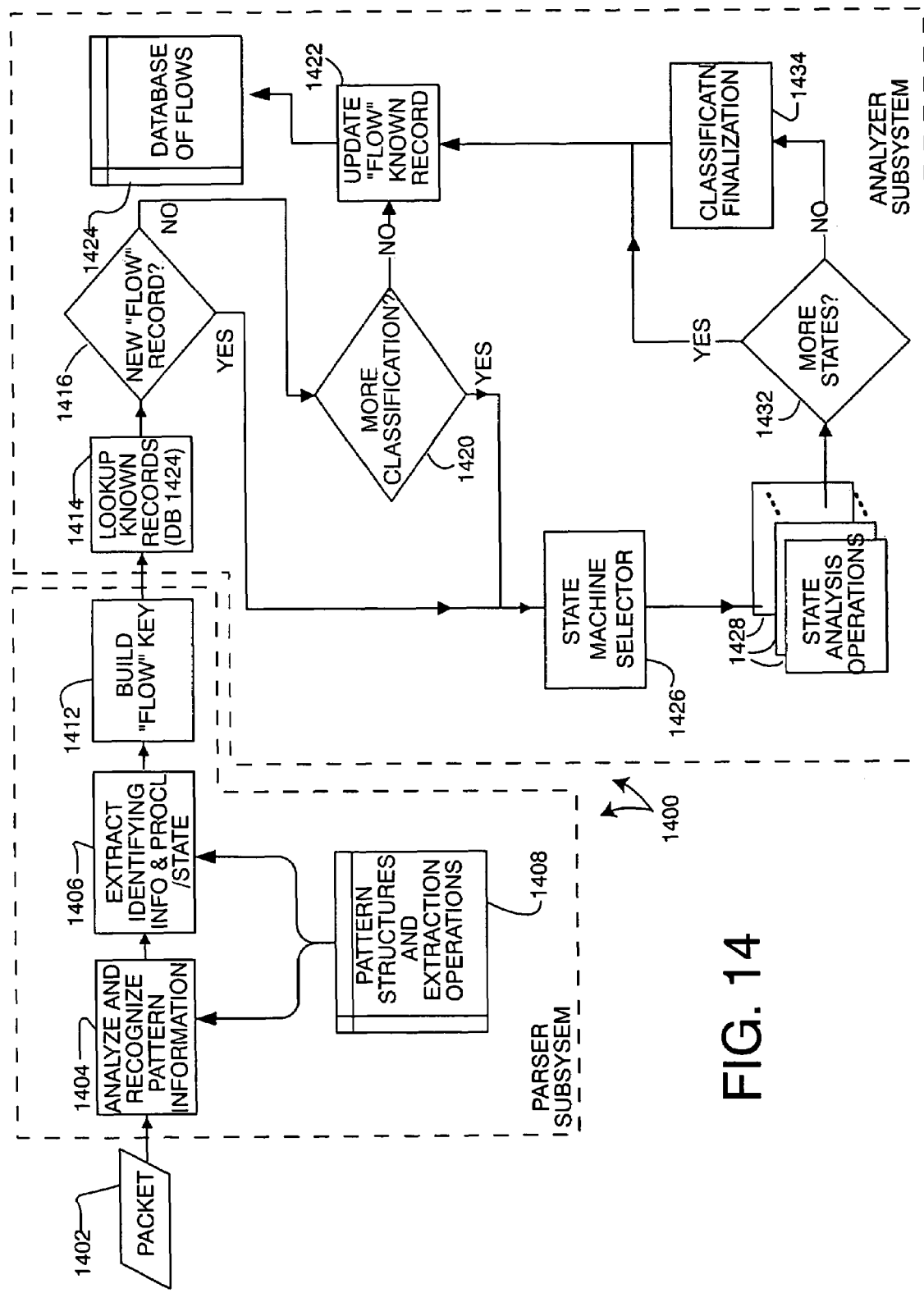
FIG. 14 is a simple functional block diagram of a process embodiment of the present invention that can operate as the packet monitor shown in FIG. 1. This process may be implemented in software.

Each of the individual hardware elements through which the data flows in the system are now described with reference to FIGS. 10 and 11. Note that while we are describing a particular hardware implementation of the invention embodiment of FIG. 3, it would be clear to one skilled in the art that the flow of FIG. 3 may alternatively be implemented in software running on one or more general-purpose processors, or only partly implemented in hardware. An implementation of the invention that can operate in software is shown in FIG. 14. The hardware embodiment (FIGS. 10 and 11) can operate at over a million packets per second, while the software system of FIG. 14 may be suitable for slower networks. To one skilled in the art it would be clear that more and more of the system may be implemented in software as processors become faster.

Figure 10:
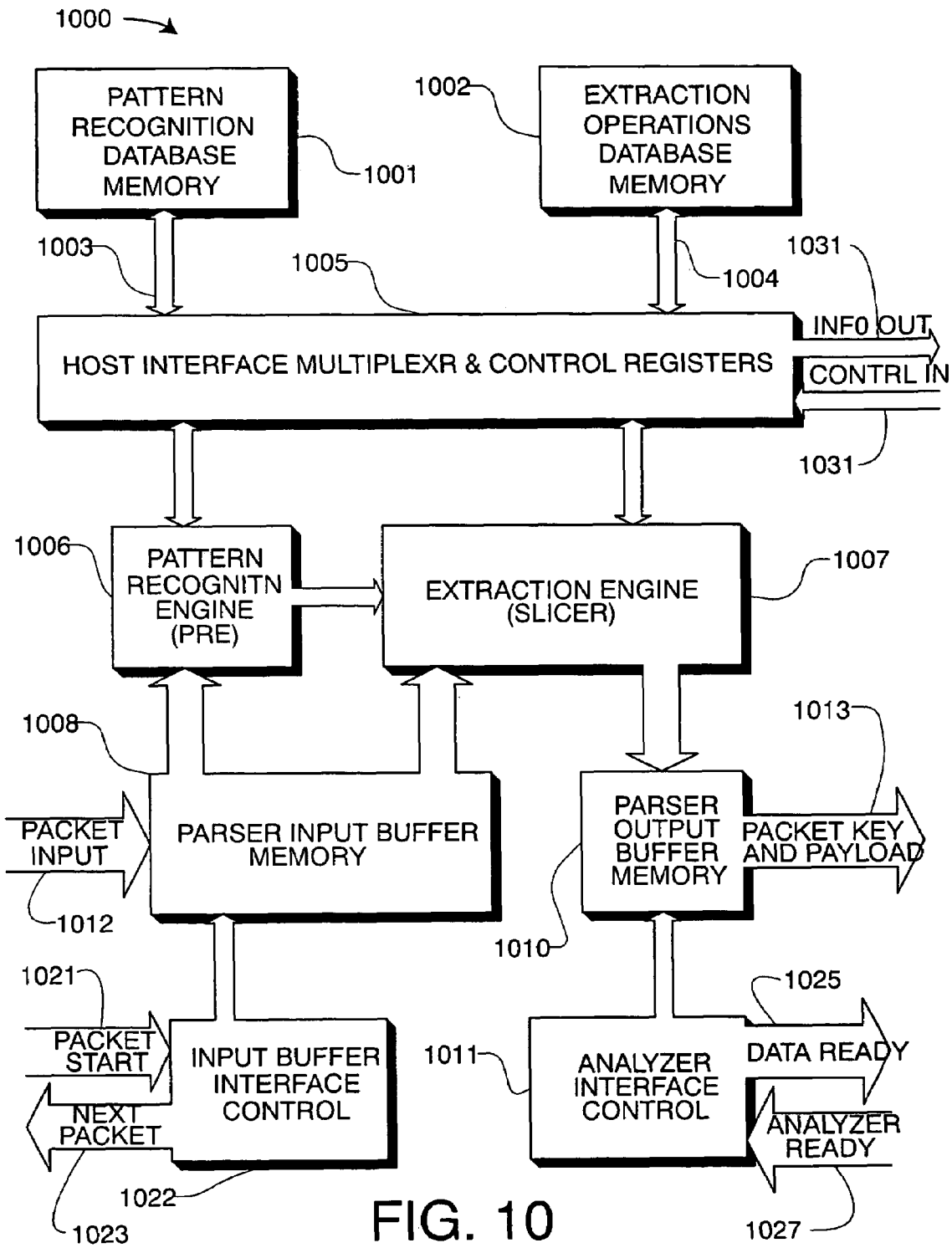
FIG. 10 is a functional block diagram of a hardware parser subsystem including the pattern recognizer and extractor that can form part of the parser module in an embodiment of the inventive packet monitor.

FIG. 10 is a description of the parsing subsystem (301, shown here as subsystem 1000) as implemented in hardware. Memory 1001 is the pattern recognition database memory, in which the patterns that are going to be analyzed are stored. Memory 1002 is the extraction-operation database memory, in which the extraction instructions are stored. Both 1001 and 1002 correspond to internal data structure 308 of FIG. 3. Typically, the system is initialized from a microprocessor (not shown) at which time these memories are loaded through a host interface multiplexor and control register 1005 via the internal buses 1003 and 1004. Note that the contents of 1001 and 1002 are preferably obtained by compiling process 310 of FIG. 3.

A packet enters the parsing system via 1012 into a parser input buffer memory 1008 using control signals 1021 and 1023, which control an input buffer interface controller 1022. The buffer 1008 and interface control 1022 connect to a packet acquisition device (not shown). The buffer acquisition device generates a packet start signal 1021 and the interface control 1022 generates a next packet (i.e., ready to receive data) signal 1023 to control the data flow into parser input buffer memory 1008. Once a packet starts loading into the buffer memory 1008, pattern recognition engine (PRE) 1006 carries out the operations on the input buffer memory described in block 304 of FIG. 3. That is, protocol types and associated headers for each protocol layer that exist in the packet are determined.

The PRE searches database 1001 and the packet in buffer 1008 in order to recognize the protocols the packet contains. In one implementation, the database 1001 includes a series of linked lookup tables. Each lookup table uses eight bits of addressing. The first lookup table is always at address zero. The Pattern Recognition Engine uses a base packet offset from a control register to start the comparison. It loads this value into a current offset pointer (COP). It then reads the byte at base packet offset from the parser input buffer and uses it as an address into the first lookup table.

Each lookup table returns a word that links to another lookup table or it returns a terminal flag. If the lookup produces a recognition event the database also returns a command for the slicer. Finally it returns the value to add to the COP.

The PRE 1006 includes of a comparison engine. The comparison engine has a first stage that checks the protocol type field to determine if it is an 802.3 packet and the field should be treated as a length. If it is not a length, the protocol is checked in a second stage. The first stage is the only protocol level that is not programmable. The second stage has two full sixteen bit content addressable memories (CAMs) defined for future protocol additions.

Thus, whenever the PRE recognizes a pattern, it also generates a command for the extraction engine (also called a "slicer") 1007. The recognized patterns and the commands are sent to the extraction engine 1007 that extracts information from the packet to build the parser record. Thus, the operations of the extraction engine are those carried out in blocks 306 and 312 of FIG. 3. The commands are sent from PRE 1006 to slicer 1007 in the form of extraction instruction pointers which tell the extraction engine 1007 where to a find the instructions in the extraction operations database memory (i.e., slicer instruction database) 1002.

Thus, when the PRE 1006 recognizes a protocol it outputs both the protocol identifier and a process code to the extractor. The protocol identifier is added to the flow signature and the process code is used to fetch the first instruction from the instruction database 1002. Instructions include an operation code and usually source and destination offsets as well as a length. The offsets and length are in bytes. A typical operation is the MOVE instruction. This instruction tells the slicer 1007 to copy n bytes of data unmodified from the input buffer 1008 to the output buffer 1010. The extractor contains a byte-wise barrel shifter so that the bytes moved can be packed into the flow signature. The extractor contains another instruction called HASH. This instruction tells the extractor to copy from the input buffer 1008 to the HASH generator.

Thus these instructions are for extracting selected element(s) of the packet in the input buffer memory and transferring the data to a parser output buffer memory 1010. Some instructions also generate a hash.

The extraction engine 1007 and the PRE operate as a pipeline. That is, extraction engine 1007 performs extraction operations on data in input buffer 1008 already processed by PRE 1006 while more (i.e., later arriving) packet information is being simultaneously parsed by PRE 1006. This provides high processing speed sufficient to accommodate the high arrival rate speed of packets.

Once all the selected parts of the packet used to form the signature are extracted, the hash is loaded into parser output buffer memory 1010. Any additional payload from the packet that is required for further analysis is also included. The parser output memory 1010 is interfaced with the analyzer subsystem by analyzer interface control 1011. Once all the information of a packet is in the parser output buffer memory 1010, a data ready signal 1025 is asserted by analyzer interface control. The data from the parser subsystem 1000 is moved to the analyzer subsystem via 1013 when an analyzer ready signal 1027 is asserted.

Figure 11:
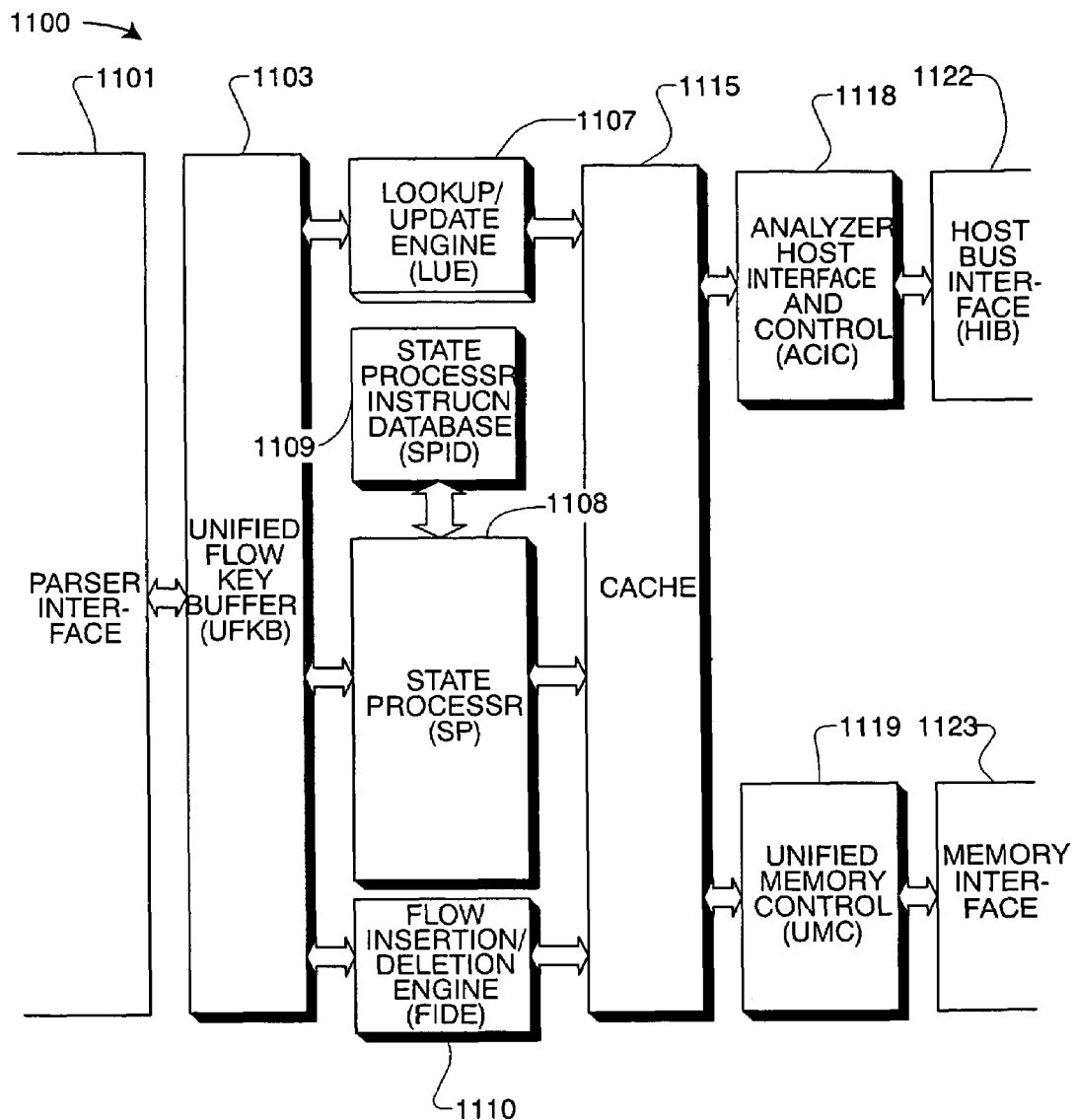
FIG. 11 is a functional block diagram of a hardware analyzer including a state processor that can form part of an embodiment of the inventive packet monitor.

FIG. 11 shows the hardware components and dataflow for the analyzer subsystem that performs the functions of the analyzer subsystem 303 of FIG. 3. The analyzer is initialized prior to operation, and initialization includes loading the state processing information generated by the compilation process 310 into a database memory for the state processing, called state processor instruction database (SPID) memory 1109.

The analyzer subsystem 1100 includes a host bus interface 1122 using an analyzer host interface controller 1118, which in turn has access to a cache system 1115. The cache system has bi-directional access to and from the state processor of the system 1108. State processor 1108 is responsible for initializing the state processor instruction database memory 1109 from information given over the host bus interface 1122.

With the SPID 1109 loaded, the analyzer subsystem 1100 receives parser records comprising packet signatures and payloads that come from the parser into the unified flow key buffer (UFKB) 1103. UFKB is comprised of memory set up to maintain UFKB records. A UFKB record is essentially a parser record; the UFKB holds records of packets that are to be processed or that are in process. Furthermore, the UFKB provides for one or more fields to act as modifiable status flags to allow different processes to run concurrently.

Three processing engines run concurrently and access records in the UFKB 1103: the lookup/update engine (LUE) 1107, the state processor (SP) 1108, and the flow insertion and deletion engine (FIDE) 1110. Each of these is implemented by one or more finite state machines (FSM's). There is bi-directional access between each of the finite state machines and the unified flow key buffer 1103. The UFKB record includes a field that stores the packet sequence number, and another that is filled with state information in the form of a program counter for the state processor 1108 that implements state processing 328. The status flags of the UFKB for any entry includes that the LUE is done and that the LUE is transferring processing of the entry to the state processor. The LUE done indicator is also used to indicate what the next entry is for the LUE. There also is provided a flag to indicate that the state processor is done with the current flow and to indicate what the next entry is for the state processor. There also is provided a flag to indicate the state processor is transferring processing of the UFKB-entry to the flow insertion and deletion engine.

A new UFKB record is first processed by the LUE 1107. A record that has been processed by the LUE 1107 may be processed by the state processor 1108, and a UFKB record data may be processed by the flow insertion/deletion engine 1110 after being processed by the state processor 1108 or only by the LUE. Whether or not a particular engine has been applied to any unified flow key buffer entry is determined by status fields set by the engines upon completion. In one embodiment, a status flag in the UFKB-entry indicates whether an entry is new or found. In other embodiments, the LUE issues a flag to pass the entry to the state processor for processing, and the required operations for a new record are included in the SP instructions.

Note that each UFKB-entry may not need to be processed by all three engines. Furthermore, some UFKB entries may need to be processed more than once by a particular engine.

Each of these three engines also has bi-directional access to a cache subsystem 1115 that includes a caching engine. Cache 1115 is designed to have information flowing in and out of it from five different points within the system: the three engines, external memory via a unified memory controller (UMC) 1119 and a memory interface 1123, and a microprocessor via analyzer host interface and control unit (ACIC) 1118 and host interface bus (HIB) 1122. The analyzer microprocessor (or dedicated logic processor) can thus directly insert or modify data in the cache.

The cache subsystem 1115 is an associative cache that includes a set of content addressable memory cells (CAMs) each including an address portion and a pointer portion pointing to the cache memory (e.g., RAM) containing the cached flow-entries. The CAMs are arranged as a stack ordered from a top CAM to a bottom CAM. The bottom CAM's pointer points to the least recently used (LRU) cache memory entry. Whenever there is a cache miss, the contents of cache memory pointed to by the bottom CAM are replaced by the flow-entry from the flow-entry database 324. This now becomes the most recently used entry, so the contents of the bottom CAM are moved to the top CAM and all CAM contents are shifted down. Thus, the cache is an associative cache with a true LRU replacement policy.

The LUE 1107 first processes a UFKB-entry, and basically performs the operation of blocks 314 and 316 in FIG. 3. A signal is provided to the LUE to indicate that a "new" UFKB-entry is available. The LUE uses the hash in the UFKB-entry to read a matching bin of up to four buckets from the cache. The cache system attempts to obtain the matching bin. If a matching bin is not in the cache, the cache 1115 makes the request to the UMC 1119 to bring in a matching bin from the external memory.

When a flow-entry is found using the hash, the LUE 1107 looks at each bucket and compares it using the signature to the signature of the UFKB-entry until there is a match or there are no more buckets.

If there is no match, or if the cache failed to provide a bin of flow-entries from the cache, a time stamp in set in the flow key of the UFKB record, a protocol identification and state determination is made using a table that was loaded by compilation process 310 during initialization, the status for the record is set to indicate the LUE has processed the record, and an indication is made that the UFKB-entry is ready to start state processing. The identification and state determination generates a protocol identifier which in the preferred embodiment is a "jump vector" for the state processor which is kept by the UFKB for this UFKB-entry and used by the state processor to start state processing for the particular protocol. For example, the jump vector jumps to the subroutine for processing the state.

If there was a match, indicating that the packet of the UFKB-entry is for a previously encountered flow, then a calculator component enters one or more statistical measures stored in the flow-entry, including the timestamp. In addition, a time difference from the last stored timestamp may be stored, and a packet count may be updated. The state of the flow is obtained from the flow-entry is examined by looking at the protocol identifier stored in the flow-entry of database 324. If that value indicates that no more classification is required, then the status for the record is set to indicate the LUE has processed the record. In the preferred embodiment, the protocol identifier is a jump vector for the state processor to a subroutine to state processing the protocol, and no more classification is indicated in the preferred embodiment by the jump vector being zero. If the protocol identifier indicates more processing, then an indication is made that the UFKB-entry is ready to start state processing and the status for the record is set to indicate the LUE has processed the record.

The state processor 1108 processes information in the cache system according to a UFKB-entry after the LUE has completed. State processor 1108 includes a state processor program counter SPPC that generates the address in the state processor instruction database 1109 loaded by compiler process 310 during initialization. It contains an Instruction Pointer (SPIP) which generates the SPID address. The instruction pointer can be incremented or loaded from a Jump Vector Multiplexor which facilitates conditional branching. The SPIP can be loaded from one of three sources: (1) A protocol identifier from the UFKB, (2) an immediate jump vector form the currently decoded instruction, or (3) a value provided by the arithmetic logic unit (SPALU) included in the state processor.

Thus, after a Flow Key is placed in the UFKB by the LUE with a known protocol identifier, the Program Counter is initialized with the last protocol recognized by the Parser. This first instruction is a jump to the subroutine which analyzes the protocol that was decoded.

The State Processor ALU (SPALU) contains all the Arithmetic; Logical and String Compare functions necessary to implement the State Processor instructions. The main blocks of the SPALU are: The A and B Registers, the Instruction Decode & State Machines, the String Reference Memory the Search Engine, an Output Data Register and an Output Control Register The Search Engine in turn contains the Target Search Register set, the Reference Search Register set, and a Compare block which compares two operands by exclusive-or-ing them together.

Thus, after the UFKB sets the program counter, a sequence of one or more state operations are be executed in state processor 1108 to further analyze the packet that is in the flow key buffer entry for this particular packet.

Figure 13:
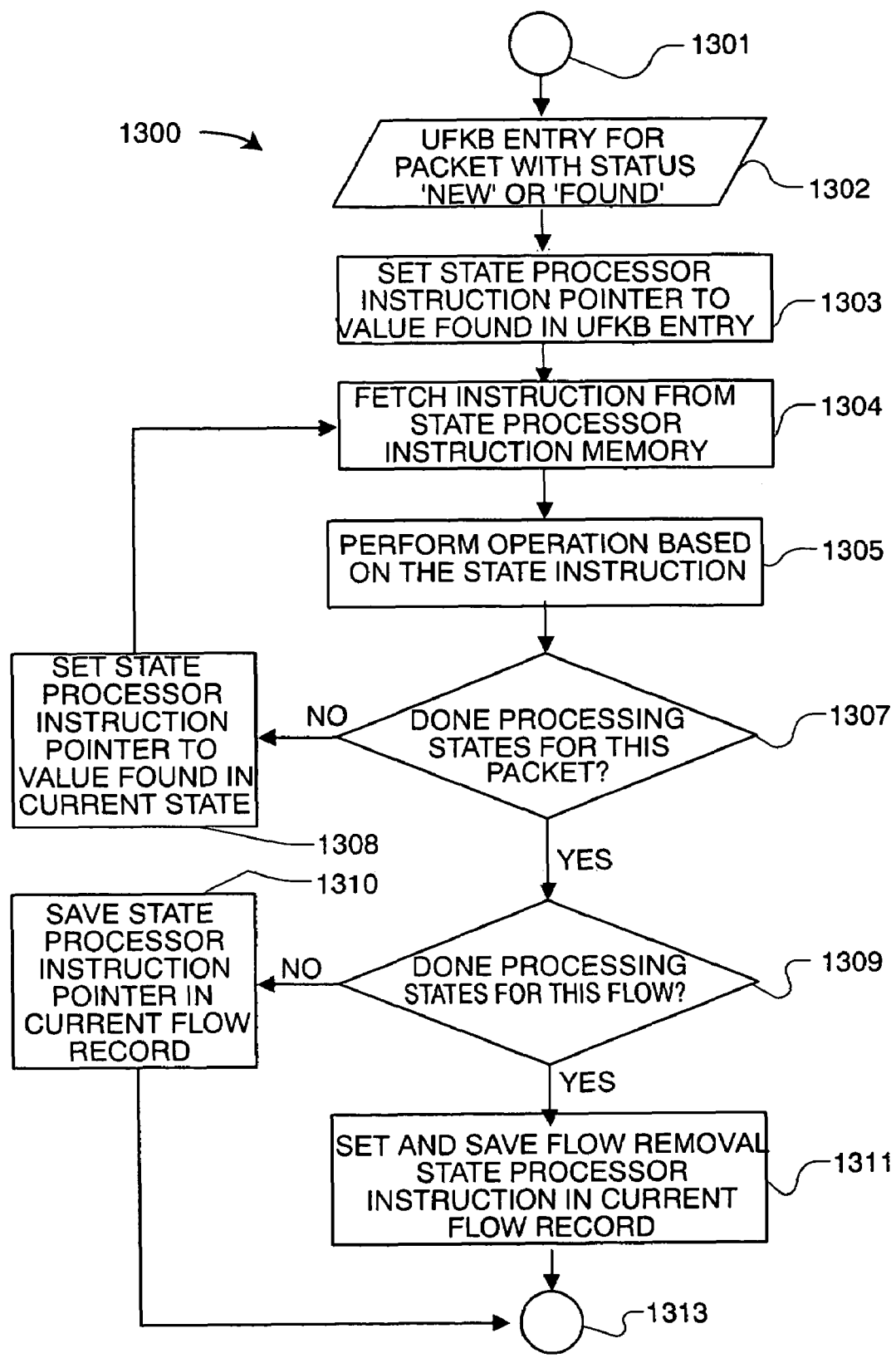
FIG. 13 is a flowchart of a state processing process that can form part of the analyzer in an embodiment of the inventive packet monitor.

FIG. 13 describes the operation of the state processor 1108. The state processor is entered at 1301 with a unified flow key buffer entry to be processed. The UFKB-entry is new or corresponding to a found flow-entry. This UFKB-entry is retrieved from unified flow key buffer 1103 in 1301. In 1303, the protocol identifier for the UFKB-entry is used to set the state processor's instruction counter. The state processor 1108 starts the process by using the last protocol recognized by the parser subsystem 301 as an offset into a jump table. The jump table takes us to the instructions to use for that protocol. Most instructions test something in the unified flow key buffer or the flow-entry if it exists. The state processor 1108 may have to test bits, do comparisons, add or subtract to perform the test.

The first state processor instruction is fetched in 1304 from the state processor instruction database memory 1109. The state processor performs the one or more fetched operations (1304). In our implementation, each single state processor instruction is very primitive (e.g., a move, a compare, etc.), so that many such instructions need to be performed on each unified flow key buffer entry. One aspect of the state processor is its ability to search for one or more (up to four) reference strings in the payload part of the UFKB entry. This is implemented by a search engine component of the state processor responsive to special searching instructions.

In 1307, a check is made to determine if there are any more instructions to be performed for the packet. If yes, then in 1308 the system sets the state processor instruction pointer (SPIP) to obtain the next instruction. The SPIP may be set by an immediate jump vector in the currently decoded instruction, or by a value provided by the SPALU during processing.

The next instruction to be performed is now fetched (1304) for execution. This state processing loop between 1304 and 1307 continues until there are no more instructions to be performed.

At this stage, a check is made in 1309 if the processing on this particular packet has resulted in a final state. That is, is the analyzer is done processing not only for this particular packet, but for the whole flow to which the packet belongs, and the flow is fully determined. If indeed there are no more states to process for this flow, then in 1311 the processor finalizes the processing. Some final states may need to put a state in place that tells the system to remove a flow—for example, if a connection disappears from a lower level connection identifier. In that case, in 1311, a flow removal state is set and saved in the flow-entry. The flow removal state may be a NOP (no-op) instruction which means there are no removal instructions.

Once the appropriate flow removal instruction as specified for this flow (a NOP or otherwise) is set and saved, the process is exited at 1313. The state processor 1108 can now obtain another unified flow key buffer entry to process.

If at 1309 it is determined that processing for this flow is not completed, then in 1310 the system saves the state processor instruction pointer in the current flow-entry in the current flow-entry. That will be the next operation that will be performed the next time the LRE 1107 finds packet in the UFKB that matches this flow. The processor now exits processing this particular unified flow key buffer entry at 1313.

Note that state processing updates information in the unified flow key buffer 1103 and the flow-entry in the cache. Once the state processor is done, a flag is set in the UFKB for the entry that the state processor is done. Furthermore, If the flow needs to be inserted or deleted from the database of flows, control is then passed on to the flow insertion/deletion engine 1110 for that flow signature and packet entry. This is done by the state processor setting another flag in the UFKB for this UFKB-entry indicating that the state processor is passing processing of this entry to the flow insertion and deletion engine.

The flow insertion and deletion engine 1110 is responsible for maintaining the flow-entry database. In particular, for creating new flows in the flow database, and deleting flows from the database so that they can be reused.

Figure 12:
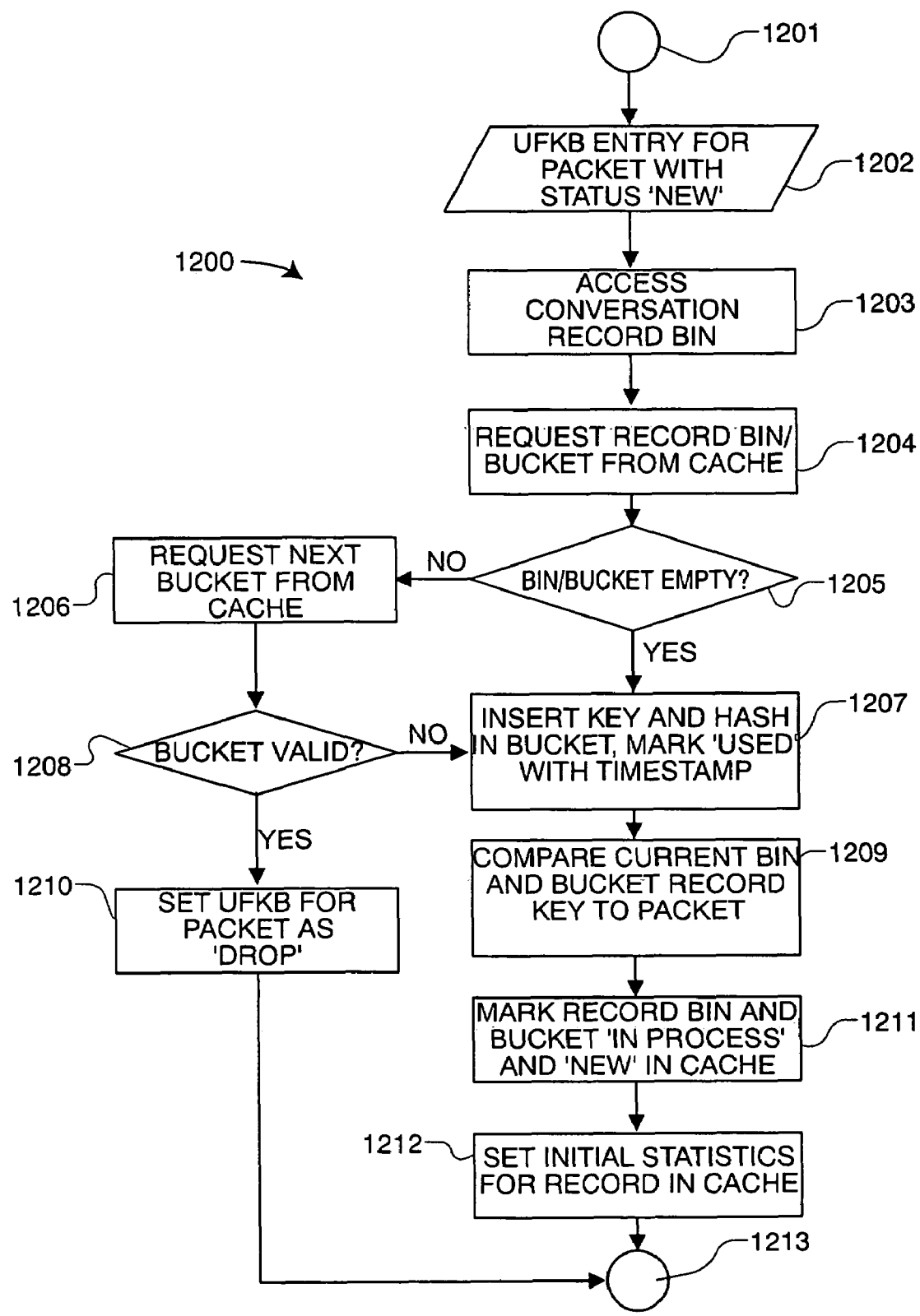
FIG. 12 is a functional block diagram of a flow insertion and deletion engine process that can form part of the analyzer in an embodiment of the inventive packet monitor.

The process of flow insertion is now described with the aid of FIG. 12. Flows are grouped into bins of buckets by the hash value. The engine processes a UFKB-entry that may be new or that the state processor otherwise has indicated needs to be created. FIG. 12 shows the case of a new entry being created. A conversation record bin (preferably containing 4 buckets for four records) is obtained in 1203. This is a bin that matches the hash of the UFKB, so this bin may already have been sought for the UFKB-entry by the LUE. In 1204 the FIDE 1110 requests that the record bin/bucket be maintained in the cache system 1115. If in 1205 the cache system 1115 indicates that the bin/bucket is empty, step 1207 inserts the flow signature (with the hash) into the bucket and the bucket is marked "used" in the cache engine of cache 1115 using a timestamp that is maintained throughout the process. In 1209, the FIDE 1110 compares the bin and bucket record flow signature to the packet to verify that all the elements are in place to complete the record. In 1211 the system marks the record bin and bucket as "in process" and as "new" in the cache system (and hence in the external memory). In 1212, the initial statistical measures for the flow-record are set in the cache system. This in the preferred embodiment clears the set of counters used to maintain statistics, and may perform other procedures for statistical operations requires by the analyzer for the first packet seen for a particular flow.

Back in step 1205, if the bucket is not empty, the FIDE 1110 requests the next bucket for this particular bin in the cache system. If this succeeds, the processes of 1207, 1209, 1211 and 1212 are repeated for this next bucket. If at 1208, there is no valid bucket, the unified flow key buffer entry for the packet is set as "drop," indicating that the system cannot process the particular packet because there are no buckets left in the system. The process exits at 1213. The FIDE 1110 indicates to the UFKB that the flow insertion and deletion operations are completed for this UFKB-entry. This also lets the UFKB provide the FIDE with the next UFKB record.

Once a set of operations is performed on a unified flow key buffer entry by all of the engines required to access and manage a particular packet and its flow signature, the unified flow key buffer entry is marked as "completed." That element will then be used by the parser interface for the next packet and flow signature coming in from the parsing and extracting system.

All flow-entries are maintained in the external memory and some are maintained in the cache 1115. The cache system 1115 is intelligent enough to access the flow database and to understand the data structures that exists on the other side of memory interface 1123. The lookup/update engine 1107 is able to request that the cache system pull a particular flow or "buckets" of flows from the unified memory controller 1119 into the cache system for further processing. The state processor 1108 can operate on information found in the cache system once it is looked up by means of the lookup/update engine request, and the flow insertion/deletion engine 1110 can create new entries in the cache system if required based on information in the unified flow key buffer 1103. The cache retrieves information as required from the memory through the memory interface 1123 and the unified memory controller 1119, and updates information as required in the memory through the memory controller 1119.

There are several interfaces to components of the system external to the module of FIG. 11 for the particular hardware implementation. These include host bus interface 1122, which is designed as a generic interface that can operate with any kind of external processing system such as a microprocessor or a multiplexor (MUX) system. Consequently, one can connect the overall traffic classification system of FIGS. 11 and 12 into some other processing system to manage the classification system and to extract data gathered by the system.

The memory interface 1123 is designed to interface to any of a variety of memory systems that one may want to use to store the flow-entries. One can use different types of memory systems like regular dynamic random access memory (DRAM), synchronous DRAM, synchronous graphic memory (SGRAM), static random access memory (SRAM), and so forth.

FIG. 10 also includes some "generic" interfaces. There is a packet input interface 1012—a general interface that works in tandem with the signals of the input buffer interface control 1022. These are designed so that they can be used with any kind of generic systems that can then feed packet information into the parser. Another generic interface is the interface of pipes 1031 and 1033 respectively out of and into host interface multiplexor and control registers 1005. This enables the parsing system to be managed by an external system, for example a microprocessor or another kind of external logic, and enables the external system to program and otherwise control the parser.

The preferred embodiment of this aspect of the invention is described in a hardware description language (HDL) such as VHDL or Verilog. It is designed and created in an HDL so that it may be used as a single chip system or, for instance, integrated into another general-purpose system that is being designed for purposes related to creating and analyzing traffic within a network. Verilog or other HDL implementation is only one method of describing the hardware.

In accordance with one hardware implementation, the elements shown in FIGS. 10 and 11 are implemented in a set of six field programmable logic arrays (FPGA's). The boundaries of these FPGA's are as follows. The parsing subsystem of FIG. 10 is implemented as two FPGAS; one FPGA, and includes blocks 1006, 1008 and 1012, parts of 1005, and memory 1001. The second FPGA includes 1002, 1007, 1013, 1011 parts of 1005. Referring to FIG. 11, the unified look-up buffer 1103 is implemented as a single FPGA. State processor 1108 and part of state processor instruction database memory 1109 is another FPGA. Portions of the state processor instruction database memory 1109 are maintained in external SRAM's. The lookup/update engine 1107 and the flow insertion/deletion engine 1110 are in another FPGA. The sixth FPGA includes the cache system 1115, the unified memory control 1119, and the analyzer host interface and control 1118.

Note that one can implement the system as one or more VSLI devices, rather than as a set of application specific integrated circuits (ASIC's) such as FPGA's. It is anticipated that in the future device densities will continue to increase, so that the complete system may eventually form a sub-unit (a "core") of a larger single chip unit.

Operation of the Invention

Figure 15:
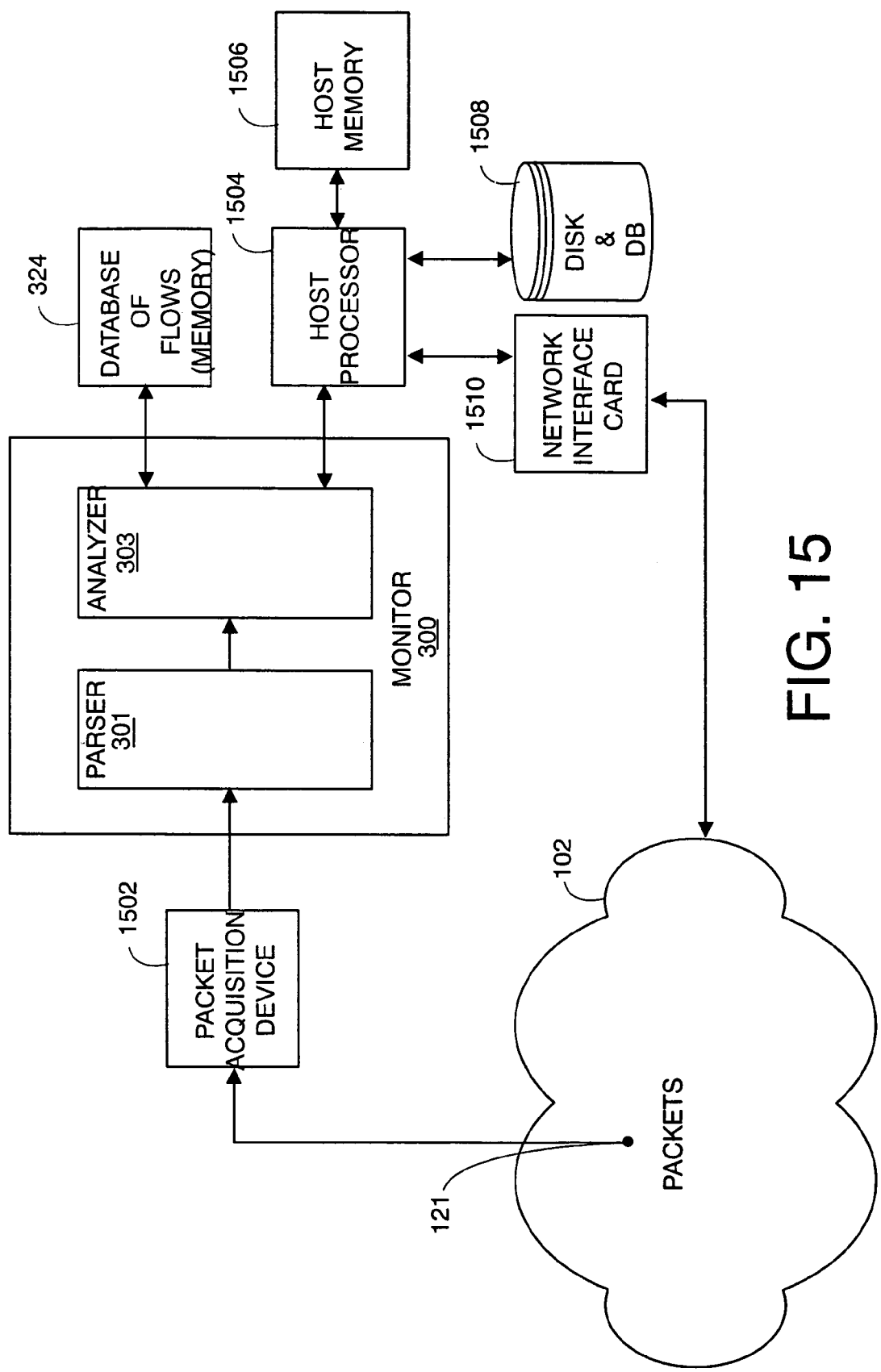
FIG. 15 is a functional block diagram of how the packet monitor of FIG. 3 (and FIGS. 10 and 11) may operate on a network with a processor such as a microprocessor.

FIG. 15 shows how an embodiment of the network monitor 300 might be used to analyze traffic in a network 102. Packet acquisition device 1502 acquires all the packets from a connection point 121 on network 102 so that all packets passing point 121 in either direction are supplied to monitor 300. Monitor 300 comprises the parser sub-system 301, which determines flow signatures, and analyzer sub-system 303 that analyzes the flow signature of each packet. A memory 324 is used to store the database of flows that are determined and updated by monitor 300. A host computer 1504, which might be any processor, for example, a general-purpose computer, is used to analyze the flows in memory 324. As is conventional, host computer 1504 includes a memory, say RAM, shown as host memory 1506. In addition, the host might contain a disk. In one application, the system can operate as an RMON probe, in which case the host computer is coupled to a network interface card 1510 that is connected to the network 102.

The preferred embodiment of the invention is supported by an optional Simple Network Management Protocol (SNMP) implementation. FIG. 15 describes how one would, for example, implement an RMON probe, where a network interface card is used to send RMON information to the network. Commercial SNMP implementations also are available, and using such an implementation can simplify the process of porting the preferred embodiment of the invention to any platform.

In addition, MIB Compilers are available. An MIB Compiler is a tool that greatly simplifies the creation and maintenance of proprietary MIB extensions.

EXAMPLES OF PACKET ELUCIDATION

Monitor 300, and in particular, analyzer 303 is capable of carrying out state analysis for packet exchanges that are commonly referred to as "server announcement" type exchanges. Server announcement is,a process used to ease communications between a server with multiple applications that can all be simultaneously accessed from multiple clients. Many applications use a server announcement process as a means of multiplexing a single port or socket into many applications and services. With this type of exchange, messages are sent on the network, in either a broadcast or multicast approach, to announce a server and application, and all stations in the network may receive and decode these messages. The messages enable the stations to derive the appropriate connection point for communicating that particular application with the particular server. Using the server announcement method, a particular application communicates using a service channel, in the form of a TCP or UDP socket or port as in the IP protocol suite, or using a SAP as in the Novell IPX protocol suite.

The analyzer 303 is also capable of carrying out "in-stream analysis" of packet exchanges. The "in-stream analysis" method is used either as a primary or secondary recognition process. As a primary process, in-stream analysis assists in extracting detailed information which will be used to further recognize both the specific application and application component. A good example of in-stream analysis is any Web-based application. For example, the commonly used PointCast Web information application can be recognized using this process; during the initial connection between a PointCast server and client, specific key tokens exist in the data exchange that will result in a signature being generated to recognize PointCast.

The in-stream analysis process may also be combined with the server announcement process. In many cases in-stream analysis will augment other recognition processes. An example of combining in-stream analysis with server announcement can be found in business applications such as SAP and BAAN.

"Session tracking" also is known as one of the primary processes for tracking applications in client/server packet exchanges. The process of tracking sessions requires an initial connection to a predefined socket or port number. This method of communication is used in a variety of transport layer protocols. It is most commonly seen in the TCP and UDP transport protocols of the IP protocol.

During the session tracking, a client makes a request to a server using a specific port or socket number. This initial request will cause the server to create a TCP or UDP port to exchange the remainder of the data between the client and the server. The server then replies to the request of the client using this newly created port. The original port used by the client to connect to the server will never be used again during this data exchange.

One example of session tracking is TFTP (Trivial File Transfer-Protocol), a version of the TCP/IP FTP protocol that has no directory or password capability. During the client/server exchange process of TFTP, a specific port (port number 69) is always used to initiate the packet exchange. Thus, when the client begins the process of communicating, a request is made to UDP port 69. Once the server receives this request, a new port number is created on the server. The server then replies to the client using the new port. In this example, it is clear that in order to recognize TFTP; network monitor 300 analyzes the initial request from the client and generates a signature for it. Monitor 300 uses that signature to recognize the reply. Monitor 300 also analyzes the reply from the server with the key port information, and uses this to create a signature for monitoring the remaining packets of this data exchange.

Network monitor 300 can also understand the current state of particular connections in the network. Connection-oriented exchanges often benefit from state tracking to correctly identify the application. An example is the common TCP transport protocol that provides a reliable means of sending information between a client and a server. When a data exchange is initiated, a TCP request for synchronization message is sent. This message contains a specific sequence number that is used to track an acknowledgement from the server. Once the server has acknowledged the synchronization request, data may be exchanged between the client and the server. When communication is no longer required, the client sends a finish or complete message to the server, and the server acknowledges this finish request with a reply containing the sequence numbers from the request. The states of such a connection-oriented exchange relate to the various types of connection and maintenance messages.

Server Announcement Example

The individual methods of server announcement protocols vary. However, the basic underlying process remains similar. A typical server announcement message is sent to one or more clients in a network. This type of announcement message has specific content, which, in another aspect of the invention, is salvaged and maintained in the database of flow-entries in the system. Because the announcement is sent to one or more stations, the client involved in a future packet exchange with the server will make an assumption that the information announced is known, and an aspect of the inventive monitor is that it too can make the same assumption.

Sun-RPC is the implementation by Sun Microsystems, Inc. (Palo Alto, Calif.) of the Remote Procedure Call (RPC), a programming interface that allows one program to use the services of another on a remote machine. A Sun-RPC example is now used to explain how monitor 300 can capture server announcements.

A remote program or client that wishes to use a server or procedure must establish a connection, for which the RPC protocol can be used.

Each server running the Sun-RPC protocol must maintain a process and database called the port Mapper. The port Mapper creates a direct association between a Sun-RPC program or application and a TCP or UDP socket or port (for TCP or UDP implementations). An application or program number is a 32-bit unique identifier assigned by ICANN (the Internet Corporation for Assigned Names and Numbers, www.icann.org), which manages the huge number of parameters associated with Internet protocols (port numbers, router protocols, multicast addresses, etc.) Each port Mapper on a Sun-RPC server can present the mappings between a unique program number and a specific transport socket through the use of specific request or a directed announcement. According to ICANN, port number 111 is associated with Sun RPC.

As an example, consider a client (e.g., CLIENT 3 shown as 106 in FIG. 1) making a specific request to the server (e.g., SERVER 2 of FIG. 1, shown as 110) on a predefined UDP or TCP socket. Once the port Mapper process on the sun RPC server receives the request, the specific mapping is returned in a directed reply to the client.

1. A client (CLIENT 3, 106 in FIG. 1) sends a TCP packet to SERVER 2 (110 in FIG. 1) on port 111, with an RPC Bind Lookup Request (rpcBindLookup). TCP or UDP port 111 is always associated Sun RPC. This request specifies the program (as a program identifier), version, and might specify the protocol (UDP or TCP).
2. The server SERVER 2 (110 in FIG. 1) extracts the program identifier and version identifier from the request. The server also uses the fact that this packet came in using the TCP transport and that no protocol was specified, and thus will use the TCP protocol for its reply.
3. The server 110 sends a TCP packet to port number 111, with an RPC Bind Lookup Reply. The reply contains the specific port number (e.g., port number 'port') on which future transactions will be accepted for the specific RPC program identifier (e.g., Program 'program') and the protocol (UDP or TCP) for use.

It is desired that from now on every time that port number 'port' is used, the packet is associated with the application program 'program' until the number 'port' no longer is to be associated with the program 'program'. Network monitor 300 by creating a flow-entry and a signature includes a mechanism for remembering the exchange so that future packets that use the port number 'port' will be associated by the network monitor with the application program 'program'.

In addition to the Sun RPC Bind Lookup request and reply, there are other ways that a particular program—say 'program'—might be associated with a particular port number, for example number 'port'. One is by a broadcast announcement of a particular association between an application service and a port number, called a Sun RPC portMapper Announcement. Another, is when some server—say the same SERVER 2—replies to some client—say CLIENT 1—requesting some portMapper assignment with a RPC portMapper Reply. Some other client—say CLIENT 2—might inadvertently see this request, and thus know that for this particular server, SERVER 2, port number 'port' is associated with the application service 'program'. It is desirable for the network monitor 300 to be able to associate any packets to SERVER 2 using port number 'port' with the application program 'program'.

Figure 9:
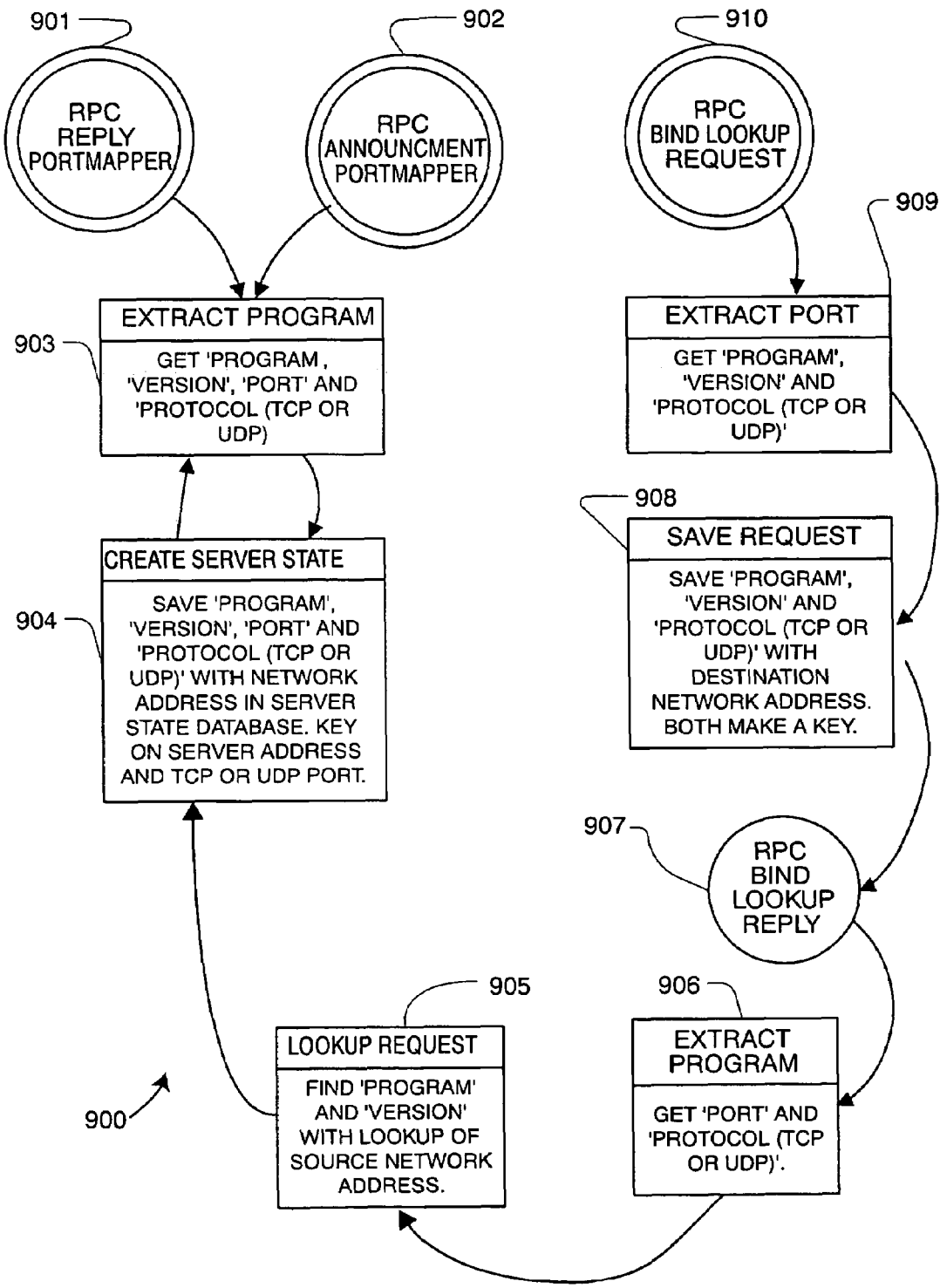
FIG. 9 is a flowchart of an exemplary Sun Microsystems Remote Procedure Call application than may be recognized by the inventive packet monitor.

FIG. 9 represents a dataflow 900 of some operations in the monitor 300 of FIG. 3 for Sun Remote Procedure Call. Suppose a client 106 (e.g., CLIENT 3 in FIG. 1) is communicating via its interface to the network 118 to a server 110 (e.g., SERVER 2 in FIG. 1) via the server's interface to the network 116. Further assume that Remote Procedure Call is used to communicate with the server 110. One path in the data flow 900 starts with a step 910 that a Remote Procedure Call bind lookup request is issued by client 106 and ends with the server state creation step 904. Such RPC bind lookup request includes values for the 'program,' 'version,' and 'protocol' to use, e.g., TCP or UDP. The process for Sun RPC analysis in the network monitor 300 includes the following aspects.:

Process 909: Extranct the 'program,' 'version,' and 'protocol' (UDP or TCP). Extract the TCP or UDP port (process 909) which is 111 indicating Sun RPC.

Process 908: Decode the Sun RPC packet. Check RPC type field for ID. If value is portMapper, save paired socket (i.e., dest for destination address, src for source address). Decode ports and mapping, save ports with socket/addr key. There may be more than one pairing per mapper packet. Form a signature (e.g., a key). A flow-entry is created in database 324. The saving of the request is now complete.

At some later time, the server (process 907) issues a RPC bind lookup reply. The packet monitor 300 will extract a signature from the packet and recognize it from the previously stored flow. The monitor will get the protocol port number (906) and lookup the request (905). A new signature (i.e., a key) will be created and the creation of the server state (904) will be stored as an entry identified by the new signature in the flow-entry database. That signature now may be used to identify packets associated with the server.

The server state creation step 904 can be reached not only from a Bind Lookup Request/Reply pair, but also from a RPC Reply portMapper packet shown as 901 or an RPC Announcement portMapper shown as 902. The Remote Procedure Call protocol can announce that it is able to provide a particular application service. Embodiments of the present invention preferably can analyze when an exchange occurs between a client and a server, and also can track those stations that have received the announcement of a service in the network.

The RPC Announcement portMapper announcement 902 is a broadcast. Such causes various clients to execute a similar set of operations, for example, saving the information obtained from the announcement. The RPC Reply portMapper step 901 could be in reply to a portMapper request, and is also broadcast. It includes all the service parameters.

Thus monitor 300 creates and saves all such states for later classification of flows that relate to the particular service 'program'.

Figure 2:
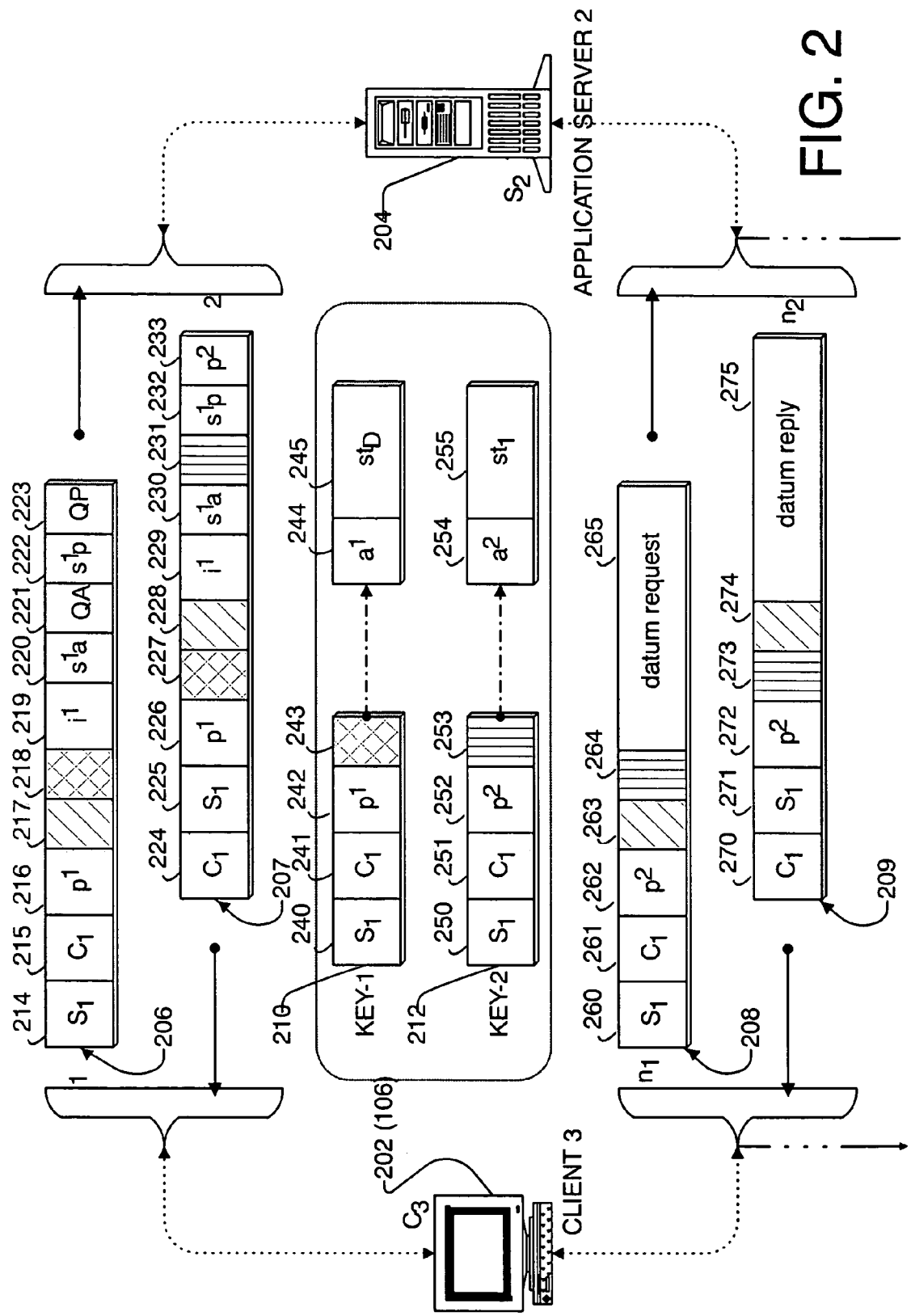
FIG. 2 is a diagram representing an example of some of the packets and their formats that might be exchanged in starting, as an illustrative example, a conversational flow between a client and server on a network being monitored and analyzed. A pair of flow signatures particular to this example and to embodiments of the present invention is also illustrated. This represents some of the possible flow signatures that can be generated and used in the process of analyzing packets and of recognizing the particular server applications that produce the discrete application packet exchanges.

FIG. 2 shows how the monitor 300 in the example of Sun RPC builds a signature and flow states. A plurality of packets 206-209 are exchanged, e.g., in an exemplary Sun Microsystems Remote Procedure Call protocol. A method embodiment of the present invention might generate a pair of flow signatures, "signature-1" 210 and "signature-2" 212, from information found in the packets 206 and 207 which, in the example, correspond to a Sun RPC Bind Lookup request and reply, respectively.

Consider first the Sun RPC Bind Lookup request. Suppose packet 206 corresponds to such a request sent from CLIENT 3 to SERVER 2. This packet contains important information that is used in building a signature according to an aspect of the invention. A source and destination network address occupy the first two fields of each packet, and according to the patterns in pattern database 308, the flow signature (shown as KEY1 230 in FIG. 2) will also contain these two fields, so the parser subsystem 301 will include these two fields in signature KEY 1 (230). Note that in FIG. 2, if an address identifies the client 106 (shown also as 202), the label used in the drawing is "$C_1$". If such address identifies the server 110 (shown also as server 204), the label used in the drawing is "$S_1$". The first two fields 214 and 215 in packet 206 are "$S_1$" and $C_1$" because packet 206 is provided from the server 110 and is destined for the client 106. Suppose for this example, "$S_1$" is an address numerically less than address "$C_1$". A third field "$p^1$" 216 identifies the particular protocol being used, e.g., TCP, UDP, etc.

In packet 206, a fourth field 217 and a fifth field 218 are used to communicate port numbers that are used. The conversation direction determines where the port number field is. The diagonal pattern in field 217 is used to identify a source-port pattern, and the hash pattern in field 218 is used to identify the destination-port pattern. The order indicates the client-server message direction. A sixth field denoted "$i^1$" 219 is an element that is being requested by the client from the server. A seventh field denoted "$s_1a$" 220 is the service requested by the client from server 110. The following eighth field "QA" 221 (for question mark) indicates that the client 106 wants to know what to use to access application "$s_1a$". A tenth field "QP" 223 is used to indicate that the client wants the server to indicate what protocol to use for the particular application.

Packet 206 initiates the sequence of packet exchanges, e.g., a RPC Bind Lookup Request to SERVER 2. It follows a well-defined format, as do all the packets, and is transmitted to the server 110 on a well-known service connection identifier (port 111 indicating Sun RPC).

Packet 207 is the first sent in reply to the client 106 from the server. It is the RPC Bind Lookup Reply as a result of the request packet 206.

Packet 207 includes ten fields 224-233. The destination and source addresses are carried in fields 224 and 225, e.g., indicated "$C_1$" and "$S_1$", respectively. Notice the order is now reversed, since the client-server message direction is from the server 110 to the client 106. The protocol "$p^1$" is used as indicated in field 226. The request "$i^1$" is in field 229. Values have been filled in for the application port number, e.g., in field 233 and protocol ""$p^2$"" in field 233.

The flow signature and flow states built up as a result of this exchange are now described. When the packet monitor 300 sees the request packet 206 from the client, a first flow signature 210 is built in the parser subsystem 301 according to the pattern and extraction operations database 308. This signature 210 includes a destination and a source address 240 and 241. One aspect of the invention is that the flow keys are built consistently in a particular order no matter what the direction of conversation. Several mechanisms may be used to achieve this. In the particular embodiment, the numerically lower address is always placed before the numerically higher address. Such least to highest order is used to get the best spread of signatures and hashes for the lookup operations. In this case, therefore, since we assume "$S_1$"<"$C_1$", the order is address "$S_1$" followed by client address "$C_1$". The next field used to build the signature is a protocol field 242 extracted from packet 206's field 216, and thus is the protocol "$p^1$". The next field used for the signature is field 243, which contains the destination source port number shown as a crosshatched pattern from the field 218 of the packet 206. This pattern will be recognized in the payload of packets to derive how this packet or sequence of packets exists as a flow. In practice, these may be TCP port numbers, or a combination of TCP port numbers. In the case of the Sun RPC example, the crosshatch represents a set of port numbers of UDS for $p^1$ that will be used to recognize this flow (e.g., port 111). Port 111 indicates this is Sun RPC. Some applications, such as the Sun RPC Bind Lookups, are directly determinable ("known") at the parser level. So in this case, the signature KEY-1 points to a known application denoted "$a^1$" (Sun RPC Bind Lookup), and a next-state that the state processor should proceed to for more complex recognition jobs, denoted as state "$st_D$" is placed in the field 245 of the flow-entry.

When the Sun RPC Bind Lookup reply is acquired, a flow signature is again built by the parser. This flow signature is identical to KEY-1. Hence, when the signature enters the analyzer subsystem 303 from the parser subsystem 301, the complete flow-entry is obtained, and in this flow-entry indicates state "$st_D$". The operations for state "$st_D$" in the state processor instruction database 326 instructs the state processor to build and store a new flow signature, shown as KEY-2 (212) in FIG. 2. This flow signature built by the state processor also includes the destination and a source addresses 250 and 251, respectively, for server "$S_1$" followed by (the numerically higher address) client "$C_1$". A protocol field 252 defines the protocol to be used, e.g., "$p^2$" which is obtained from the reply packet. A field 253 contains a recognition pattern also obtained from the reply packet. In this case, the application is Sun RPC, and field 254 indicates this application "$a^2$". A next-state field 255 defines the next state that the state processor should proceed to for more complex recognition jobs, e.g., a state "$st^1$". In this particular example, this is a final state. Thus, KEY-2 may now be used to recognize packets that are in any way associated with the application "$a^2$". Two such packets 208 and 209 are shown, one in each direction. They use the particular application service requested in the original Bind Lookup Request, and each will be recognized because the signature KEY-2 will be built in each case.

The two flow signatures 210 and 212 always order the destination and source address fields with server "$S_1$" followed by client "$C_1$". Such values are automatically filled in when the addresses are first created in a particular flow signature. Preferably, large collections of flow signatures are kept in a lookup table in a least-to-highest order for the best spread of flow signatures and hashes.

Thereafter, the client and server exchange a number of packets, e.g., represented by request packet 208 and response packet 209. The client 106 sends packets 208 that have a destination and source address $S_1$ and $C_1$, in a pair of fields 260 and 261. A field 262 defines the protocol as "$p^2$", and a field 263 defines the destination port number.

Some network-server application recognition jobs are so simple that only a single state transition has to occur to be able to pinpoint the application that produced the packet. Others require a sequence of state transitions to occur in order to match a known and predefined climb from state-to-state.

Thus the flow signature for the recognition of application "$a^2$" is automatically set up by predefining what packet-exchange sequences occur for this example when a relatively simple Sun Microsystems Remote Procedure Call bind lookup request instruction executes. More complicated exchanges than this may generate more than two flow signatures and their corresponding states. Each recognition may involve setting up a complex state transition diagram to be traversed before a "final" resting state such as "$st_1$" in field 255 is reached. All these are used to build the final set of flow signatures for recognizing a particular application in the future.

The State Processor in Detail

The state processor 1108 analyzes both new and existing flows in order to classify them by application. It does this by proceeding from state to state based on rules defined by the engineer. A rule is a test followed by the next state to proceed to if the test is true. The state processor 1108 goes through each rule until the test is true or there are no more tests to perform. The state processor 1108 starts the process by using the last protocol recognized by parser subsystem 1000 as an offset into a jump table (the jump vector). The jump table takes us to the instructions to use for that protocol. Most instructions test something in the unified flow key buffer 1103 or the flow-entry if it exists. The state processor 1108 may have to test bits, do comparisons, add or subtract to perform the test.

In most common processing systems, the set of instructions implemented are general purpose in nature. All processing systems have a typical set of instructions related to the analysis and manipulation of the Instruction and program counters. These instructions include Jump, Call and Return. In addition, these same processing systems contain the appropriate instructions to analyze and manipulate registers and memory locations. These instructions include Increment, Decrement and Move; Compare and Logical manipulation.

The state processor 1108 of the preferred embodiment also includes such a basic set of standard instructions. However, the preferred embodiment state processor 1108 has some very specific functions that are required in order to evaluate the content of and data within packets on networks. There are four specific functions performed by the preferred embodiment state processor to meet these objectives. Two of these are specialized conversion instructions designed to interpret and transpose text elements in a specific for into a mathematical and numerical format. These instructions are AH2B (ASCII Hexadecimal to Binary) and AD2D (ASCII Decimal to Binary). These instructions are single cycle in nature. These instructions are novel and included to provide for the time sensitive nature of the functions performed by the preferred embodiment state processor.

In order to have the system make speed and meet the objective for classification, there are several other special functions provided in the State Processor. These functions primarily deal with seeking, locating, analyzing and evaluating sequences of strings. These strings can be either formatted or unformatted.

The primary high level instructions are the In_Find and In_Find_CONTINUE instructions, and are implemented by a searching apparatus (search engine) that is part of the state processor. These functions and the searching apparatus have been designed to make the state processor 1108 capable of simultaneous searching payload content from a packet sent into the monitor 300. This enables the monitor to scale and meet any network speed requirements.

Figure 19:
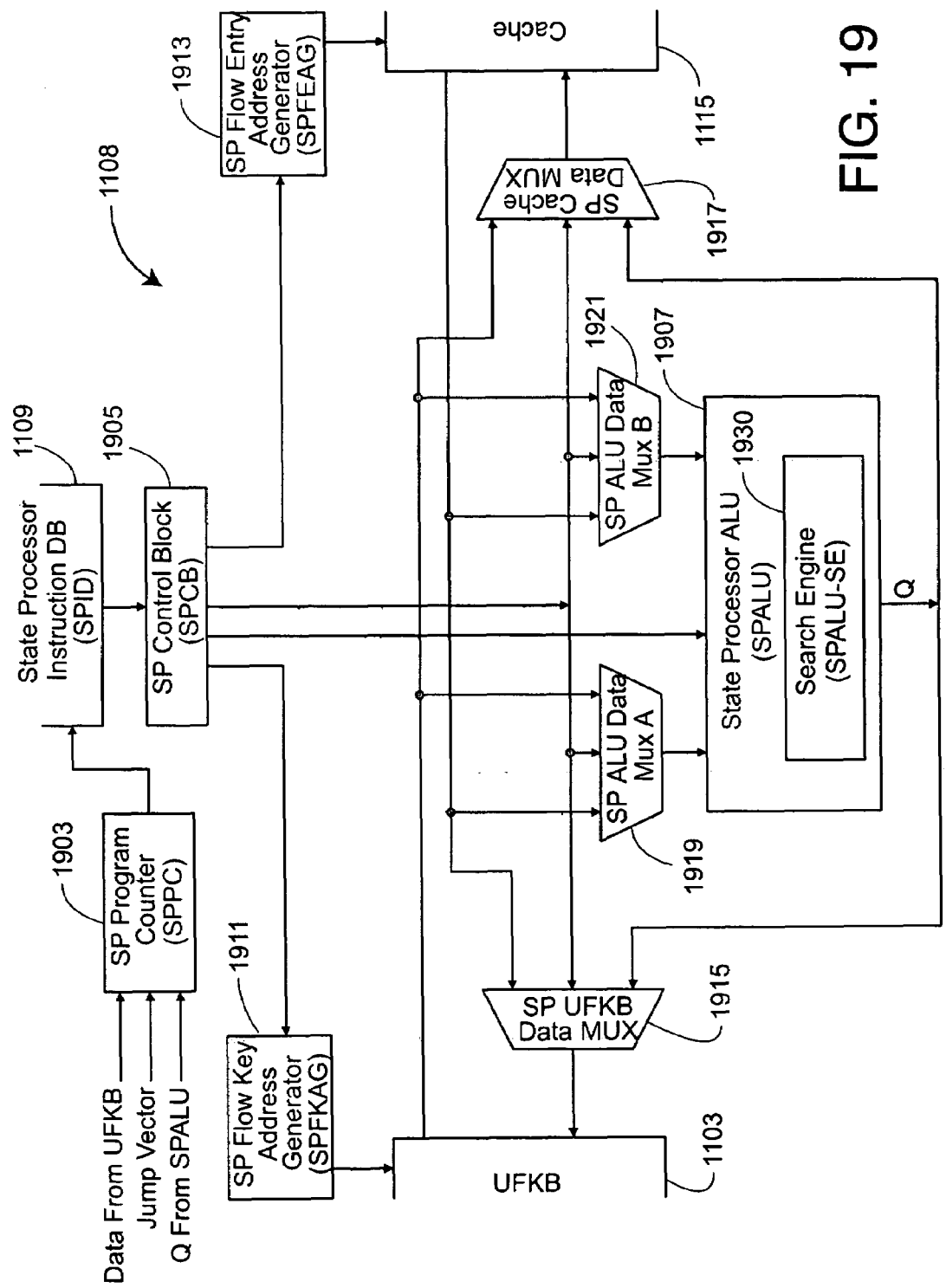
FIG. 19 is a block diagram of the state processor component of the analyzer subsystem of FIG. 11.

The state processor is shown in FIG. 19 as processor 1108. It executes its instructions from the state processor instruction database (SPID) 1109 which if filled by the host CPU as part of the compilation process 310. The SP 1108 contains several sub blocks including a program counter 1903 (SPPC) a control block 1905 (SPCB), an arithmetic logic unit 1907 (SPALU), address generators and data bus multiplexors (Muxes) to enable the movement of data from various sources to various destinations. The two address generators are a SP flow key address generator 1911 (SPFKAG) that points to the UFKB and a SP flow-entry address generator 1913 (SPFEAG) that points to the cache subsystem 1115. The SP 1108 also includes four data Muxes: SP ALU Data Mux A 1919, SP ALU Data Mux B 1921, SP UFKB Data Mux 1915, and SP Cache Data Mux 1917. These Muxes facilitate the movement of data within the various blocks of the state processor 1108 and to/from the UFKB 1103 and the cache subsystem 1115.

The SP control block 1905 decodes instructions coming out of the SPID 1109 and separates them into various fields to control the state processor 1108. The main function of the SPCB 1905 is instruction decoding and control signal generation. There are two classes of instructions. One that are executed completely by the SPCB and one that are passed along to the SPALU 1907 for partial or complete execution. Some of the SP instructions are described herein below.

When an instruction needs to be passed to the SPALU 1907, the SPCB 1905 decodes the instruction and supplies the SPALU 1907 instruction code on a bus and asserts a "Go" signal.

When an instruction, e.g., a move or jump instruction, can be completely executed by the SPCB 1905, the SPCB generates the appropriate control signals to the SP program counter 1903, SP Address Generators 1911 and/or 1913, and the SP Muxes in order to implement the specific move or jump instruction.

Words in the SPID 1109 are 40 bits long and partitioned into various fields by the SPCB 1905 depending on the instruction code. One field is the instruction code. The remaining bits in the SPID word is partitioned into various fields depending on the accompanying instruction. For example, the SP 1108 can implement Jump, Call, Wait, and WaitRJ instructions that are followed by a condition code and a jump address. The SP 1108 also can execute a Move Immediate instruction that is followed by the constant value. Furthermore, SP 1008 can execute Load Address Generator instructions that are followed by the address to be loaded. Upon decoding the instruction field, the SPCB generates a combination of control signals from an included decode PAL. These control signals select the various Muxes that facilitate data movement and generate strobe signals that load values in various registers.

The program counter SPPC 1903 generates the address to the state processor instruction database. It contained an instruction pointer that generates the SPID 1109 address.

The instruction pointer can be incremented or loaded from a jump vector multiplexor that facilitates conditional branching. The instruction pointer can be loaded from one of three sources: (1) a protocol identifier from the UFKB, (2) an immediate jump vector form the currently decoded instruction or (3) a value provided by the SPALU 1907.

After a flow signature is placed in the UFKB by the LUE with a known protocol identifier, the program counter 1903 is initialized with the last protocol recognized by the parser subsystem. This first instruction is a jump to the subroutine that analyzes the protocol that was decoded.

In order to facilitate JUMP immediate instructions, the program counter takes an input field from the SPCB 1905 with the jump vector and loads the instruction pointer with the jump vector.

The state processor ALU 1907 contains all the arithmetic, logical and string compare functions necessary to implement the state processor instructions. The main blocks of the SP ALU 1907 are: an A register and a B register, instruction decode & state machines, a reference string memory, a search engine 1930, an output data register and an output control register.

The state processor ALU search engine 1930 (SPALU_SE) in turn contains a target search register set, a reference search register set, and a compare block. The search engine 1930 is able to search for up to several (four in our embodiment) reference strings anywhere in a target, and, if one of the reference strings is found, returns which reference string and the position in the target of the reference string.

The flow key address generator 1911 generates the address to where the state processor 1108 is accessing in the unified flow key buffer. The main blocks of the SPFKAG are a flow key address pointer register, and a ROM decode that generates addresses.

The flow-entry address generator 1913 provides. the address where the state processor 1108 is accessing the flow-entry in the cache subsystem 1115. If a flow-entry exists, the upper address bits come from the hash is used to lookup the bucket in the flow database 324. The middle bits come from the bucket entry found. The lower bits come from the offset the state processor 1108 is using.

The main blocks of the SPFKAG are a flow key pointer register, and a ROM decode that generates addresses.

The state processor UFKB Data Mux 1915 selects the data source destined to the UFKB. It multiplexes one of three sources of data into the UFKB. The three sources are an ALU output data bus, the cache output data bus and the SPCB data. The select signal is a 2-bit signal.

The state processor Cache Data Mux 1917 selects the data source destined to the cache subsystem out of four sources of data into the cache subsystem. -The four sources are: the ALU output data bus, the lower bits of the UFKB data bus, the upper bits of the UFKB data bus and the SPCB Data. The select signal is a 2-bit signal. In order to allow for 16 bit moves, the SPMUXCA incorporates two 16 bit Muxes that supply information to the lower and upper 16 bits of the cache subsystem.

The State Processor ALU Data Mux A 1919 selects the data source destined to the UFKB and multiplexes one of three sources of 32 bit data into the A side of the ALU. The three sources are the cache subsystem data bus, the lower 32 bits of the UFKB data bus and the upper 32 bits of the UFKB data bus. The select signal is a 2-bit signal.

The state processor ALU Data Mux B 1919 selects the data source destined to the B side of the SP ALU and multiplexes one of two sources of 32 bit data into the B side of the ALU. The two sources are the cache subsystem data bus, an the SPCB data word. The select signal is a 1-bit signal.

State Processor Instruction Definitions

The following sections describe some of the instructions available in the state processor 1108. It should be noted that typically, no assembler is provided for the state processor 1108. This is because the engineer typically need not write code for this processor. The Compiler writes the code and loads it into the state processor instruction database from the protocols defined in the Protocol List (PDL files).

The table is divided into two embodiments, embodiment 1, and embodiment 2 which is a more complex embodiment that includes more complex versions of embodiment 1 instructions and additional instructions.

| State Processor Instruction Definition | |
|---|---|
| Instruction | Description |
| EMBODIMENT 1 Instructions (a simpler embodiment) | |
| In_Noop | No Operation |
| In_Wait | Wait for a condition to occur, jump absolute based on the condition |
| In_Call | Call a subroutine |
| In_Return | Return from a subroutine |
| In_WaitJR | Wait for a condition to occur, jump relative based on the condition |
| In_Jump | Jump to an immediate jump vector based on a condition |
| In_Move | Move Data from Location X, to Location Y |
| In_Load_FKAG | Load the FK Address Generator 1911 |
| In_Inc_FKAG | Increment the FK Address Generator 1911 |
| In_Dec_FKAG | Decrement the FK Address Generator 1911 |
| In_Load_FEAG | Load the FE Address Generator 1913 |
| In_Inc_FEAG | Increment the FE Address Generator 1913 |
| In_Dec_FEAG | Decrement the FE Address Generator 1913 |
| In_Set_SPDone | Set the SP Done Bit, a bot to indicate SP1108 done |
| EMBODIMENT 1 ALU Instructions | |
| In_INC | Increment the value in the A Register |
| In_DEC | Decrement the value in the A Register |
| In_ADD | ADD Register A + Register B |
| In_SUB | Subtract Register A – Register B |
| In_AND | Bitwise OR Register A, Register B |
| In_OR | Bitwise OR Register A, Register B |
| In_XOR | Bitwise XOR Register A, Register B |
| In_COM | Bitwise Complement Register A |
| In_Simple_Compare | Compare Reg A, with Reg B. Returns a SPALU_MATCH if equal |
| EMBODIMENT 2 ALU Instructions (more complex implementation) | |
| In_Compare | See if the string at a fixed location matches one in a reference string array of reference strings |
| In_Find | Find a string (or a set of strings) in a range, with the starting position unknown |
| In_FindContinue | Perform a Find operation starting from the location where the last string was found. |
| In_AD2B | Convert an ASCII Decimal character to Binary |
| In_AD2BContinue | Convert an ASCII Decimal character to Binary |
| In_AH2B | Convert an ASCII Hex character to Binary |
| In_AH2BContinue | Convert an ASCII Hex character to Binary |

Some of these instructions are now described in more detail.

Move

The move instruction set includes specific move instructions that deal with moving different size words from a source to a destination. The set of Move instructions has been developed to ensure the word sizes always match, and includes 32 bit and 16 bit Move instructions The Move instruction moves data from: immediate data to the SP ALU B register, immediate data to the cache subsystem, immediate data to the UFKB, the SP ALU Output to the UFKB, the SP ALU Output to the cache subsystem, the cache to the UFKB, the cache to the SP ALU A register, the cache to the SP ALU B register, UFKB to the cache subsystem, and the UFKB to the SP ALU A register.

In_Compare

The In_Compare instruction instructs the ALU 1907 to perform a compare operation and return a MATCH signal along with the matched string information. A compare operation compares a target data whose first character is located at a known location in the UFKB, and a known reference string in the reference string memory. Prior to executing this instruction, the SP UFKB address generator 1911 is loaded with the address pointing to the target character. A location in the ALU reference memory holds a list of reference characters to compare.

ASCII Decimal to Binary

This instruction passes the location of an ASCII code string representing a decimal value. The result is the binary equivalent value. This is carried out in one cycle.

ASCII Hex to Binary

This instruction passes the location of an ASCII code string representing a hex value. The result is the binary equivalent value. This is carried out in one cycle.

In_Find

In_Find_Continue

These instructions are described in more detail in the following section describing the search engine 1930.

The Search Engine and SP Instructions Invoking the Search Engine

One aspect of the monitor 300 is its ability to analyze each and every packet in real time. Network traffic may move at a very fast rate. One of the tasks of the state processor 1107 is to search for one or more known strings of data. Such searches are carried out on the UFKB records, for example, in the payload section of the record. The searches may be in known parts of the record, or may be in unknown parts of the record, for example, anywhere in the payload part of a UFKB record. Furthermore, the searches may need to be carried out at extremely high rates.

The state processor ALU includes a search engine SPALU_SE 1930 for carrying out such searches. The search engine 1930 is capable of searching up to four reference strings in a target area in the UFKB, and in parallel indicates (1) if any of the four strings are found anywhere in the target, (2) which string was found, and (3) where in the target the string was found.

The search engine provides for carrying out the following state processor instructions.

In_Find

The In_Find instruction provides information to the ALU-Search Engine to perform a Find operation and return a match signal along with the matched string information and the location at which the string was found in the target.

The instruction format is as follows:

In_Find [Reference String Array Address], [UFKB Byte Offset], [Range]

| Instruction Word Definition | |
|---|---|
| Bit | Description |
| In_Find | OpCode |
| N (size of Abus) | Reference String Array Address in the ALU Reference Memory. the ALU Reference Memory can store an array of one to four reference strings to be found. Each reference string is $N_R$ units long, in our implementation, a unit is a byte, and $N_R$ is 16. |
| Offset (2:0) | UFKB Byte Offset This is the offset address pointing to a byte in the selected UFKB entry. The offset is used to determine which byte within the selected UFKB entry is the first byte location to start the find operation. If the UFKB is 64 bits (8 bytes) this field would be 3 bits wide and point to the first target byte to start the find operation. |
| Range (7:0) | The Range, in number of bytes, in the UFKB area to be searched. This means the number of bytes to search. It typically specifies how many bytes of a particular field in the particular UFKB record to search. If a full MATCH does not result after comparing this range, the find operation is concluded. |

| Reference String Memory Data Structure for In_Find Operations | |
|---|---|
| Bit Field | Description |
| # of Strings (8 bits) | # of Strings in Array indicates the total number of strings in this array. Valid numbers are 0,1,2,3 for 1,2,3 or 4 strings. 8 bits are allocated for future expansion and to simplify the implementation. |
| Size of 1st String (4 bits) | This parameter indicates the size of the 1st string in bytes. The value placed here is $N_{R1}$ −1. Valid numbers are 0-F for a string as small as 1 character and as large as 0xF characters. |

-continued

| | |
|---|---|
| Size of 2nd String (4 bits) | This parameter indicates the size of the 2nd string in bytes. The value placed here is $N_{R2}-1$. Valid numbers are 0-F for a string as small as 1 character and as large as 0xF characters. |
| Size of 3rd String (4 bits) | This parameter indicates the size of the 3rd string in bytes. The value placed here in $N_{R3}-1$. Valid numbers are 0-F for a string as small as 1 character and as large as 0xF characters. |
| Size of 4th String (4 bits) | This parameter indicates the size of the 4th string in bytes. The value placed here in $N_{R4}-1$. Valid numbers are 0-F for a string as small as 1 character and as large as 0xF characters. |
| String1 | 1 to 16 (=$N_R$) characters of string1. |
| String2 | 1 to 16 (=$N_R$) characters of string2. |
| String3 | 1 to 16 (=$N_R$) characters of string3. |
| String4 | 1 to 16 (=$N_R$) characters of string4. |
| Vector (16 bits) | This is a 16 bit (i.e., $N_R$-bit) vector returned to the program counter to point to an area in the SPID that processes the result of the In_Find. |

When the search is complete, a Search Done bit is asserted. A MATCH bit is asserted or reset based on the result of the search. A bus in the ALU, called the ALU_DATA bus, will hold the following information:

Jump_Vector[15:0]—this is a vector stored in the Reference String Array and indicates what instructions (e.g., subroutine) the state processor jumps to when a reference string is found.

String Code[1:0]—this is the string code indicating which of the reference strings was found, i.e., 0, 1, 2, or 3 for the four reference string implementation.

The location at which the string was found in the Flow Key Buffer is maintained. This is a combination of the UFKB word address and the byte location of the first character of the target found string.

The search is done if the first occurrence of any of the reference strings is found, or if there is no MATCH in the entire search range.

Consider the following example. Assume we wish to search for a reference string in the payload area of the UFKB and search starting at byte location 5 of the payload and stop searching at byte location 100. Assume the reference string is located at location 0050h. The instruction format for this example would be as follows:

In_Load_FKAG, payload address
In_Find, $0050_{16}$, 5, $60_{16}$
The range would be 100−5+1=96=$60_{16}$ Consider as a second example, searching locations $12_{16}$ to location $2A_{16}$ in the UFKB.

The following state processor instructions will achieve this.
In_Load_FKAG $02_{16}$
in_Find [Reference String Address], 2,$19_{16}$
Note that $2A_{16}-12_{16}+1=19_{16}$.

In_Find_Continue

This instruction follows an In_Find instruction and tells the ALU-Search Engine 1930 to perform a Find operation starting from the location where the last string was found and return a MATCH along with the matched string information and the location at which the target string was found. The purpose for this instruction is to facilitate searching for a new reference string starting from the location where a previous search ended. Therefore, an offset is not provided since the Search Engine will remember the location where it finished its previous search.

The instruction format is as follows:

In_Find_Continue [Reference String Array Address], [0], [Range]

Instruction Word Definition

| Bit | Description |
|---|---|
| In_Find | Opcode |
| N (size of Abus) | Reference String Array Address in the ALU Reference Memory. At this location, there is an array of one to four reference strings to be found. A Reference String Data Structure of the array is defined in the Reference Memory Data Structure section below. (Default N = 16) |
| Offset (2:0) | UFKB Byte Offset Always Zero. |
| Range (7:0) | The Range, in number of byte, in the UFKB area to be searched. This means the number of bytes to search. If a full MATCH does not result after comparing this range, the find operation is concluded. |

As an example, assume we wish to In_Find a string (String A) in the payload area of the UFKB and search starting at byte location 5 of the payload and stop searching at byte location 100. Assume the reference string (String A) is located at location $0050_{16}$. After finding the first reference string, assume we wish to continue searching for a new string (String B) in the following $30_{16}$ bytes. Assume String B is located at location 0080h.

Figure 20:
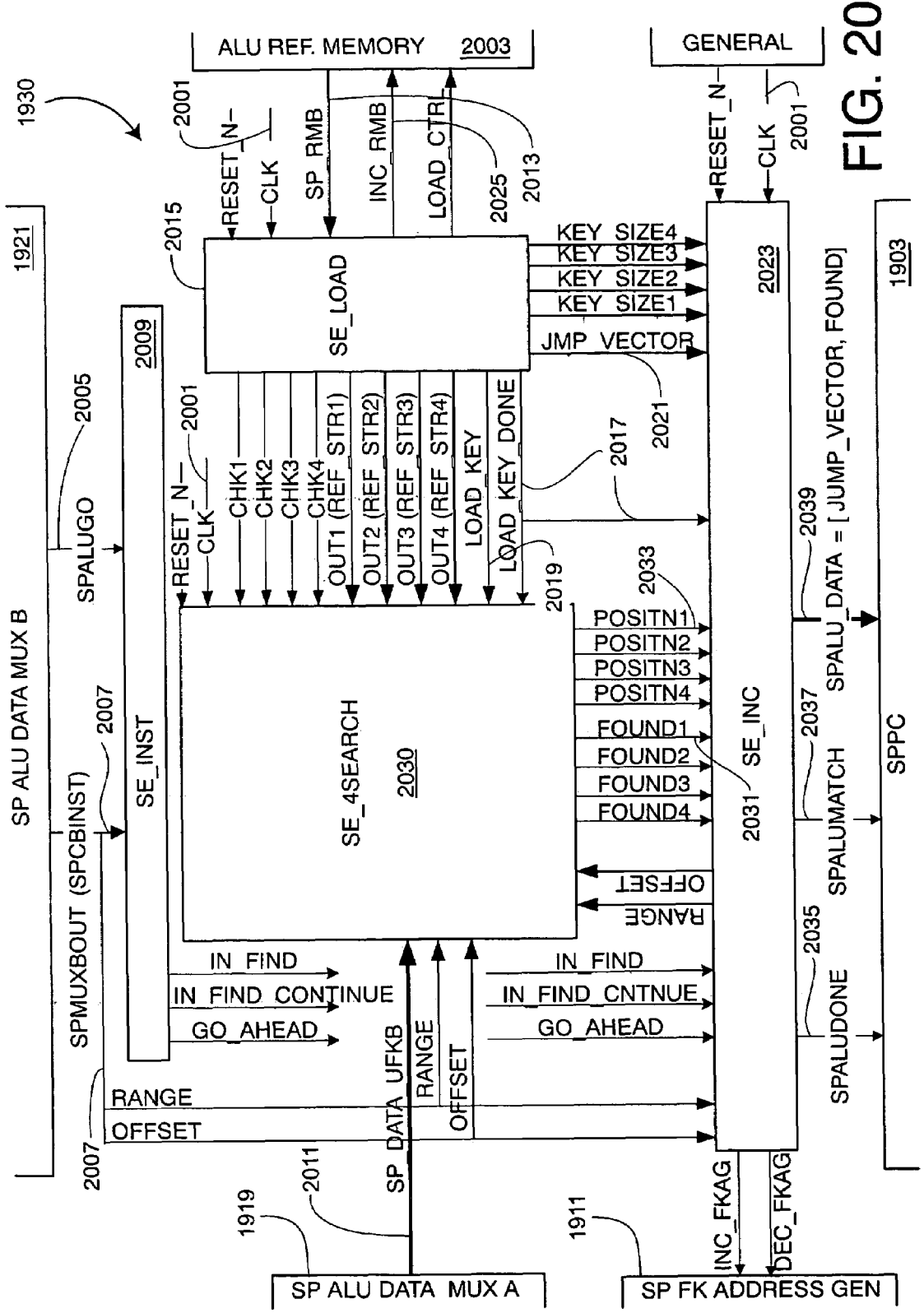
FIG. 20 is a block diagram of the search engine component of the analyzer subsystem of FIG. 11.

The instruction format for this example would be as follows:

In_Load_FKAG, payload address
In_Find, 005016, 5, 6016
. . .
In_Find_Continue, $0080_{16}$, 5, $30_{16}$
The range would be 100−5+1=96=$60_{16}$ FIG. 20 is an overall block diagram of the search engine (SPALU_SE) 1930 that is part of the ALU 1907 and that executes the In_Find and In_Find_Continue instructions issued to the ALU 1907. The In_Find Instructions searches an area of the UFKB and looks for up to four possible reference strings in the target (UFKB) area. The reference strings are stored in the ALU Reference String Memory.

As shown in FIG. 20, the Search Engine is coupled with the following components:

(a) ALU String Reference Memory 2003 where the reference strings are stored.

(b) SPALU Data Mux A 1919 through which the target data 2011 for matching with the reference string is supplied.

This is coupled to the UFKB during operation of the In_Find instruction using SP_UFKB Data Mux 1915.

(c) SPALU Data Mux B 1921 through which the instruction code is supplied, including the "Go" signal SPALUGO 2005 to start the search.

(d) The state processor flow key address generator 1911 used to increment and decrement the UFKB address.

(e) The state processor program counter 1903 where the results of the search are reported.

The system is run by a clock signal CLK 2001 and may be reset by a RESET signal. An instruction decode block SE_INST 2009 decodes the instruction code for In_Find and In_Find_Continue and starts the Search Engine upon the activation of the SPALUGO signal 2005. The Search Engine continuously monitors the SPMuxB 1921 output bus 2007 and SPALUGO signal 2005 to detect the In_Find and In_Find_Continue instructions. During operation of the search engine 1930 the engine receives the target data 2011, in word size, from the UFKB 1103 through SPMUXA 1919. Similarly, the reference string(s) from the appropriate address of a reference string memory 2003 arrives as data SP_Data_RMB 2013.

A Search Engine Reference Load (SE_LOAD) module 2015 is responsible for "priming" reference string registers once an In_Find or In_Find_Continue instruction is issued. It takes a reference string array from the reference string memory 2003 and interprets it and loads the reference string registers with the information.

In the processing state, the SE-LOAD module 2015 first loads the first word from the starting location of the reference memory 2003. The starting location is assumed to be set up at the proper location prior to issuing of the instruction. Once the number of strings and the size of the strings are loaded, the loading process continues loading all of the reference strings. An increment reference signal 2025 increments the reference memory from where the reference string is being loaded. During the loading of the strings, a LOAD_KEY_DONE signal 2017 is unasserted. A LOAD_KEY signal 2019 is pulsed when the last word of the last reference string is being loaded indicating to the search_engine_module 2030 to start searching from the next clock cycle. The LOAD_KEY_DONE signal 2017 is asserted during the next clock cycle and the jump vector 2021 is loaded at the same time from the Reference Memory 2003.

The Search Engine Increment/Control module (SE_INC) 2023 is responsible for incrementing the flow key address generator 1911 in order to supply new words from the UFKB to the Search Engine. It monitors the found signals out of the Search Engine modules and reports results. SE_INC 2023 is also responsible for calculating true ending address and determines the last byte to be checked in the last word based on the Range provided in the In_Find instruction.

The SE-4SEARCH 2030 module includes four search engines to search for four strings simultaneously. The engine outputs a found signal 2031 and a position signal 2033 for each of the four reference strings to indicate if and where the string was found.

The assertion of SPALU_Done signal 2035 by SE-INC 2023 indicates the search is completed. If the SPALU_Match signal 2037 is asserted at the same time then it is a successful search. The successful search also results in the SPALU_Data bus 2039 carrying the jump vector along with the search engine number that found the reference string.

One aspect of the invention is the speediness of searching. The longest time for the SPALU_Done 2035 to be asserted from the time the instruction is issued for searching anywhere in a number N of words in the UFKB is N clock cycles plus an additional number of clock cycles for preloading and pointer adjustment in case of successful search. In our embodiment, this additional overhead is 11 clock cycles. Therefore, each extra word takes only one clock cycle.

Figure 21:
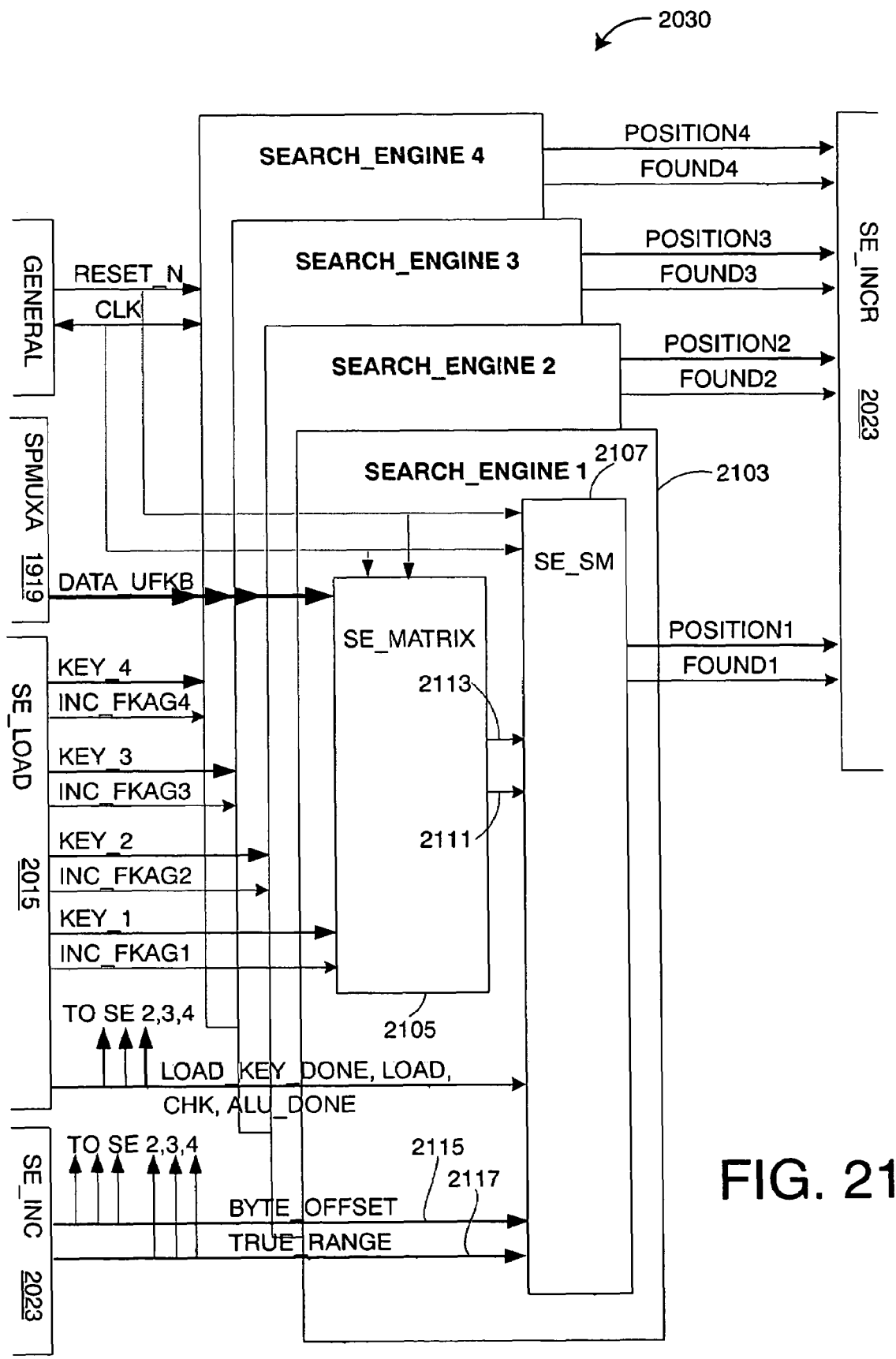
FIG. 21 is a dataflow block diagram showing four individual search modules of the search engine.

FIG. 21 shows the SE_4SEARCH module 2030 that includes four single search modules. Alternate embodiments may include more single search modules to enable searching for more than four reference strings simultaneously. Each of the four search engine modules is identical, so only one such module 2103 will be described.

Each of the single search modules 2103 performs a single reference string search. Using multiple copies of this module multiple distinct reference strings can be searched in a common source buffer (the UFKB). The module includes a core comparator matrix block 2105 (the search engine core) and a state machine SE_SM 2107. The search engine core 2105 is capable of comparing a reference string up to $N_R$ units (16 bytes in our embodiment) with a target string of three eight-byte words (loaded in three successive cycles, one word at a time). During each clock cycle, the single search modules 2103 searches for the reference string anywhere in the target starting from any of the eight bytes of the first word. Each of the reference string bytes is appended with a check bit, which indicates whether to check this byte, or not. If the check bit is asserted, then the corresponding byte checking is disabled. As 64-bit words (8 bytes) are loaded into three registers in a pipelined fashion, the comparison takes place two clock cycles after they are fetched.

The source (UFKB) address pointer needs to be adjusted if the search is successful. If the search is successful, a match signal 2111 becomes active and the position of the first byte of the reference string is placed out on a position bus 2113. The SE_SM state machine 2107 performs several tasks every clock cycle. It has three states: reset, idle, and process. While in the idle state, the state machine 2107 waits for a signal from the SE_LOAD module 2015 to switch to the Process State. During the first clock cycle in the Process State, if a match occurs then the position is checked against the byte offset 2115. If the byte offset is greater then the position, then it is ignored, i.e. found is not asserted. Similarly, if it is the last word to be checked, then the end offset byte is checked with the position and the found is ignored if the position is greater then last byte to be checked in the range 2117. Otherwise, the found signal is asserted when the match is found by the search engine core 2105 and the position is latched and forwarded to the SE_INC module 2023.

Referring now to FIG. 22A, the search engine core 2105 is the core comparator matrix of the search engine module. It searches for an $N_R$-unit reference string in a target string. It includes a reference axis and a target axis. The reference axis includes a register that holds the reference string, in general a string of $N_R$ units. The unit is a byte and $N_R$ is 16 in the preferred embodiment, and other units and the matrix may easily be modified to search for other reference string sizes. The target data is organized as words. The target axis is arranged as a series of one word registers each holding a word of target data. A word is clocked into the register in one clock cycle. Thus, the first word of the target data is clocked into the target axis in three cycles.

The search engine core 2105 includes at least one $N_R$-unit comparator each having $N_R$ pairs of inputs and an output indicating a match of each pair of the $N_R$-pairs of inputs. One such comparator 2203 is shown in FIG. 22B. The pairs of inputs are shown as (2207-1, 2209-1), (2207-2, 2202-2), ..., (2207-$N_R$, 2207-$N_R$). The output is 2211. FIG. 22A shown a number (say $N_{start}$) comparators labeled 2203-1, 2203-2, ..., 2203-$N_{start}$. Considering any one of the comparators, the search engine core also includes a matrix of connections including $N_R$ connections indicating values of the reference string along the reference axis, and $N_R$ connections indicating values of the target data along the target axis, the target data connections starting from a first starting location of the target data and ending at an ending location. The comparators are connected such that when the reference and target axes are oriented perpendicular to each other, any comparator is oriented along the diagonal of the matrix such that $N_R$ connections of the target data are compared to the reference string. Each comparator starts at a different location in the target axis. In our implementation, each word is 8 bytes long, the number of comparators $N_{start}$ is the same as the word size, and the comparators start at contiguous locations on the target axis. Thus, in one clock cycle the search engine core 2105 can find the reference string starting from any location in the first word. Notice that if a target string happens to cross a word boundary, the search engine core will still automatically find the word.

The outputs of the comparators are input into an $N_{start}$ input priority encoder that indicates if a string is found which of the $N_{start}$ comparators found the string. This provides for the location.

During operation after the data is loaded, in the first clock cycle, the state machine 2107 will ignore any strings that might be found in the first few comparators, that number of comparators indicated by the offset. During each subsequent clock cycle, the search engine core 2105 will find the reference string if it starts anywhere in the first $N_{start}$ positions. Thus, in a number of clock cycles, the search engine core 2105 will find the reference string anywhere in the target data.

Figures 23A, 23B:
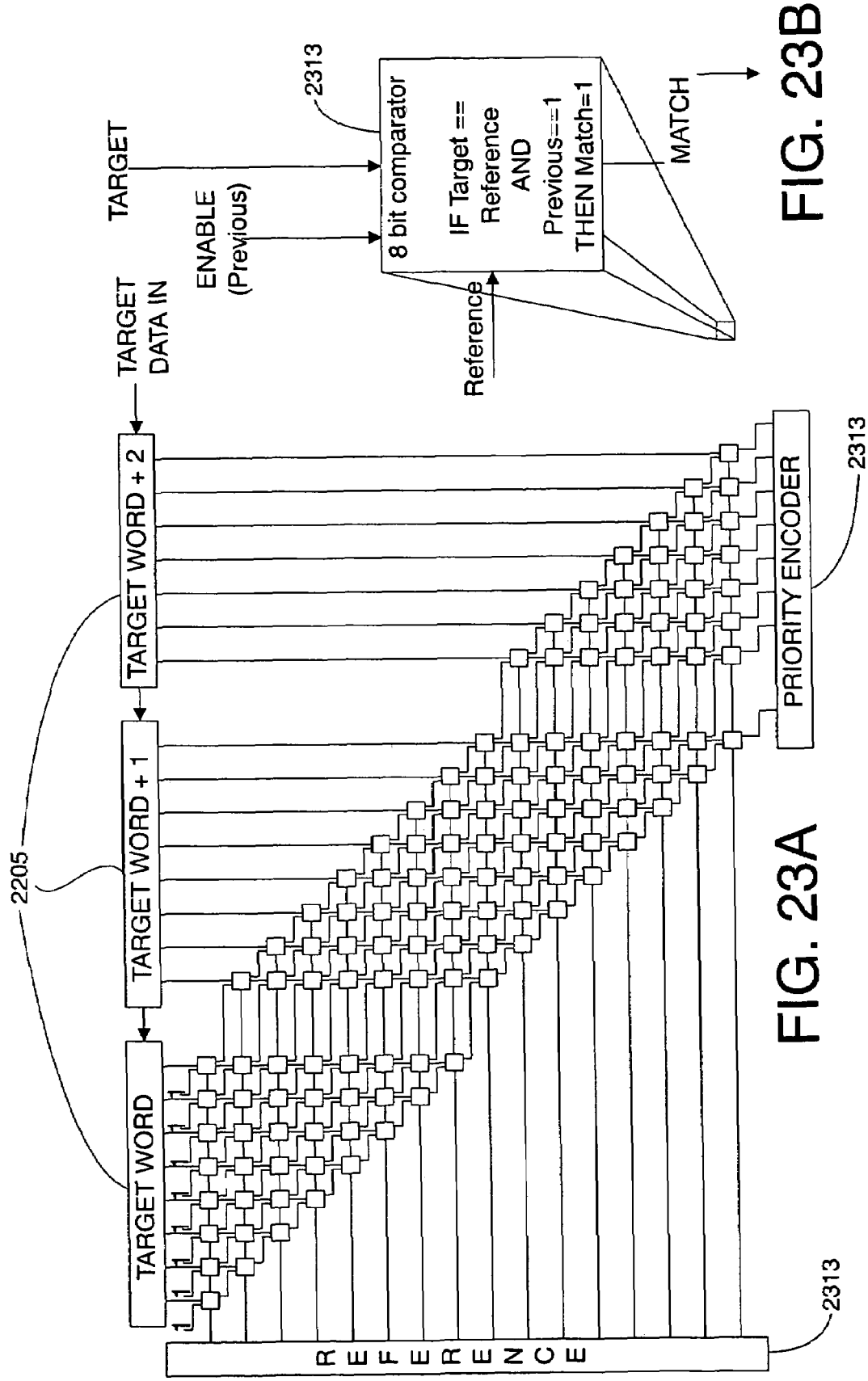
FIG. 23A shows an implementation of the input core in more detail.
FIG. 23B shows a comparator component of the core.

FIG. 23A shows an implementation of the input core in more detail. This implementation is for finding the reference string in any of a set of starting positions. The implementation includes a reference register 2203 for receiving the $N_R$ units of one of the reference strings, a set of target data registers 2205 coupled in series to receive the target data, a plurality of comparator sets, one comparator set corresponding to each of the starting positions, the comparator set of a particular starting position coupled to each unit—each byte in this implementation—of the reference register and to $N_R$ units—bytes in this case—of the target data registers starting from the particular starting position and comparing the first reference register contents to $N_R$ units of the target data registers starting from the particular staring position. Each comparator set indicates if there is a match of first reference string in the target data starting from its corresponding different starting position. The set of possible starting positions might include $N_{start}$ different positions. These positions may or may not be contiguous, and if contiguous, the one or more target data registers are coupled in series to receive at least $N_R+N_{start}-1$ units of the target data. Thus there are $N_{start}$ comparator sets, one comparator set for each of the $N_{start}$ starting positions.

Each comparator set includes $N_R$ consecutive comparators. One such comparator 2313 is shown in FIG. 23B, and includes a reference input, a target input, an enable input, and an output indicating a match, such that the output of a comparator 2313 is asserted when the reference and target inputs match and the enable input is asserted. For a particular set of comparators for a particular starting position, the reference inputs of consecutive comparators are coupled to consecutive units of the reference register, the target data inputs of consecutive comparators are coupled to consecutive units of the target data registers starting at the particular starting location, the first comparator of the set is enabled, and the enable input of each comparator is coupled to the output of the previous comparator, such that the output of the final comparator is asserted when the $N_R$ units of the reference string and the $N_R$ units of the target data agree.

In this way, the state processor is able to locate strings at unknown locations in areas of the packets (stored in the UFKB) at an extremely high rate.

Although the present invention has been described in terms of the presently preferred embodiments, it is to be understood that the disclosure is not to be interpreted as limiting. Various alterations and modifications will no doubt become apparent to those or ordinary skill in the art after having read the above disclosure. Accordingly, it is intended that the claims be interpreted as covering all alterations and modifications as fall within the true spirit and scope of the present invention.

What is claimed is:

1. A processor configured to process contents of packets passing through a connection point on a computer network, the processor comprising:
   (a) a buffer for receiving at least some of the contents of each packet passing through the connection point;
   (b) a memory containing one or more instructions of an instruction set for the state processor;
   (c) an arithmetic logic unit (ALU) coupled to the buffer;
   (d) a control block coupled to the ALU and to the instruction memory for decoding instructions; and
   (e) a program counter coupled to the instruction memory and to the ALU for indicating the next state processor instruction in the memory to process,
   wherein the ALU includes a searching apparatus comprising one or more comparators for searching for a reference string in the contents of a packet.

2. A processor according to claim 1, wherein the state processor processes contents of all packets passing through the connection point in real time.

3. A processor according to claim 1, wherein the instruction set includes an instruction for invoking the searching apparatus of the ALU to search for a specified reference string in the packet starting at an unknown location within a range of the packet.

4. A processor according to claim 1, wherein the searching apparatus searches for any of a set of reference strings in the contents of a packet, and wherein the instruction set includes an instruction for invoking the searching apparatus to search for any of a set of specified reference strings in the packet starting at an unknown location within a range of the packet.

* * * * *

UNITED STATES PATENT AND TRADEMARK OFFICE
CERTIFICATE OF CORRECTION

PATENT NO.       : 7,299,282 B2
APPLICATION NO.  : 10/828776
DATED            : November 20, 2007
INVENTOR(S)      : Sarkissian et al.

It is certified that error appears in the above-identified patent and that said Letters Patent is hereby corrected as shown below:

In column 13, line 7, kindly change "an be generated" to --can be generated--.

In column 28, line 35, kindly change "Extranct" to -- Extract --.

Signed and Sealed this

Nineteenth Day of February, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,299,282 B2 | Page 1 of 1 |
| APPLICATION NO. | : 10/828776 | |
| DATED | : November 20, 2007 | |
| INVENTOR(S) | : Sarkissian et al. | |

It is certified that error appears in the above-identified patent and that said Letters Patent is hereby corrected as shown below:

Title Page, Item (75) Inventors, add William H. Bares, of 5063 Elester Drive, San Jose, CA 95124, a Citizen of US as fourth inventor Signed and Sealed this
Twenty-fifth Day of September, 2012

David J. Kappos
*Director of the United States Patent and Trademark Office*